United States Patent [19]
Kitano et al.

[11] Patent Number: 6,085,256
[45] Date of Patent: Jul. 4, 2000

[54] CYBER SPACE SYSTEM FOR PROVIDING A VIRTUAL REALITY SPACE FORMED OF THREE DIMENSIONAL PICTURES FROM A SERVER TO A USER VIA A SERVICE PROVIDER

[75] Inventors: Hiroaki Kitano, Saitama; Yasuaki Honda, Chiba; Akikazu Takeuchi, Kanagawa, all of Japan

[73] Assignee: Sony Corporation, Tokyo, Japan

[21] Appl. No.: 08/515,111

[22] Filed: Aug. 14, 1995

[30] Foreign Application Priority Data

| Aug. 19, 1994 | [JP] | Japan | 6-195083 |
| Sep. 2, 1994 | [JP] | Japan | 6-209504 |
| Sep. 27, 1994 | [JP] | Japan | 6-230860 |

[51] Int. Cl.$^7$ .................................................. G06F 15/16
[52] U.S. Cl. ............................... 709/303; 709/219
[58] Field of Search .................... 395/600, 119, 395/500; 463/32, 25; 345/119, 327; 348/42, 13; 709/303, 219

[56] References Cited

U.S. PATENT DOCUMENTS

| 5,197,094 | 3/1993 | Tillery et al. | 463/25 |
| 5,251,300 | 10/1993 | Halliwell et al. | 395/200 |
| 5,432,925 | 7/1995 | Abraham et al. | 395/500 |
| 5,471,629 | 11/1995 | Risch | 395/800 |
| 5,490,239 | 2/1996 | Myers | 395/129 |
| 5,546,584 | 8/1996 | Lundin et al. | 395/700 |
| 5,557,724 | 9/1996 | Sampat et al. | 345/327 |
| 5,566,280 | 10/1996 | Fukui et al. | 395/119 |
| 5,588,104 | 12/1996 | Lanier et al. | 345/326 |
| 5,608,446 | 3/1997 | Carr et al. | 348/6 |
| 5,623,642 | 4/1997 | Katz et al. | 395/500 |
| 5,623,656 | 4/1997 | Lyons | 395/610 |
| 5,625,818 | 4/1997 | Zarmer et al. | 395/615 |
| 5,634,004 | 5/1997 | Gopinath et al. | 395/200.02 |
| 5,634,053 | 5/1997 | Noble et al. | 395/604 |
| 5,659,691 | 8/1997 | Durward et al. | 345/329 |
| 5,675,721 | 10/1997 | Freedman et al. | 395/129 |
| 5,734,795 | 3/1998 | Rogers | 395/10 |
| 5,768,521 | 6/1998 | Dedrick | 709/224 |
| 5,815,156 | 9/1998 | Takeuchi | 345/419 |
| 5,826,266 | 10/1998 | Honda | 707/9 |

FOREIGN PATENT DOCUMENTS

| 5-233779 | 9/1993 | Japan | G06F 15/62 |
| 2256567 | 12/1992 | United Kingdom | G06F 15/72 |

OTHER PUBLICATIONS

Proceedings: Human Factors in Computing Systems, Monterey, CA, May 3–7, 1992, ACM Press, USA, pp. 329–334, C. Codella et al., "Interactive Simulation in a Multi-Person Virtual World".

Proceedings: Computer Animation, Geneva, Switzerland, Apr. 19–21, 1995, IEEE Comput. Soc. Press, USA, pp. 44–49, G. Singh et al., "Networked Virtual Worlds".

Fujitsu Scientific and Technical Journal, Japan, vol. 26, No. 3, Oct. 1990, pp. 197–206, K. Fukuda et al., "Hypermedia Personal Computer Communication System: Fujitsu Habitat".

(List continued on next page.)

*Primary Examiner*—Albert De Cady
*Assistant Examiner*—David Ton
*Attorney, Agent, or Firm*—Limbach & Limbach, LLP

[57] ABSTRACT

A cyber-space system comprising one or more cyber-spaces for providing predetermined information, and user terminals for receiving provision of the predetermined information by accessing the cyber-space, wherein the cyber-space includes information objects for providing information to the user terminals, user objects corresponding to the user terminals, and a conversion object disposed between the information object and the user object, and capable of converting a terminal manipulation message from the user object into an information access message and supplying the converted message to the information object. The conversion object is further capable of converting an information content message from the information object into information corresponding to the capacity of the user terminal and providing the converted information to the user terminal. In this system, the conversion object provides the information content message to the user object when this message represents renewal of the information of the user object. The conversion object is prepared per kind or version of the cyber-space.

15 Claims, 40 Drawing Sheets

OTHER PUBLICATIONS

Proceedings: Virtual Reality Annual International Symposium, Seattle, WA, Sep. 18–22, 1993, IEEE C. Soc. Press, USA, pp. 394–400, C. Carlsson et al., "Dive—A Multi–User Virtual Reality System".

Proceedings: Virtual Reality Annual International Symposium, Research Triangle Park, NC, Mar. 11–15, 1995, IEEE C. Soc. Press, USA, pp. 11–18, Q. Wang et al, "EM—An Environment Manager for Building Networked Virtual Environments".

Proceedings: Advances in Parallel and Distributed Simulation, Anaheim, CA, Jan. 23–25, 1991, vol. 23, No. 1, SCS, USA, pp. 104–111, C. Kanarick, "A Technical Overview and History of the Simnet Project".

"Shopping as Virtual Reality," Chain Store Age Executive, vol. 69, No. 9, Sep. 1993, pp. 64.

J. Stoppi, "VR–Chitecture—A New Discipline," IEE Colloquium on Distributed Virtual Reality, London, Digest No. 121, May 1993, pp. 6/1–6/3.

G. House, "Going to the Shopping Mall Via VR," Virtual Reality World, vol. 2, No. 6, Nov./Dec. 1994, pp. 41–43.

Proceedings 1992 Symposium on Interactive 3D Graphics, Mar. 29, 1992—Apr. 1992, New York, US, pp. 147–156, M. Zyda et al., "NPSNET: Constructing a 3D Virtual World".

Proceedings of the INET/JENCS, Jun. 15–17 1994, Reston, VA, US, pp. 242/1–242/3, D. Raggett, "Extending WWW to Support Platform Independent Virtual Reality".

Communicating With Virtual Worlds, Proceedings of Computer Graphics International, Jun. 21–25 1993, Tokyo, JP, pp. 41–49, M. Gigante et al., "Distributed, Multi–Person, Physically–Based Interaction in Virtual Worlds".

K. Matsuda et al, "Sony's Enhanced VRML Browser (Beta Version)–Cyber Passage Browser Manual," Software Library, Architecture Laboratories, Sony Corp., Sony Computer Science Laboratory, (date text was written and/or published is unknown), pp. 1–2, 1–13.

Material Collected From the World Wide Web on Jun. 16, 1996: K. Matsuda et al, "Sony's Approach to Behavior and Scripting Aspects of VRML: An Object–Oriented Perspective," Sony Computer Sciences Laboratory Inc. With Central Research Center, Sony Corp., (date text was written and/or published is unknown), pp. 1–6.

C. Morningstar et al, The Lessons of Lucasfilm's Habitat,: First Steps, Michael Benedikt (Ed.), 1990 MIT Press, Cambridge, Mass., Address is: File:///C/My Documents/Lessons.HTML, pp. 1–13.

M. Pesce, "VRML–Browsing and Building Cyberspace," New Riders Publishing, copyright 1995, pp. 43–81.

Material Collected From The World Wide Web on Jun. 23, 1996, (date text was written and/or published is unknown), Pages Include: HTTP://WWW.Communities.Com/Habitat.HTML, pp. 1–2; File:///C/My Documents/Descent.Gif, pp. 1: HTTP://WWW.Race.U–Tokyo.AC.JP/Race/TGM/Mud/Habitat.HTML, pp. 1–2; HTTP://WWW.NetUSA.Net/Shadow/Habitat/Habitat.HTML, pp. 1–2.

Material Collected From The World Wide Web on Jun. 21, 1996 (date text was written and/or published is unknown), Pages Include: HTTP://vs.Sony.Co.JP/VS–E/Vstop.HTML, pp. 1–2; HTTP://vs.Sony.Co.Jp/VS–E/Works/Browser/What.HTML, pp. 1–2; HTTP://vs.Sony.Co.Jp/VS–E/Works/Server/What.HTML, pp. 1–2; HTTP://vs.Sony.Co.Jp/VS–E/Techinfo.HTML, pp. 1–3; HTTP://vs. Sony.Co.JP/VS–E/Info/Faq, pp. 1–5.

FIG. 3

INDIVIDUAL INFORMATION OF USER

NAME, AGE, OCCUPATION, ADDRESS, CREDIT CARD, HISTORY OF ACCESS TO INFORMATION OBJECT

U013-i

MODEL OF VIRTUAL WORLD

VISUAL FIELD FROM CHARACTER E

VISUAL FIELD FROM CHARACTER D

PICTURE SEEN FROM CUSTOMER

PICTURE SEEN FROM COUNTER

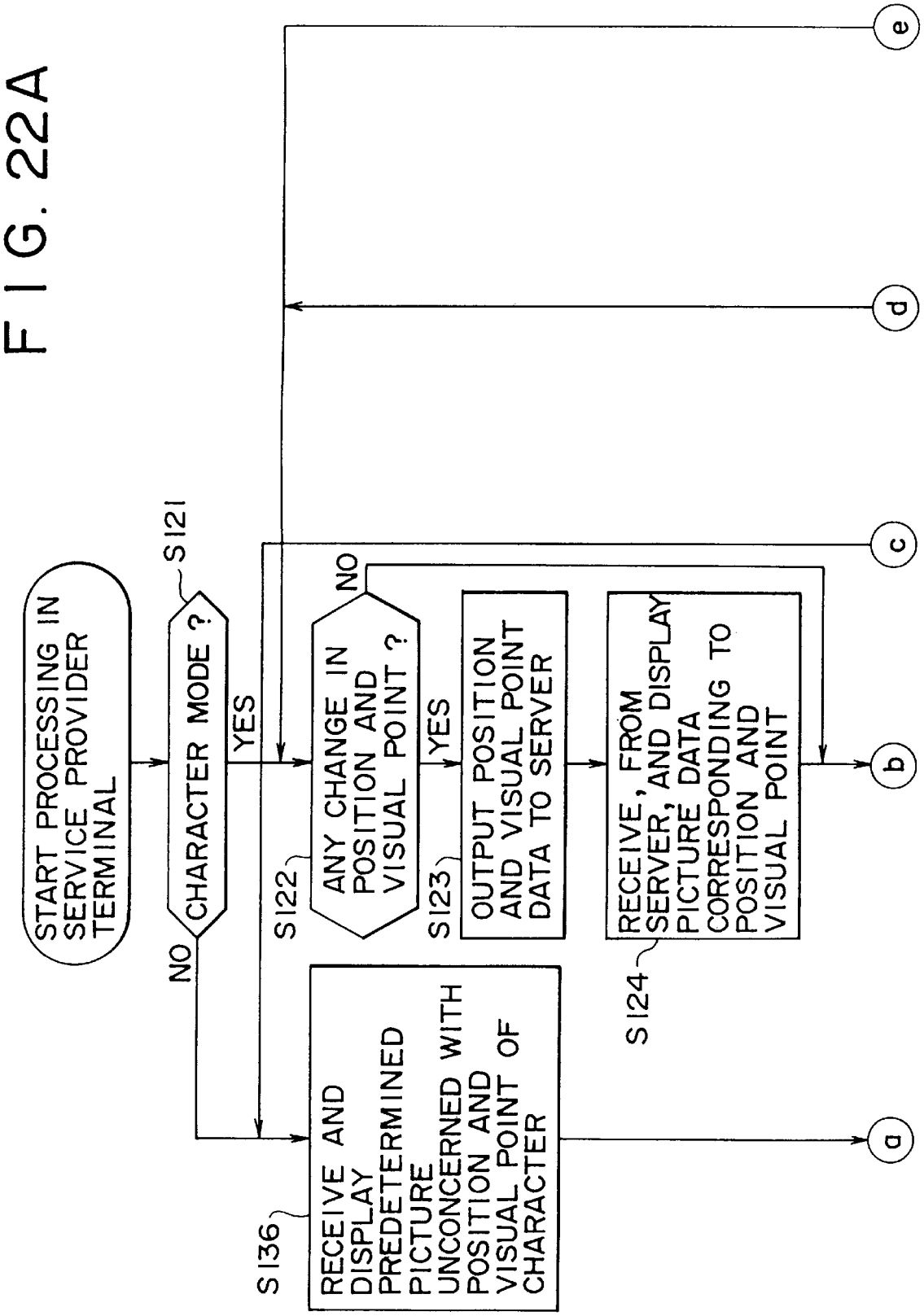

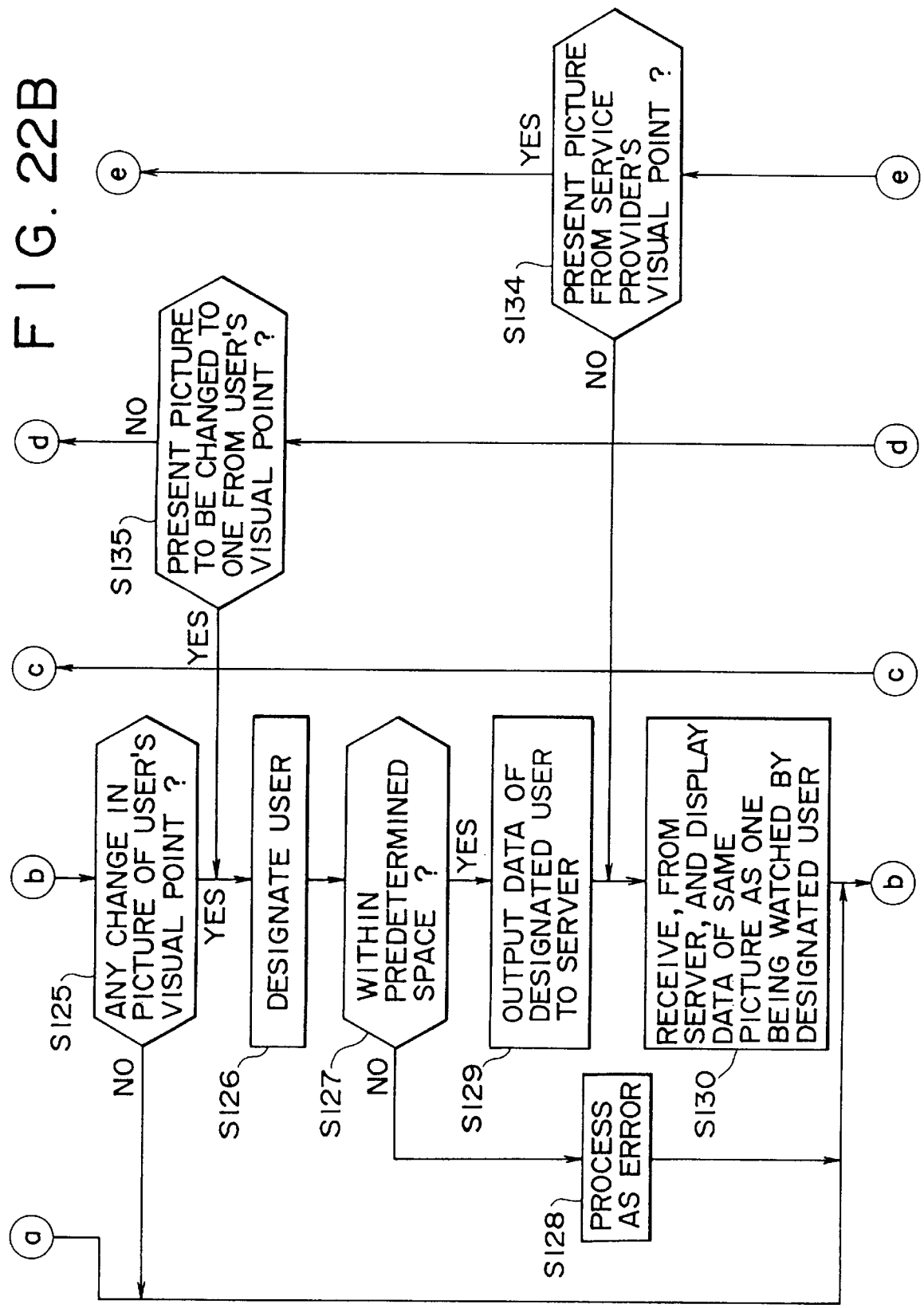

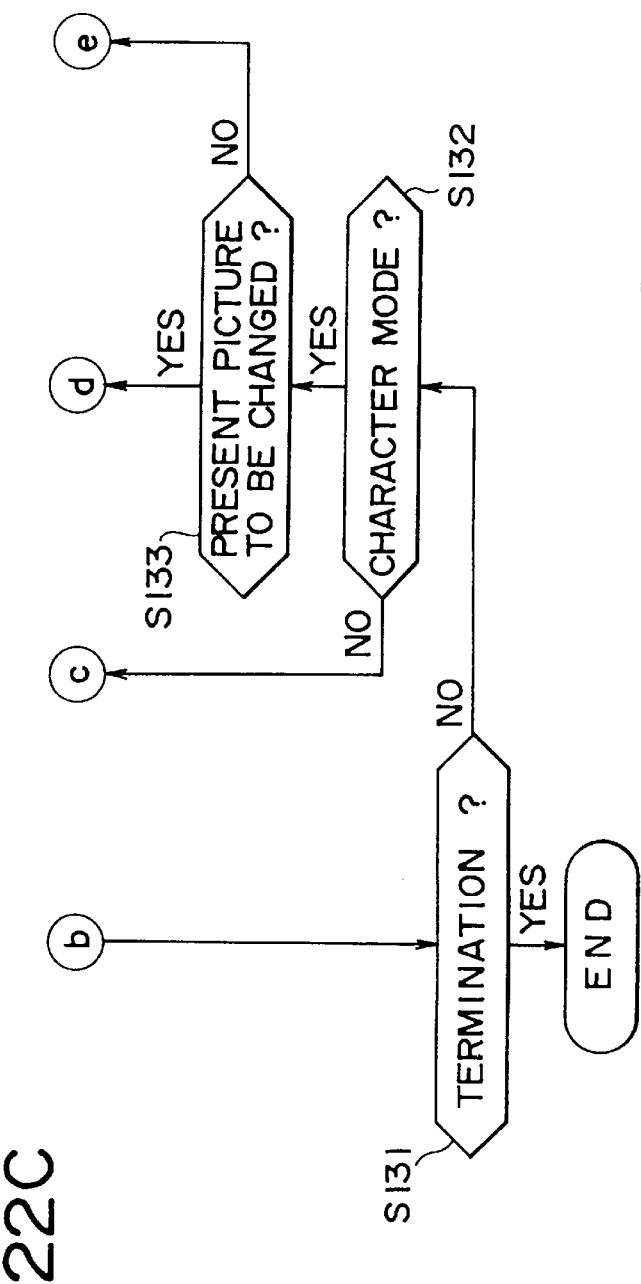
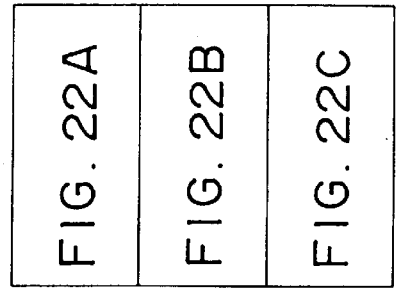
FIG. 22C

F I G. 28
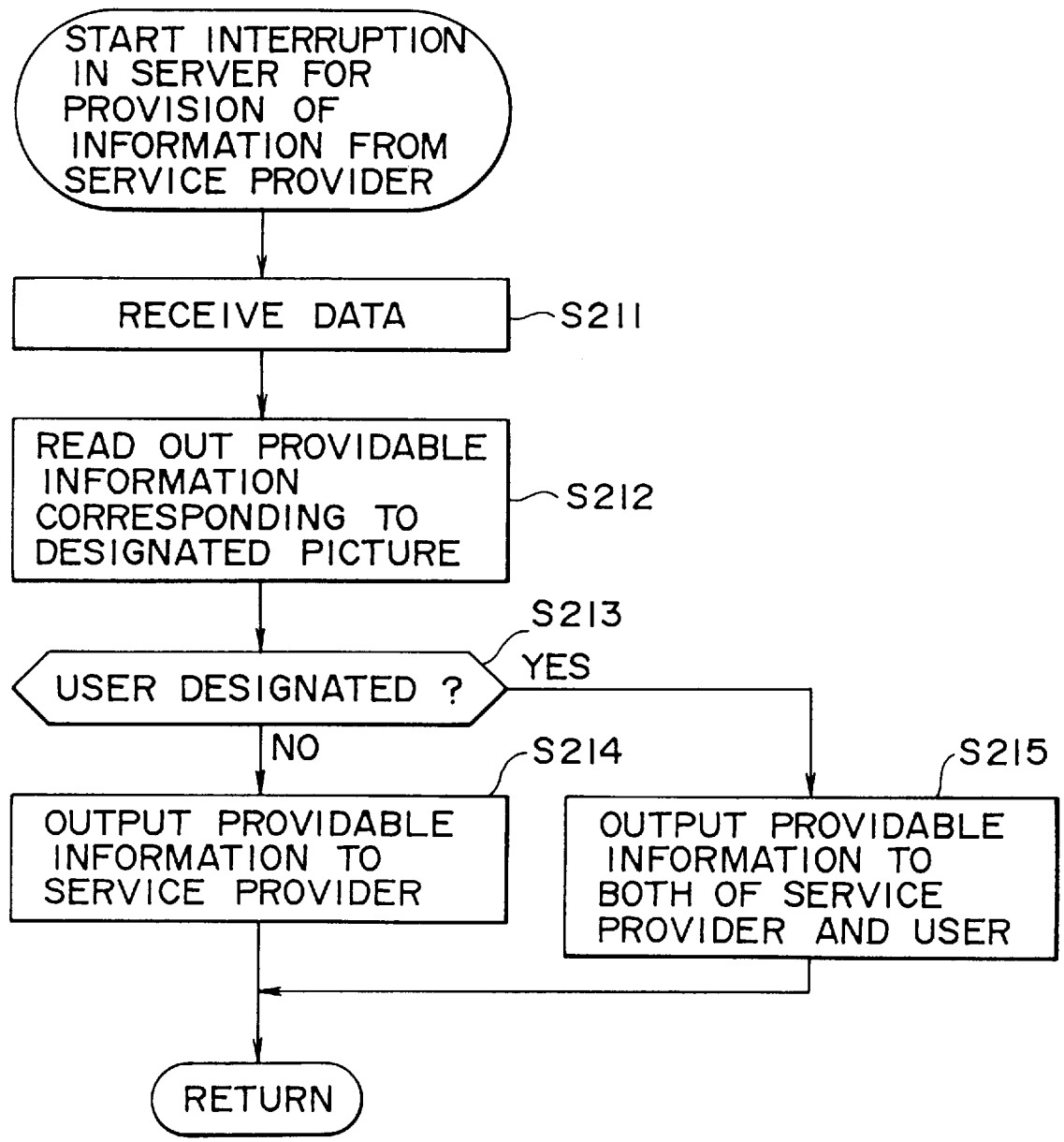

KIND OF TERMINAL

VERSION OF CYBER SPACE

PER SERVICE

CYBER SPACE SYSTEM FOR PROVIDING A VIRTUAL REALITY SPACE FORMED OF THREE DIMENSIONAL PICTURES FROM A SERVER TO A USER VIA A SERVICE PROVIDER

BACKGROUND OF THE INVENTION

1. Field of the Invention

The present invention relates to a cyber-space system for generating a virtual reality space for example and providing the same to users.

2. Description of the Related Art

FIG. 41 is a block diagram showing an exemplary completion of a conventional cyber-space system according to the prior art. A server 301 is equipped with a memory device 302 and supplies picture data, which are stored in the memory device 302, to each of the user terminals 303 via a public telephone network 304.

A user at each of the user terminals 303 selects one of hundreds of kinds of characters prepared previously in the memory device 302 and designates the same as a character of his own. The user moves the designated character in a virtual reality space provided by the server 301, thereby enjoying a life in a virtual reality space.

One user terminal 303, for example, accesses the server 301 via an ordinary public telephone network 304 to receive a picture of the virtual reality space. When a predetermined manipulation is performed in the user terminal 303 to command a motion of his own character (e.g., character X) in a desired direction, a picture corresponding to the direction of such motion is provided by the server 301, whereby the user terminal 303 is enabled to enjoy the action while moving the character X in a town provided in the virtual reality space.

Via another user terminal 303, it is possible, as above, for another user to designate his own character (e.g., character Y) and to move the same in the virtual reality space.

When the character X of the user terminal 303a and character Y of the second user terminal 303b have been moved to mutually adjacent positions in the virtual reality space, a picture of the character Y moving in the town is also provided, in addition to the town picture which serves as a background, in the entire picture of the virtual reality space supplied from the server 301 to the user terminal 303a. Consequently, the picture shown in FIG. 42 for example is displayed on the screen of the user terminal 303, wherein the character X of the user terminal 303 is disposed at the center, and character Y of the other user terminal 303a is positioned in the vicinity thereof.

Similarly, a picture shown in FIG. 43 is provided to the other user terminal 303b. In this diagram, character Y of his own is disposed at the center of the screen, and character X of the user terminal 303a is disposed in the vicinity thereof.

In this state, where character other than his own is displayed on the screen, it is possible for character X to have a conversation by means of a character message to character Y (or from character Y).

More specifically, when a predetermined character message is inputted by manipulating a keyboard of the user terminal 303a, the character message data is supplied therefrom via the public telephone network 304 to the server 301, which then supplies the received character message data via the public telephone network 304 to the other user terminal 303b. Similarly, when a predetermined character message is inputted by manipulating a keyboard of the other user terminal 303b, the character message data is supplied therefrom via the public telephone network 304 to the server 301, which then supplies the received character message data via the public telephone network 304 to the user terminal 303a. In this manner, one user terminal 303 and the other user terminal 303b can converse with each other by means of the character message.

In the virtual reality space, a virtual reality currency is prepared to be used within this space, so that each character can purchase any virtual reality commodity by the use of such currency.

In this manner, the conventional system known heretofore is so contrived as to enable each character to enjoy living in the virtual reality space as a kind of game. However, it is nothing but a game after all and holds substantially no connection with real life. Thus, interest therein is soon lost.

In addition, a method of billing users is based on adding a charge, which corresponds to the time of connection use to a basic charge, so that it is difficult to give an added value to the virtual reality space.

Since only one user interface is prepared in the conventional system known heretofore, there arises a problem in that a high-function user terminal and a low-function user terminal can only enjoy functions they have in common. more specifically, in such a system, a user terminal having a high-level of functions is disabled to utilize nothing better than the user interface adequate for a user terminal having only a low-level of functions.

Further in the conventional system, when the software prepared in the center comprises an information object for providing information and a user object corresponding to each user terminal, it is customary that the user interface is installed separately for the information object and the user object. Consequently, when accessing the system which provides different kinds of information, it becomes necessary to not only switch the portion installed in the information object, but also the portion installed in the user object, whereby some difficulty is unavoidable in dynamically switching the user interface.

SUMMARY OF THE INVENTION

It is a first object of the present invention to achieve economic activity through a close connection with real space to thereby give an added value to the virtual reality space.

A second object of the invention is to enable enjoyment of a varied life which is closely connected with real space and is almost equivalent to a real life.

And a third object of the invention resides in realizing enhanced effective use of the function of each user terminal and enabling dynamic switching of the user interface.

According to a first aspect of the present invention, there is provided a cyber-space system comprising servers for providing a virtual reality space formed of three-dimensional pictures; user terminals for receiving the virtual reality space provided from the server; and service provider terminals for providing a service, which corresponds to the relevant picture forming the virtual reality space, to the user terminal via the server by utilizing at least a portion of the virtual reality space provided from the server; wherein the server maintains the pictures of the virtual reality space as objects, and allocates the objects, which form the virtual reality space, to predetermined persons (e.g., owners of the service provider terminals), and executes a billing process for each of the objects allocated to the predetermined persons.

According to a second aspect of the present invention, there is provided a cyber-space system comprising servers for providing a virtual reality space formed of three-dimensional pictures; user terminals for receiving the virtual reality space provided from the server; and service provider terminals for providing a service, which corresponds to the relevant picture forming the virtual reality space, to the user terminal via the server by utilizing at least a portion of the virtual reality space provided from the server; wherein the server allocates portions of the virtual reality space to predetermined persons (e.g., owners of the service provider terminals), and executes a billing process for each of the partial spaces allocated to the predetermined persons.

According to a third aspect of the present invention, there is provided a cyber-space system comprising a server for providing, via a communication network, a virtual reality space formed of three-dimensional pictures; user terminals for receiving the virtual reality space provided from the server; and a service provider terminal for providing a service, which corresponds to the picture forming the virtual reality space, to the user terminal via the server by utilizing at least a portion of the virtual reality space provided from the server.

And according to a fourth aspect of the present invention, there is provided a cyber-space system comprising one or more cyber-spaces for providing predetermined information, and user terminals for receiving predetermined information by accessing the cyber-space, wherein the cyber-space includes information objects for providing information to the user terminals, user objects corresponding to the user terminals, and a conversion object disposed between the information object and the user object, and capable of converting a terminal manipulation message from the user object into an information access message and supplying the converted message to the information object, the conversion object further capable of converting the information content message from the information object into information corresponding to the capacity of the user terminal and providing the converted information to the user terminal. In the cyber-space system according to the first aspect of the present invention, information objects are disposed in the virtual reality space, and the information objects are allocated to owners of service provider terminals respectively, and a billing process is executed for each object as a unit.

In the cyber-space system according to the second aspect of the invention, portions of the virtual reality space are allocated to, e.g., owners of the service provider terminals, and a billing process is executed for each of the allocated partial spaces.

In the cyber-space system according to the third aspect of the invention, when the user terminal or the service provider terminal has designated a desired one of the pictures forming the virtual reality space, the server can provide an information picture, which corresponds to the designated picturee, to the user terminal or the service provider terminal.

Meanwhile, when the service provider terminal has designated a desired one of the pictures forming the virtual reality space, the server can provide an information picture, which corresponds to the designated picture, to both of the service provider terminal and the user terminal.

A character corresponding to the user terminal or the service provider terminal is arranged in the virtual reality space, and the user terminal or the service provider terminal inputs the position and the visual point of the character in the virtual reality space; and the server can provide to the user terminal or the service provider terminal the picture of the virtual reality space corresponding to the position and the visual point of the character.

The service provider terminal is capable of receiving the provision by selectively switching either the picture corresponding to the position and the visual point of the character of the service provider terminal, or the picture corresponding to the position and the visual point of the character of the user terminal.

The service provider terminal can designate the character of the user terminal when receiving the provision of the picture corresponding to the position and the visual point of the character of the user terminal.

Further the designation of the character of the user terminal by the service provider terminal is enabled only in the space portion allocated to the service provider terminal.

In the cyber-space system of the above description, a service corresponding to the virtual reality forming picture provided from the service provider terminal to the user terminal is provided by utilizing at least a portion of the virtual reality space provided from the server. Therefore it becomes possible to receive the service, which is very similar to actual life, by utilizing the virtual reality space.

And in the cyber-space system according to the fourth aspect of the present invention, the conversion object may provide the information content message to the user object when the information content message obtained from the information object represents renewal of the information of the user object.

The conversion object may be prepared per kind or version of the cyber-spaces, or may be prepared correspondingly to the information provided from the cyberspaces, or may be prepared per kind of the user terminals.

In the cyber-space system described above, a conversion object is disposed between the information object and the user object. Therefore, if desired kinds of conversion objects are prepared in compliance with the object's requirements, it becomes possible to provide, for any user terminal having a high-level of functionality, a user interface corresponding to such a high-level of functionality. And dynamic switching of the user interface can be performed more easily.

The above and other features and advantages of the present invention will become apparent from the following description which is given with reference to the accompanying drawings.

BRIEF DESCRIPTION OF THE DRAWINGS

FIG. 3 is a diagram for explaining a user object;

FIG. 22 including FIGS. 22a, 22b and 22c is a flow chart for explaining a processing example executed when the service provider terminal 14 in FIG. 4 receives a picture from the server 11;

FIG. 28 is a flow chart for explaining a processing example executed in the server 11 corresponding to the process of FIG. 27 in the service provider terminal 14;

DESCRIPTION OF THE PREFERRED EMBODIMENTS

Figure 1:
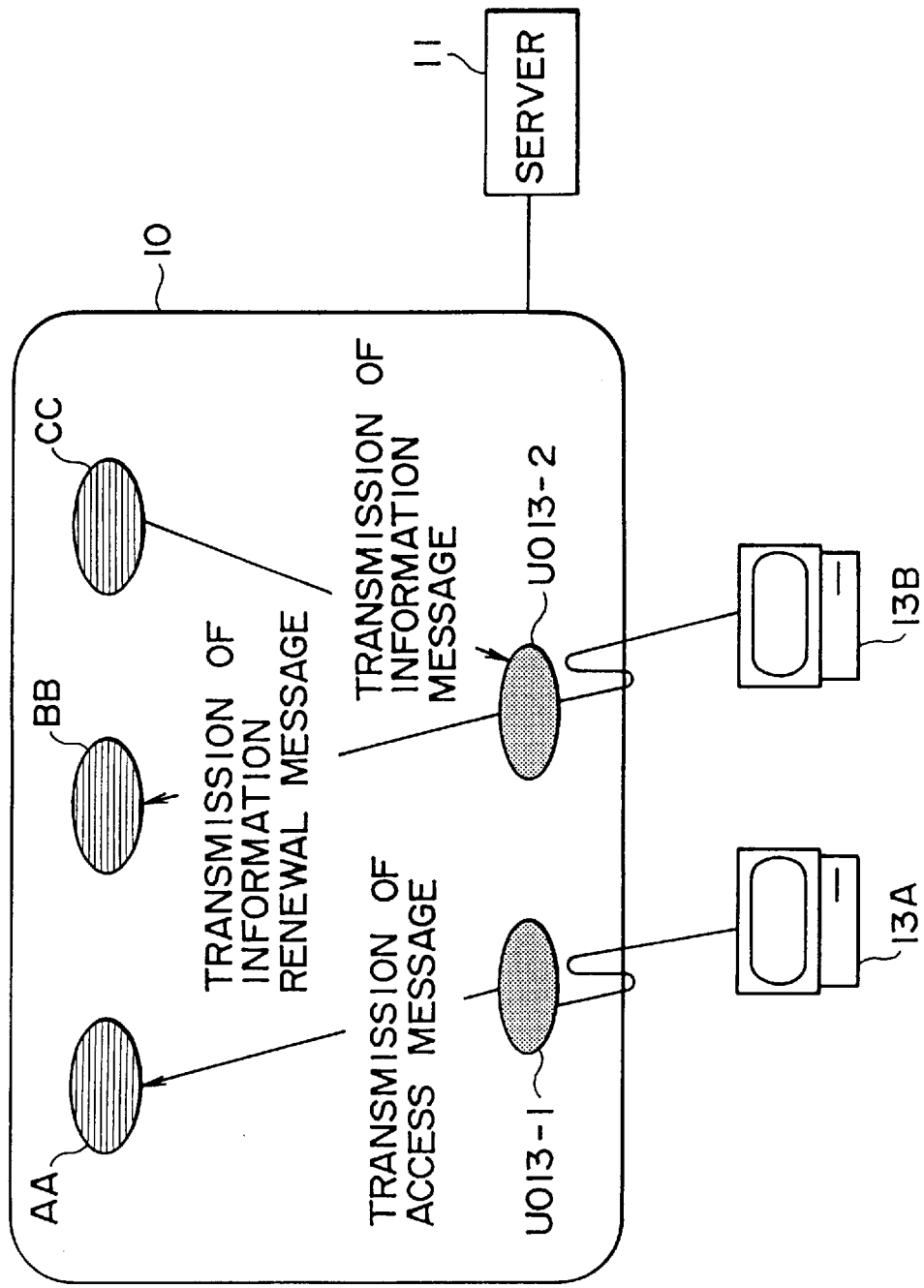
FIG. 1 is a diagram for explaining a virtual reality space provided by a cyber-space system of the present invention.

FIG. 1 shows an exemplary composition of a virtual reality space (cyber-space) provided by the cyber-space system of the present invention. This example cyber-space system includes a server 11 for providing a virtual reality space 10 and user terminals 13a, 13b which are connected to the server 11 via a high-speed communication network utilizing optical fibers or the like. The user terminals 13a, 13b can receive signals representative of the virtual reality space 10 from the server 11. The virtual reality space 10 includes one or more (three in this embodiment) information objects AA, BB and CC. These information objects AA, BB and CC constitute a system for providing media information such as moving pictures, still pictures, audio, music and text, and also services utilizing such information including network games, on-line shopping, data base retrieval and so forth.

The information (service) to be provided in the cyber-space is classified into groups of related information and is stored in the server 11. Meanwhile, each user prepares a user terminal 13 and makes registers as a user for utilizing the virtual reality space 10. At the time of such user registration, the server 11 prepares exclusive user objects UO13-1 and UO13-2 corresponding to the individual user terminals 13 respectively.

The users operate the corresponding user objects UO13-1 and UO13-2 respectively through the user terminals 13. Then each user accesses the information object where desired information exists, and can thereby examine the stored information or play a game or make a purchase. The kind of providable information (service) is different depending on each information object.

Figure 2:
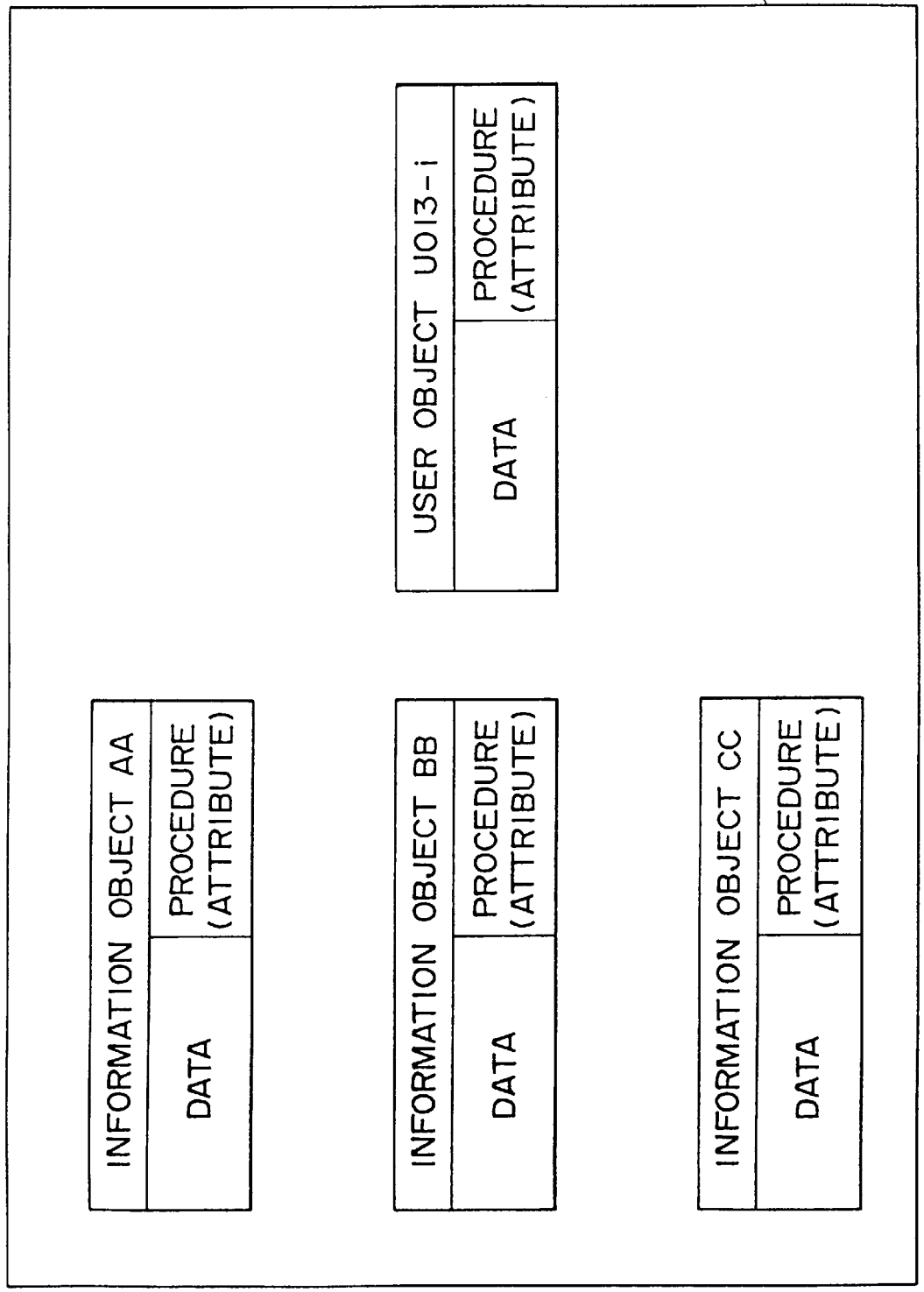
FIG. 2 is a diagram for explaining objects which comprise the virtual reality space.

As shown in FIG. 2, the virtual reality space 10 is constituted as an object system. More specifically, all of the information objects AA, BB, CC and the user objects UO13-1, UO13-2 operated by the users via the user terminals 13 are formed as objects which are prescribed by data and procedures. Consequently, each user accesses a desired information object AA, BB or CC by manipulating the exclusive user object UO13-i of his own and receives the information managed by that information object.

The user object UO13-i corresponds to each user terminal 13-i (more exactly, the user as an owner thereof) and is a unique exclusive object representing the user himself. As shown in FIG. 3, the user object UO13-i holds various individual pieces of information about the user such as attributes in the procedure thereof, including his account information, history information indicative of his past access to different information objects, the age, occupation and address of the user, his credit card numbers and so forth.

Since the user object UO13-i is manipulated through the user terminal 13-i, the content of the manipulation from the user terminal 13-i (e.g., manipulation of a button in the user terminal 13-i or audio input) can be transmitted as a message to any other user object in accordance with the prescribed procedure. It is also possible to receive picture data as a message and to output such data to the corresponding user terminal for displaying the same, or to receive, as a message, an access relative to the information held by the user object.

Furthermore, since the user object UO13-i corresponds to each user terminal 13-i, the content thereof is fixed in the virtual reality space 10. Accordingly, whenever the user object UO13-i corresponding to the user terminal 13-i for example receives information from the information object BB or the information object AA, the content is kept unchanged for this reason.

An access to any of the information objects AA, BB and CC in the virtual reality space 10 is realized as transmission of a message to the relevant information object. For example, when the user object UO13-i examines the content of a desired information object, a message is transmitted to that information object and a reply therefrom is received. The kind of message receivable by the information object is different depending on each information object. If the information object is one for shopping, an explanatory message of a desired commodity and a price thereof can be received. And if the information object is one for a combat game, a message of an attack command can be received.

The content of the service provided from each information object may be rendered different in conformity with the attribute of the user. For example, it is possible to arrange the system in such a manner that any user having paid a low entrance fee to the cyber space manager is enabled to receive only picture information, while any user having paid a high entrance fee is enabled to receive both picture information and audio information. In this case, the user interface is also different depending on the amount of the paid entrance fee.

Thus, the virtual reality space 10 is entirely constituted of objects, each of which has an attribute essentially prescribed by the procedure thereof. And each information object is so formed as to decide acceptance or refusal of an access corresponding to such an attribute.

Figure 4:
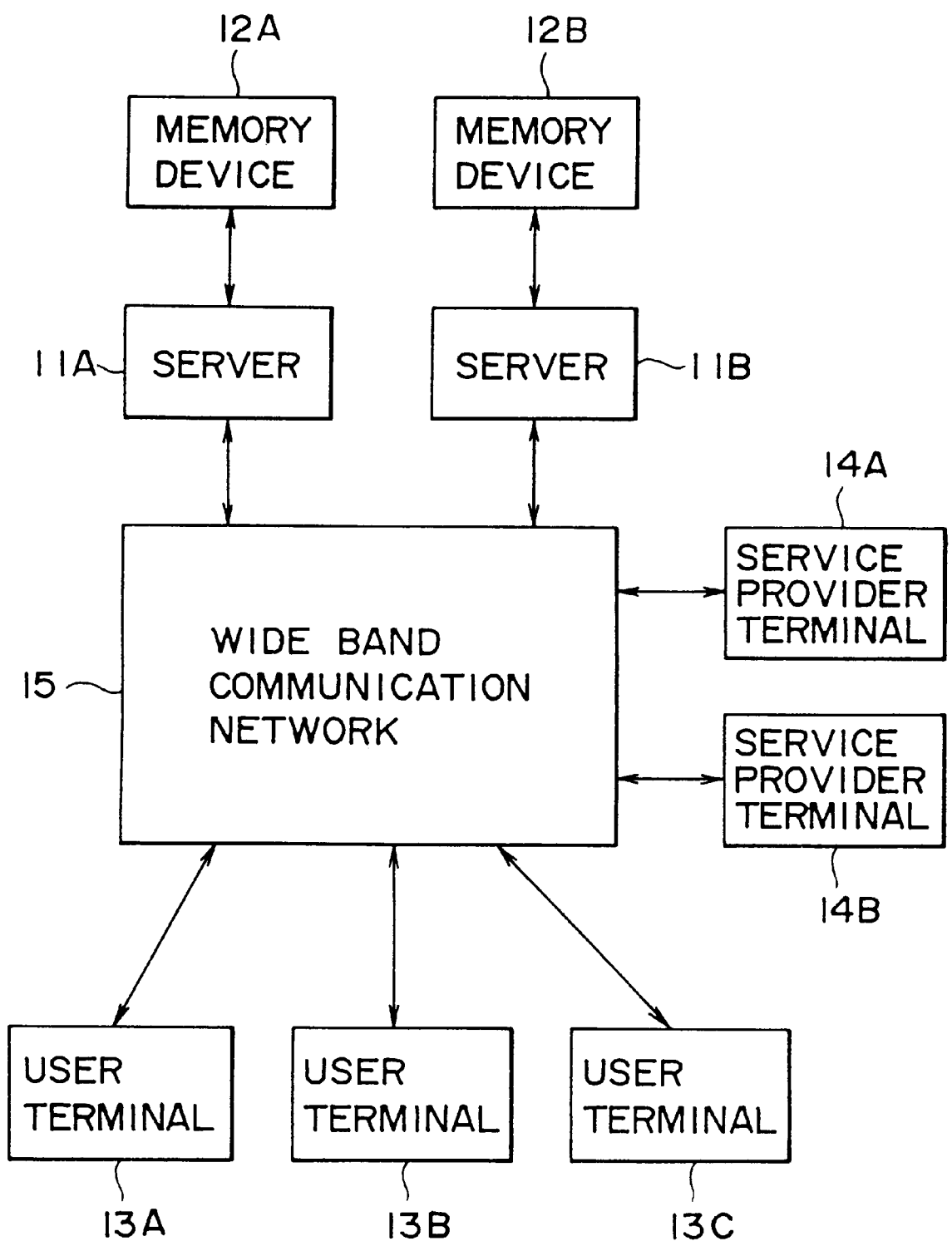
FIG. 4 is a block diagram showing an exemplary composition of hardware in the cyber-space system of the present invention.

FIG. 4 shows an exemplary hardware structure of the cyber space system according to the present invention. In this embodiment, as shown, an arbitrary number (two in this embodiment) of servers 11a, 11b have memory devices 12a, 12b corresponding thereto respectively and can provide a virtual reality space 10 via a wide band communication network 15 where optical fibers for example are employed. Also an arbitrary number (three in this embodiment) of user terminals 13a, 13b, 13c are so arranged as to be capable of receiving, from the servers 11a, 11b via the wide band communication network 15, the provision of both the virtual reality space and predetermined service (information) utilizing such space.

Further an arbitrary number (two in this embodiment) of service provider terminals 14a, 14b are included in the system of this embodiment. Utilizing the wide band communication network 15, the service provider terminals 14a, 14b are capable of receiving the provision of the virtual reality space 10 via the servers 11a, 11b while providing predetermined service to the user terminals 13a, 13b, 13c.

Figure 5:
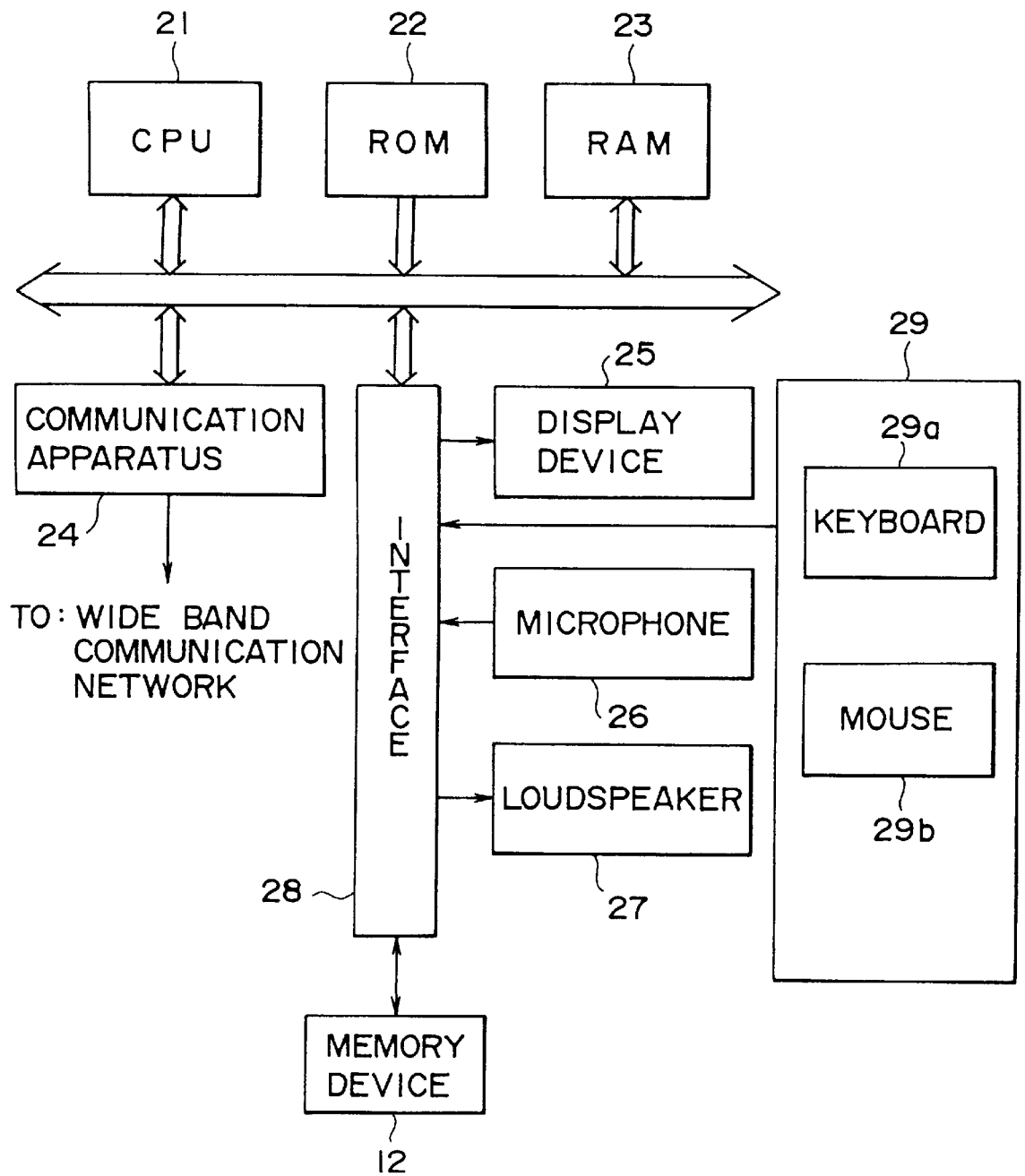
FIG. 5 is a block diagram showing an exemplary composition of a server 11 in FIG. 4.

FIG. 5 shows an exemplary structure of the server 11. As shown in this diagram, the server 11 is equipped with a CPU 21, which executes various processes in accordance with a program stored in a ROM 22. Meanwhile in a RAM 23, there are stored data and programs necessary for the CPU 21 to execute various processes. And a communication apparatus 24 is capable of transmitting predetermined data to or receiving the same from the wide band communication network 15.

A display device 25 is equipped with a CRT or an LCD and is connected to an interface 28 in such a manner as to be capable of monitoring the picture in the virtual reality space provided from the server 11. To this interface 28, there is also connected a microphone 26 and a loudspeaker 27 so that a predetermined audio signal can be supplied to the user terminal 13a or the service provider terminal 14a, or an audio signal from the user terminal 13a or the service provider terminal 14a can be monitored.

The server 11 is equipped with an input unit 29 so as to perform various inputs via the interface 28. The input unit 29 has at least a keyboard 29a and a mouse 29b.

Figure 6:
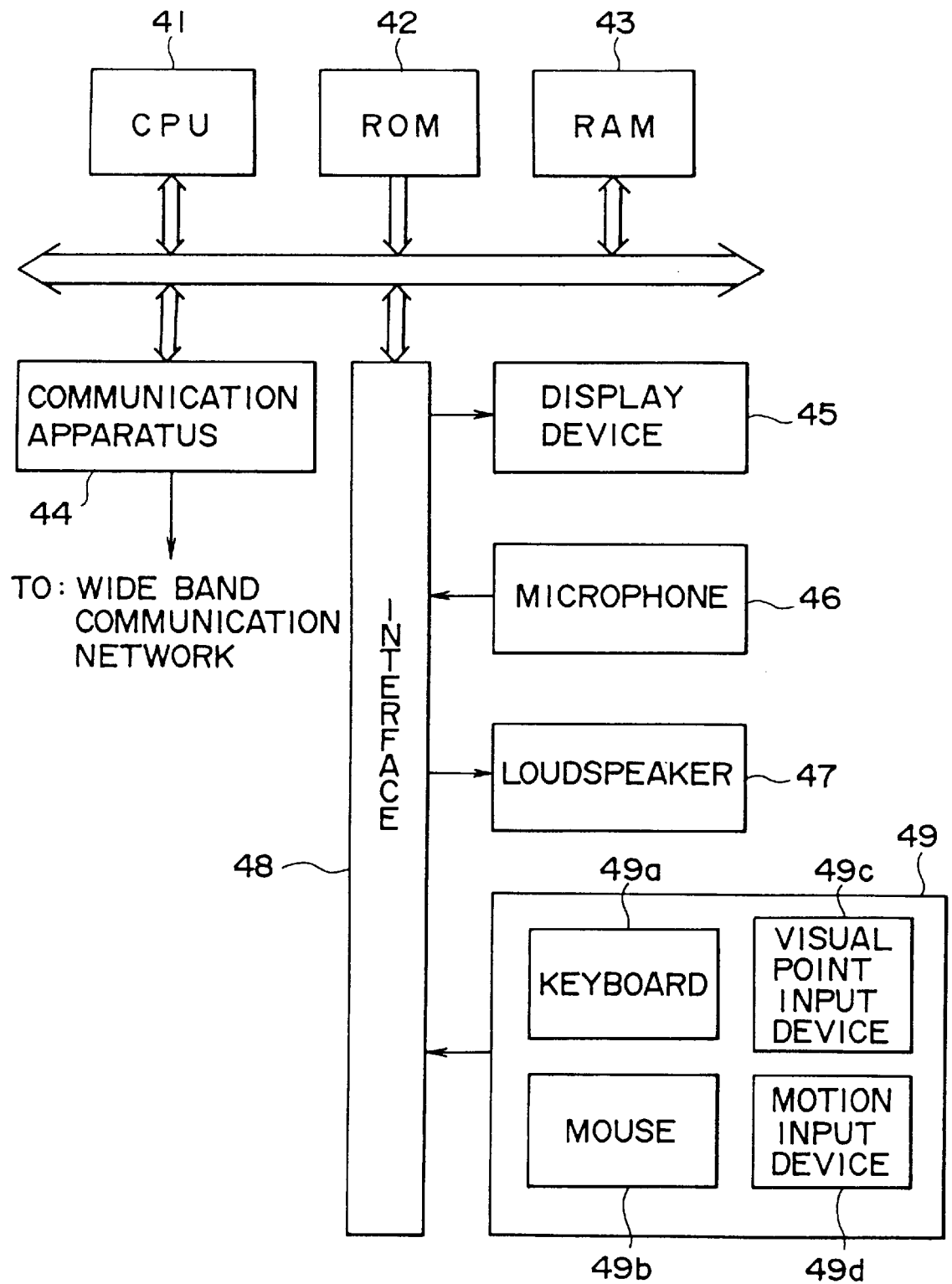
FIG. 6 is a block diagram showing an exemplary composition of a user terminal 13 in FIG. 4.

FIG. 6 shows an exemplary structure of the user terminal 13. The user terminal 13 is equipped with a CPU 41, which executes various processes in accordance with a program stored in a ROM 42. Meanwhile in a RAM 43, there are stored data and programs necessary for the CPU 41 to execute various processes. And a communication apparatus 44 is capable of transmitting predetermined data to or receiving the same from the server 11 via the wide band communication network 15.

A display device 45 is equipped with a CRT or an LCD and is adapted to display a three-dimensional picture of computer graphics (CG) or a normal three-dimensional picture obtained from an ordinary video camera or the like. A microphone 46 is used when outputting an audio signal to the server 11. meanwhile a loudspeaker 47 outputs the audio signal transmitted thereto from the server 11. And an input unit 49 is manipulated when various inputs are performed.

A keyboard 49a of the input unit 49 is manipulated when inputting a desired character or symbol, while a mouse 49b thereof is manipulated when designating a predetermined position, and a visual point input device 49c is manipulated when inputting a visual point of view of the character corresponding to the user terminal 13, whereby the visual point of view of the character can be moved both vertically and horizontally or a predetermined picture can be zoomed. And a motion input device 49d is adapted to input data for moving the character back and forth or horizontally at a predetermined velocity.

An interface 48 is used for data relative to the above-described display device 45, microphone 46, loudspeaker 47 and input unit 49.

Figure 7:
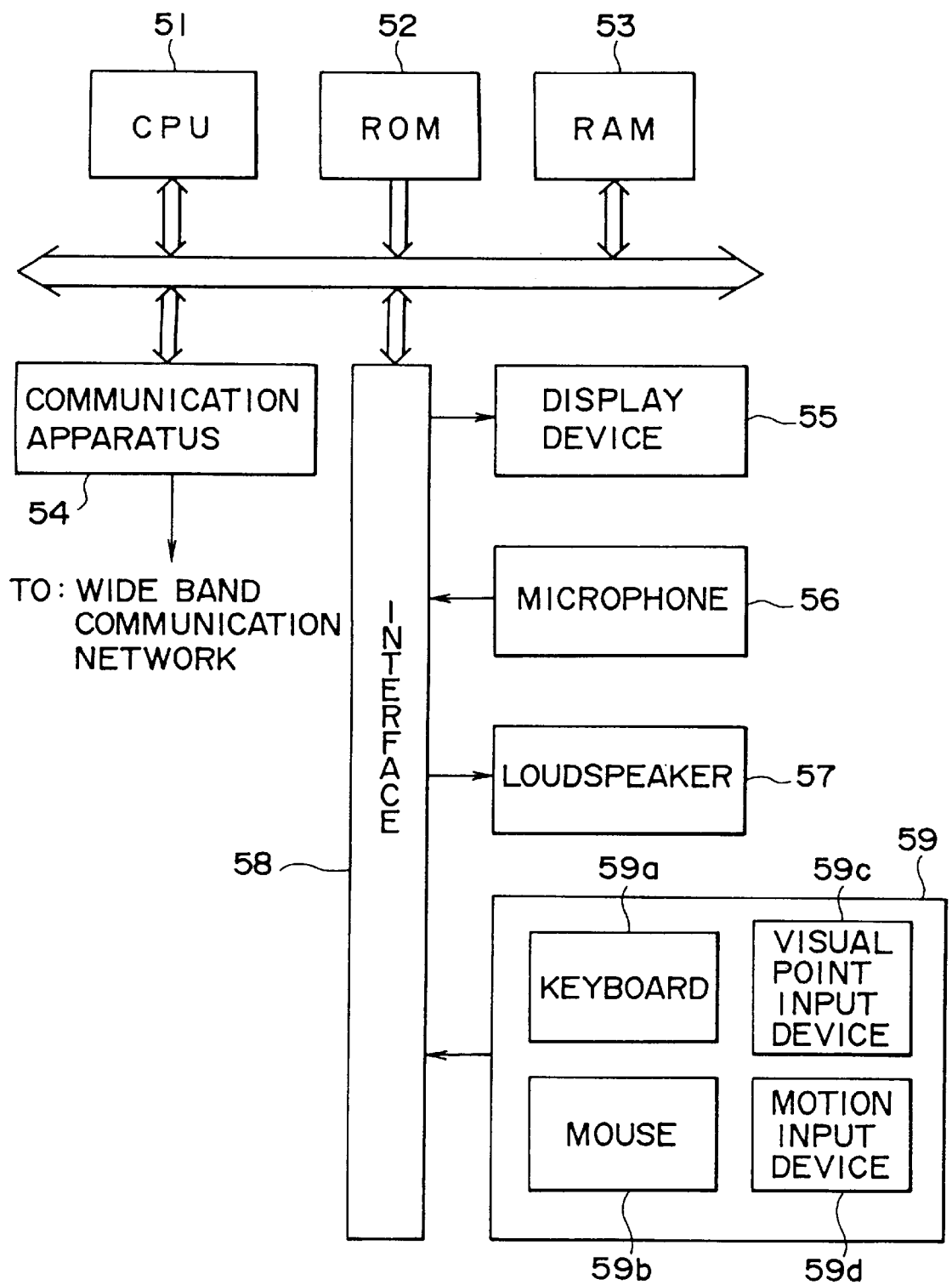
FIG. 7 is a block diagram showing an exemplary composition of a service provider terminal 14 in FIG. 4.

FIG. 7 shows an exemplary constitution of the service provider terminal 14. A CPU 51 to an input unit 59 included therein are fundamentally the same in construction as the CPU 41 to the input unit 49 in the aforementioned user terminal 13 of FIG. 6, and therefore a repeated explanation is omitted here.

Figure 8:
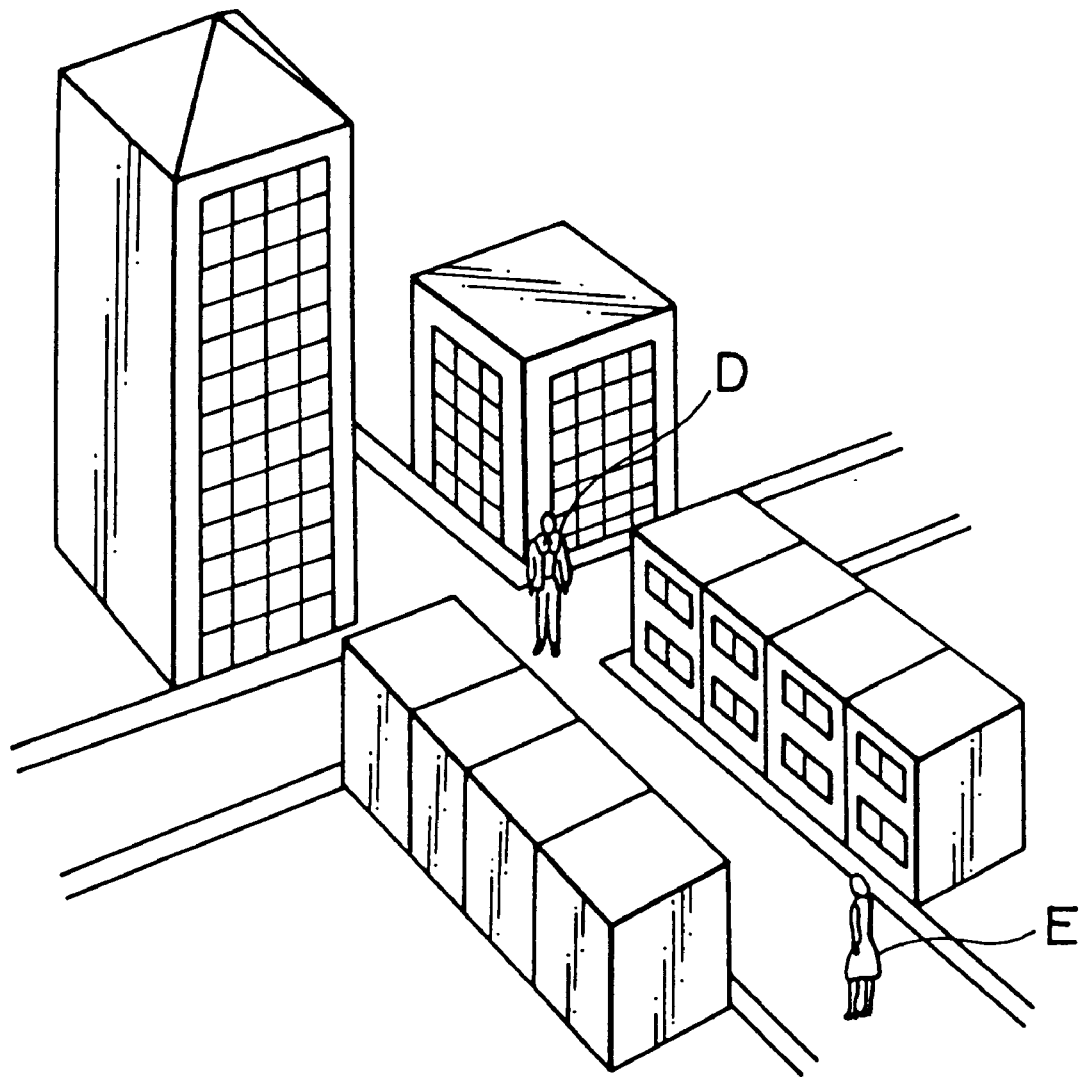
FIG. 8 is a diagram for specifically explaining a virtual reality space formed by the cyber-space system of FIG. 4.

FIG. 8 typically illustrates a typical model of a virtual reality space 10 provided from the server 11 shown in FIG. 4. As illustrated, this virtual reality space 10 includes a town, wherein a character E (e.g., character of one user terminal 13a) and a character D (e.g., character of the other user terminal 13b) are rendered movable in this town (virtual reality space).

Figure 9:
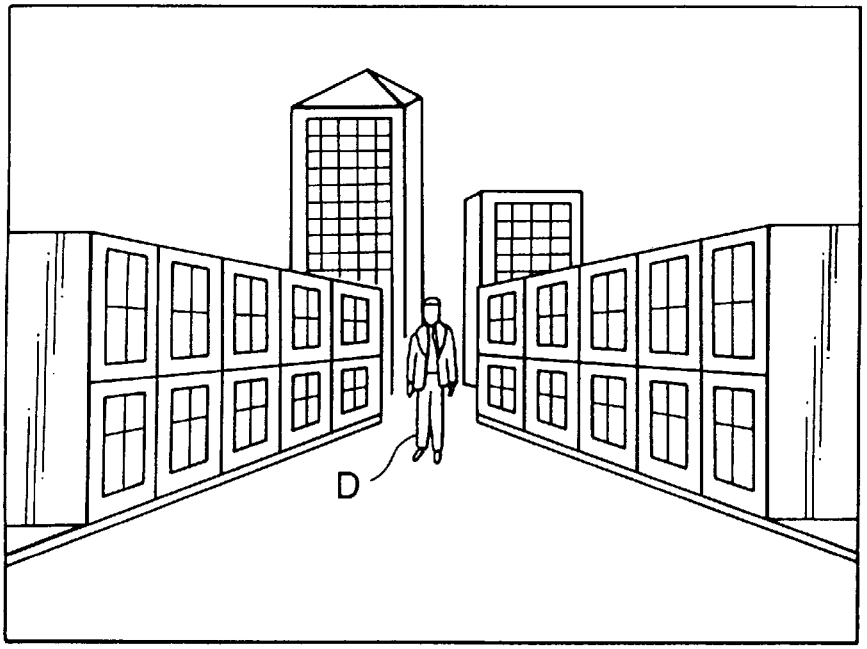
FIG. 9 is a diagram illustrating a visual field from a character C in FIG. 8.

The character E sees a picture as shown in FIG. 9 for example from its position and visual point of view in the virtual reality space. More specifically, the picture of FIG. 9 is supplied from the server 11 to the display device 25 of the user terminal 13a and then is displayed thereon. And when the visual point of view and the position of the character E are altered by manipulating the visual point input device 49c and the motion input device 49d, the three-dimensional picture, which forms the virtual reality space supplied from the server 11, is changed in accordance with such alteration.

Figure 10:
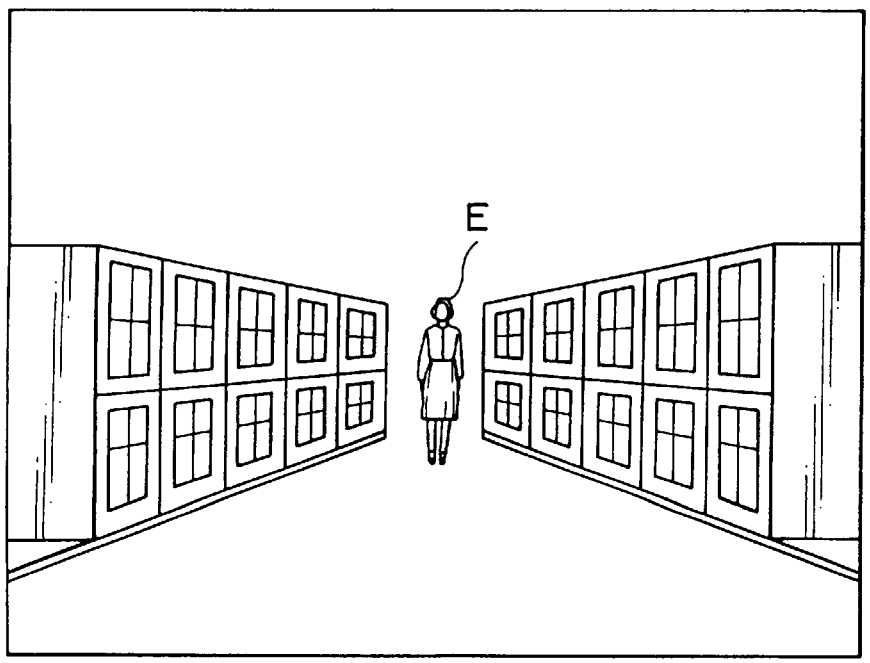
FIG. 10 is a diagram illustrating a visual field from a character D in FIG. 8.

Similar to above, the picture shown in FIG. 10 is supplied from the server 11 to the display device of the other user terminal 13b corresponding to the character D and then is displayed thereon. The picture thus displayed is changed by altering the visual point of view and the position of the character D.

In the example virtual reality arrangement of FIG. 8, character E is looking toward character D. Accordingly, as illustrated in FIG. 9, character D is displayed in the picture (virtual reality space) visually represented on the display device 25 of the user terminal 13a.

Similarly, in FIG. 8, character D is looking toward character E. Therefore, character E is displayed in the picture (virtual reality space) visually represented on the display device 25 of user terminal 13b, as shown in FIG. 10.

The service provider terminal 14 dominates a portion of the virtual reality space provided from the server. In other words, the service provider purchases a portion of the virtual reality space provided from a manager of the server 11.

Figure 11:
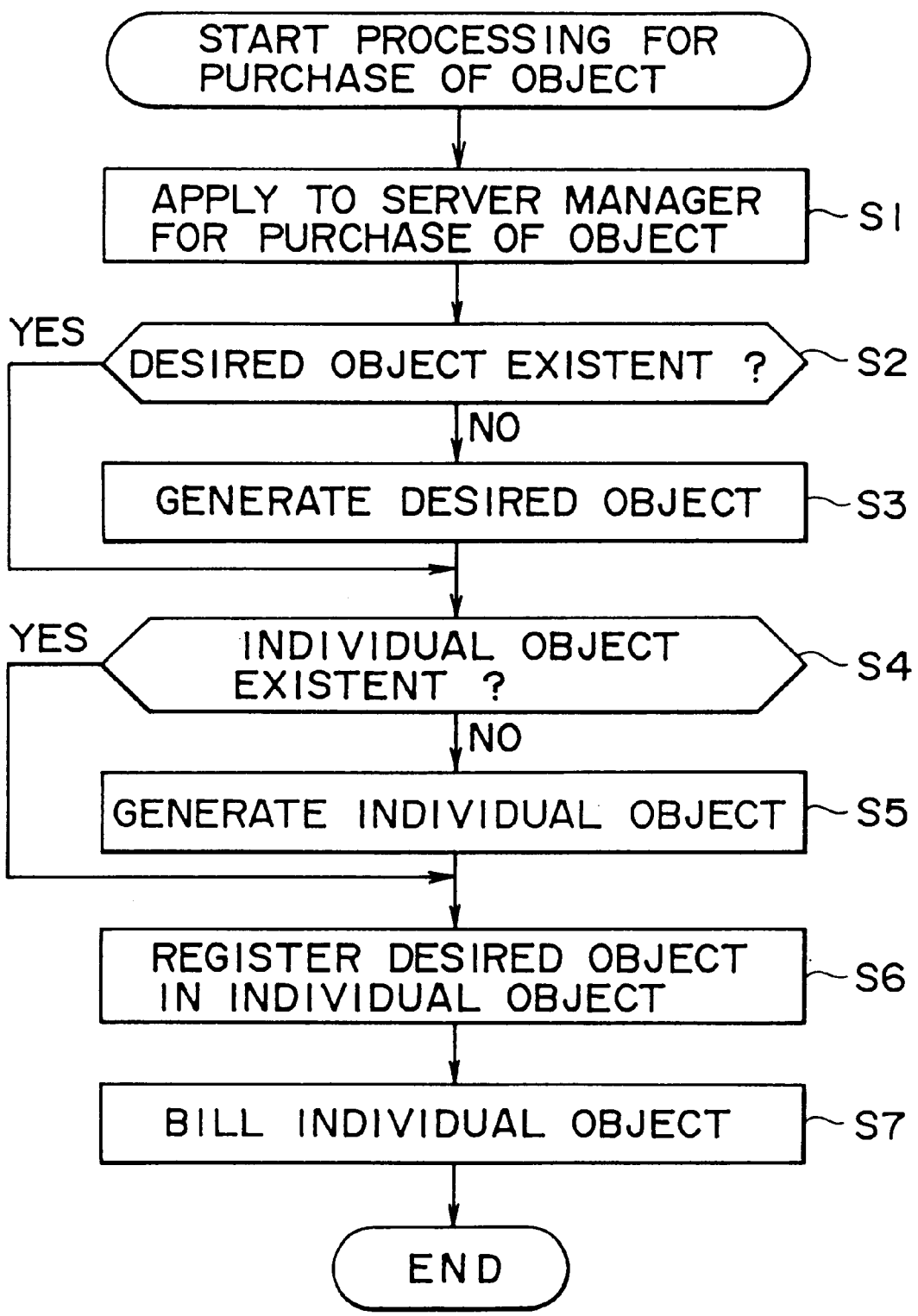
FIG. 11 is a flow chart for explaining a processing example executed to purchase an object.

FIG. 11 shows an example of processing such a purchase. Since the virtual reality space 10 is comprised of objects, any person who desires to provide a predetermined service to users purchases an object forming the virtual reality space.

First at step S1, an application for purchasing a desired object that forms the virtual reality space is made to the manager of the server 11. Subsequently at step S2, a decision is made as to whether the desired object to be purchased is an existing one or not. If the result of such a decision signifies that the desired object to be purchased is not existent, the operation proceeds to step S3, where the server 11 generates the desired object.

For example, in the case of constructing a building at the end of a road in a town formed of a virtual reality space and conducting a certain servicing business therein, the server newly generates a picture of the building (corresponding object) if the building picture has not been generated yet.

Meanwhile, when the desired object for a purchase is an existing one, it is not necessary to newly generate a corresponding object, so that the process at step S3 is skipped.

Thereafter the operation proceeds to step S4, where a decision is made as to whether an individual object corresponding to the purchase applicant has already been generated or not in the virtual reality space 10. If the result of such a decision signifies no generation of an individual object, the operation proceeds to step S5 to generate an individual object of the purchase applicant.

This individual object is similar to a user object which corresponds to, e.g., the aforementioned user terminal 13, and various data of the relevant individual are stored therein. And various processes in the virtual reality space of that individual are executed entirely by using the individual object.

The reason for generation of an individual object corresponding to an owner of the object to be purchased is based on an attempt to achieve easy management of every object owner in the virtual reality space 10. Since merely a single individual object is existent with regard to each person, the process at step S5 is skipped in case the individual object has already been generated.

It follows therefore that, regarding the owner of the service provider terminal 14 for example, an individual object has already been generated.

Next the operation proceeds to step S6 to execute a process of registering, in the individual object, a desired object to be purchased. More specifically, the entire objects owned by the relevant individual are registered in the individual object. Accordingly, the server 11 can exactly know, by checking the individual object, the present owner of each object forming the virtual reality space 10.

Further the server 11 generates a list of the owners of the available objects so as to be capable of quickly detecting the owner of each available object. And there are also registered, on such a list, the available objects forming the pictures of the virtual reality space 10 and the individual objects corresponding to the owners thereof.

Subsequently the operation proceeds to step S7, where the server 11 executes a process of billing the individual object which corresponds to the owner of the available object. More specifically, information for specifying, e.g., the credit card used by the relevant individual in the real space is recorded in that individual object, and the server 11 issues an account bill to the object purchaser by using that credit card.

Figure 12:
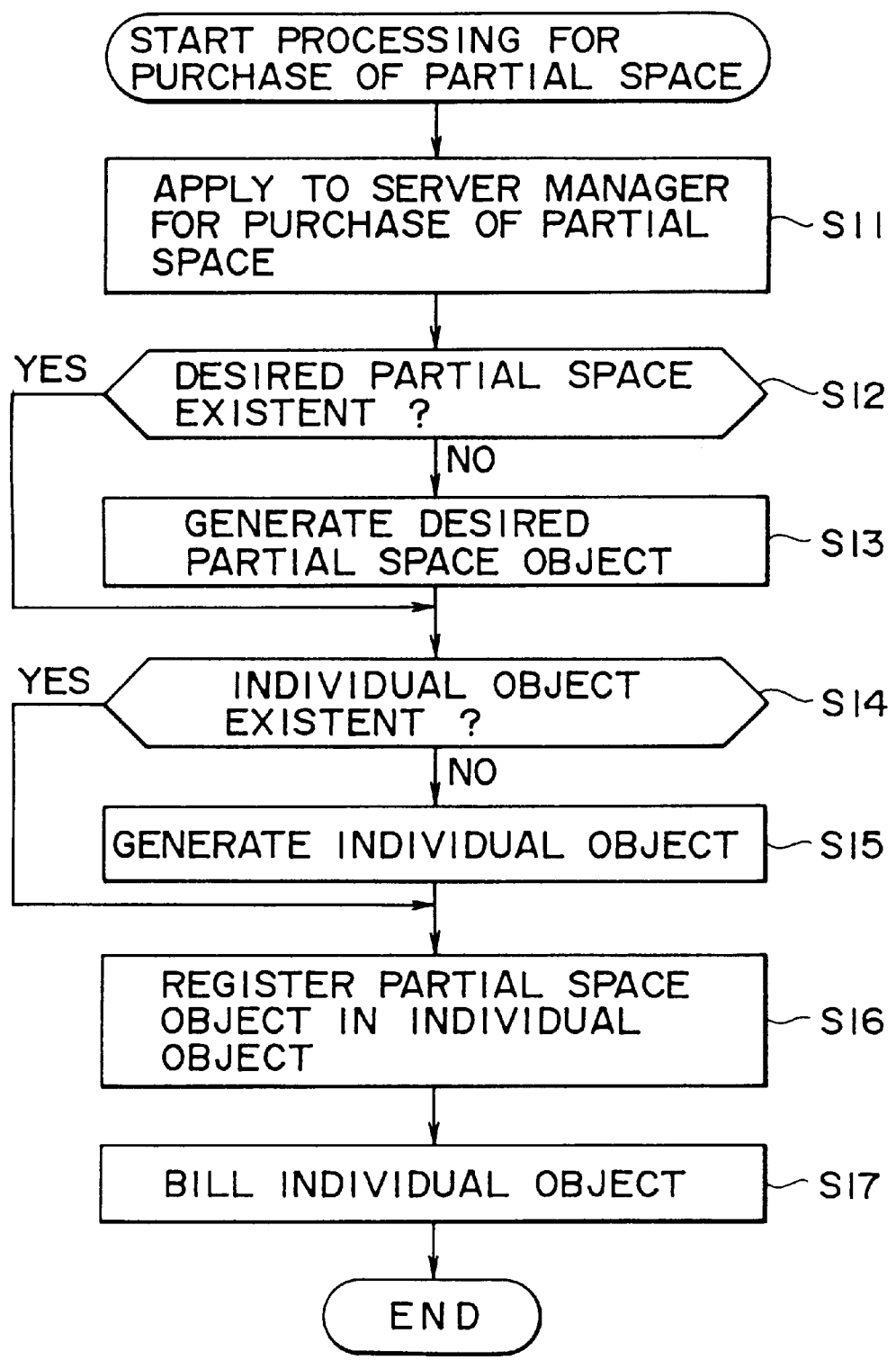
FIG. 12 is a flow chart for explaining a processing example executed to purchase a partial space.

In the embodiment of FIG. 11, a billing process is executed per object as a unit. However, it is also possible to execute a billing process per predetermined partial range of the space which constitutes the virtual reality space 10, as shown in FIG. 12.

In this case, first at step S11, an application for purchase of the partial space is made to the server manager, and then a decision is made at step S12 as to whether the partial space is an existing one or not. If the result of such a decision signifies that the relevant partial space is not existent, it is generated as an object at step S13. Meanwhile, if the result of the above decision signifies that the relevant partial space is an existing one, the process at step S13 is skipped.

Thereafter at step S14, a decision is made as to whether the individual object having applied for purchase of the partial space is already existent or not. And if the result of such a decision signifies no existence of that individual object, it is generated at step S15. Meanwhile, if the result of the above decision signifies that the individual object is already existent, the process at step S15 is skipped.

Subsequently at step S16, the information that the space object is owned by the relevant individual object is registered in the individual object, and also is registered on a management list of the server 11. Then at step S17, a process of billing the individual object is executed. This process is similar to the aforementioned one at step S7 in FIG. 11.

The service provider having thus purchased the partial space (object) of the virtual reality space 10 provides various services to users by utilizing the purchased space.

Figure 13:
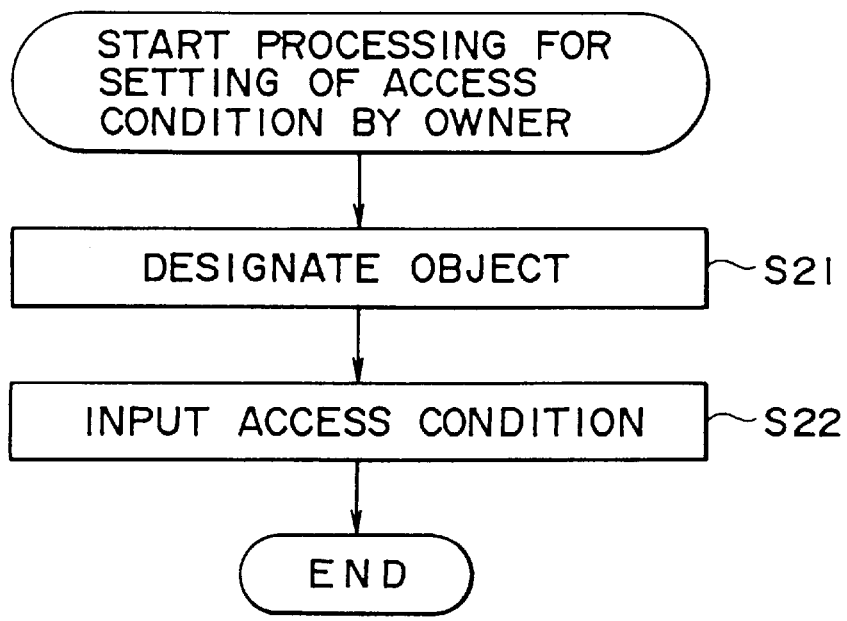
FIG. 13 is a flow chart for explaining a processing example executed to set an access condition by an owner.

The owner of each object is enabled to set a predetermined access condition to the object of his own. FIG. 13 shows a processing example in such a case. First at step S21, an object relative to setting of an access condition is designated. And at step S22, the access condition to that object is inputted.

Figure 14:
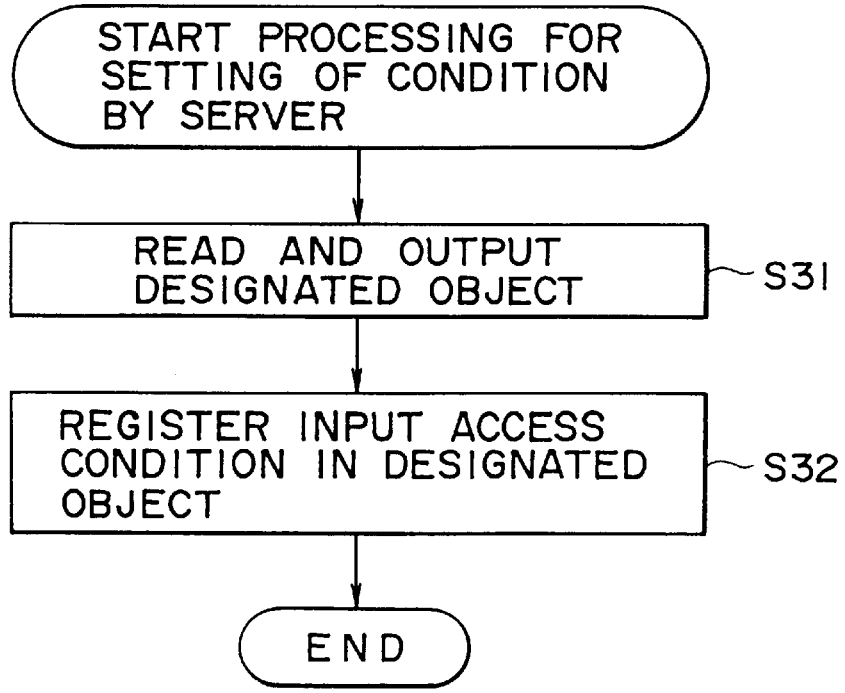
FIG. 14 is a flow chart for explaining a processing example executed by a server correspondingly to FIG. 13.

FIG. 14 shows a processing example of the server corresponding to the access condition setting which is executed in FIG. 13 by the object owner. First at step S31, the server 11 reads out the object designated at step S21 in FIG. 13 and then outputs the designated object to the corresponding service provider terminal 14.

Next at step S32 in FIG. 14, the server 11 registers in the object the access condition inputted from the owner at step S22 in FIG. 13.

Due to execution of the processing described above, the time zone, during which the relevant user terminal is permitted to enter the space managed by a predetermined service provider terminal 14, can be set between 9:00 a.m. and 9:00 p.m. for example. It is also possible to set a limited entrance condition for allowing only male or female, or to prescribe permission of an access merely to specified persons older than a predetermined age.

Figure 15:
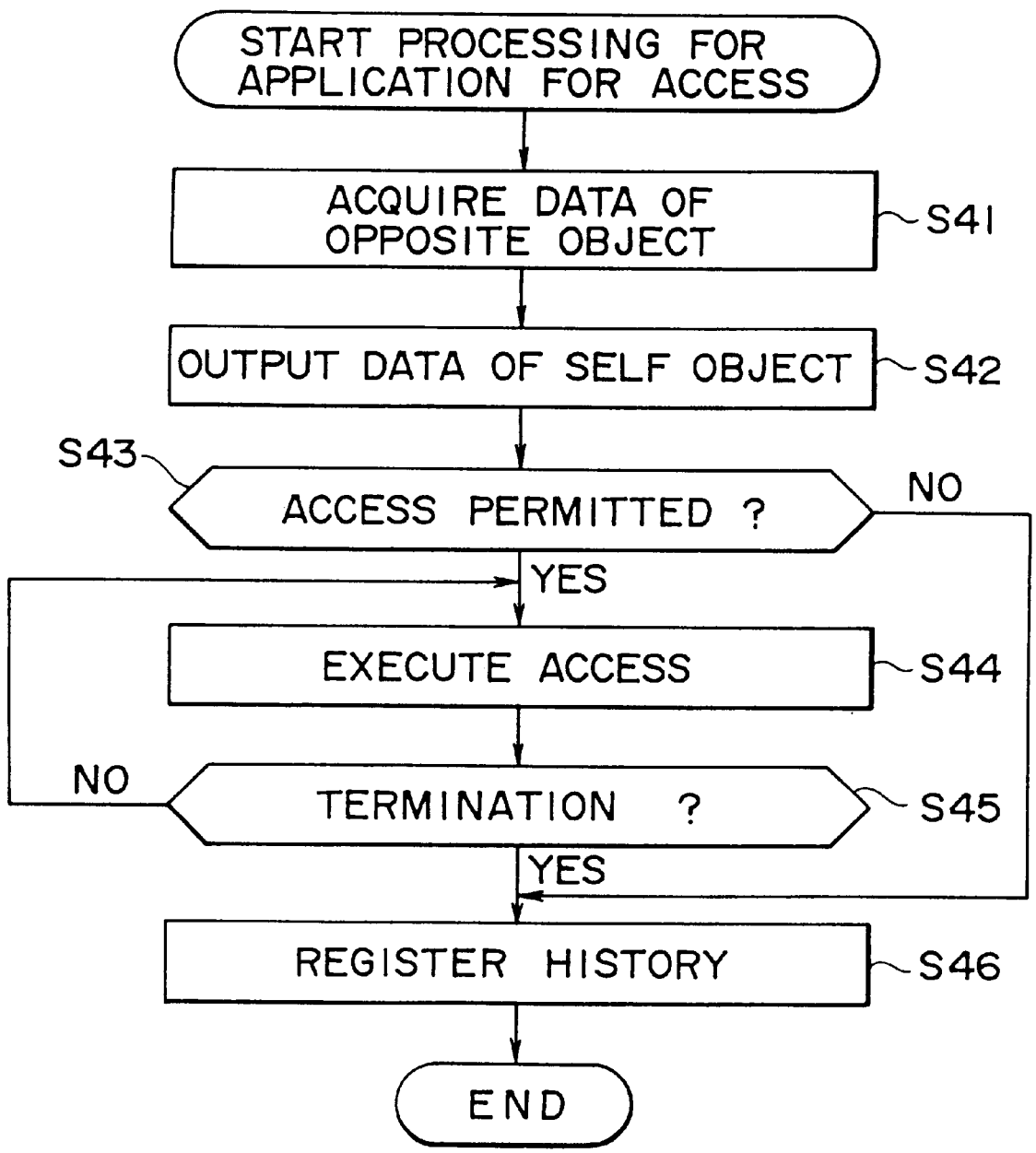
FIG. 15 is a flow chart for explaining a processing example executed to perform an access by an object.

FIG. 15 shows a processing example executed when a certain user object accesses a desired object (e.g., information object) forming the virtual reality space 10. First at step S41, data for specifying the desired object (information object) is acquired. Then at step S42, data for specifying the self object (user object) is outputted to the desired object (information object).

Subsequently the operation proceeds to step S43, where a decision is made as to whether an access permit signal for permitting an access has been inputted or not from the information object. And if the result of such a decision signifies an input of the signal, the operation proceeds to step S44 to execute an access. Namely, provision of desired information is received from the information object. Then at step S45, the process at step S44 is repeated until an access termination command is inputted.

When the result of the decision at step S43 signifies supply of an access inhibit signal from the accessed information object, the process at step S44 is skipped. That is, no access is permitted in this case to the relevant information object.

Next the operation proceeds to step S46 to execute a process of history registration. More specifically, after execution of an access, the accessed information object and the time thereof and so forth are registered in the user object. Even in the case of inhibition of an access, the access-tried information object, the time thereof and the information representing inhibition of an access are registered as a history in the user object.

Figure 16:
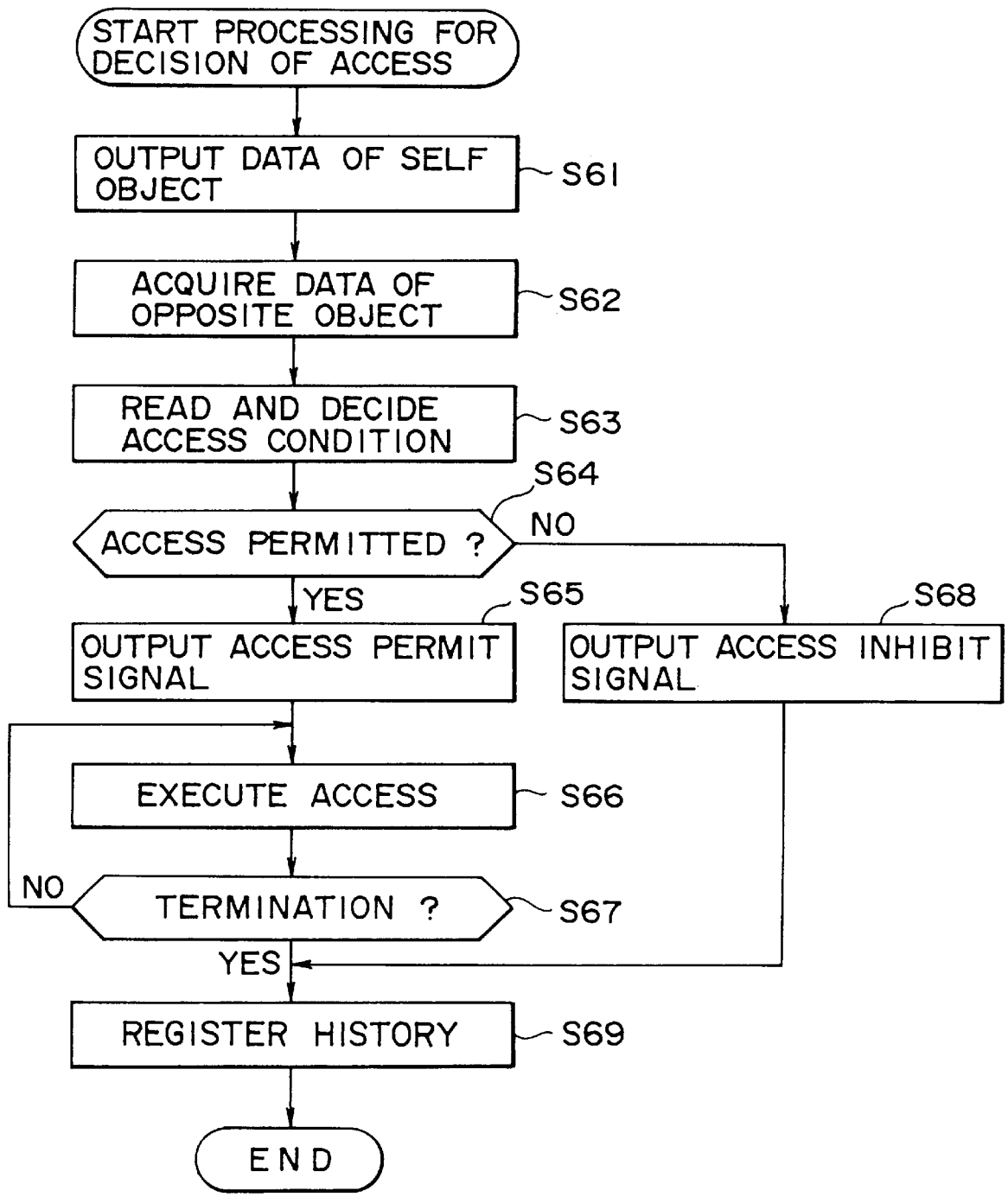
FIG. 16 is a flow chart for explaining a processing example executed by an accessed opposite object.

FIG. 16 shows a processing example of the accessed information object corresponding to the process of the user object shown in FIG. 15. First at step S61, data for specifying the self object (information object) is outputted to the other object (user object). This data is acquired by the user object at step S41 in FIG. 15. Meanwhile, the data outputted from the user object at step S42 in FIG. 15 to specify the user object is acquired by the information object at step S62 in FIG. 16.

Subsequently the operation proceeds to step S63, where the access condition registered previously in the information object is read out therefrom in accordance with the processing procedures shown in FIGS. 13 and 14, and then such condition is compared with the data acquired at step S62. For example, when the registered access condition prescribes that the age should be over twenty, an access is refused if the age registered in the relevant user object is under twenty. In contrast with the above, there is permitted an access from any user object where the registered age is over twenty. In another exemplary case where the time zone relative to permission of an access is preset between 9:00 a.m. and 9:00 p.m., any access within this time zone is permitted, while any other access without such time zone is not permitted.

Thereafter the operation proceeds to step S64, where a decision is made, in accordance with the result of the comparison at step S63, as to whether the access is permitted or not. And if the decision signifies permission of the access, the operation proceeds to step S65, where an access permit signal is outputted to the other object (user object). Then the operation proceeds to step S66 to execute the access. In this stage of the operation, the desired information can be provided to the other object. The process at step S66 is executed repeatedly at step S67 until its decision indicates input of an access termination command.

Meanwhile, if the result of the decision at step S64 signifies no permission of the access, the operation proceeds to step S68, where an access inhibit signal is outputted to the other object (user object).

When the decision at step S67 signifies input of an access termination command and after an access inhibit signal is outputted at step S68, the operation proceeds to step S69 to execute a process of history registration. More specifically, if the access is permitted, the relevant user object, the access time and so forth are registered as a history. Meanwhile, in the case of no permission of the access, the relevant user object, the reason for refusal of the access and so forth are registered as a history.

In the manner described above, each user object accesses the partial space (information object) of the virtual reality space and receives required information therefrom. When the partial space, to which an access has been permitted, is an electric appliance shop for example, it is possible for the user to designate a desired commodity, which is exhibited in the electric appliance shop, while displacing his character E thereto by means of the mouse 49b or the like and to receive provision of further detailed information about the designated commodity.

More specifically, when the user designates a selected one of the pictures being displayed on the display device 45 by manipulating the mouse 49b of the user terminal 13, a signal for specifying the designated picture is outputted to the server 11 via the communication apparatus 44. Then the server 11 reads out from the memory device 12 the picture corresponding to the designated commodity, and outputs the picture to the display device 45 of the user terminal 13 to thereby display the picture. Thus, each user can obtain further detailed information about the selected commodity.

And when a purchase of the commodity is desired, the user contacts the service provider terminal 14 with regard to the purchase while outputting an audio signal thereto by manipulating the microphone 46 of the user terminal 13. Then the audio signal is delivered to the service provider from the loudspeaker 57 of the service provider 14. Likewise, the service provider outputs a predetermined message as an audio signal via the microphone 56 and delivers the signal via the loudspeaker 47 of the user terminal 13. Consequently, the user and the service provider can converse with each other bi-directionally by the audio signals.

In response to the application for a purchase of the commodity from the user, the service provider arranges for shipment of the commodity with execution of a process to issue an account bill to the user. Thus, each user is capable of accessing a desired partial space (object) and receiving provision of a predetermined service.

In the above embodiment, a desired object (partial space) forming the virtual reality space is purchased by a predetermined person. However, it may be so modified that the object is rented from the server 11 to a predetermined person or from an owner, who has purchased the object from the server manager, to a predetermined person.

In the partial space (object) where a greater amount of sales is expectable due to the conduct of economic activity which is closely connected with real space and is attained by utilizing the virtual reality space as mentioned, the economic value is raised in real space as well. Consequently an added value is generated in the partial space (object), which can thereby be transacted in business.

With regard to the object (partial space) where such added value can be generated, it may be possible to bill the purchaser not for the object (partial space) itself but for, e.g., the time or frequency of its use. However, in the latter case, the economic value attained by the efforts of the user through sufficient practical utilization of the virtual reality space is not connected with the value in real space, hence causing an impediment to generation of an added value. It is therefore preferred that billing be executed per unitary object (partial space).

Figure 17:
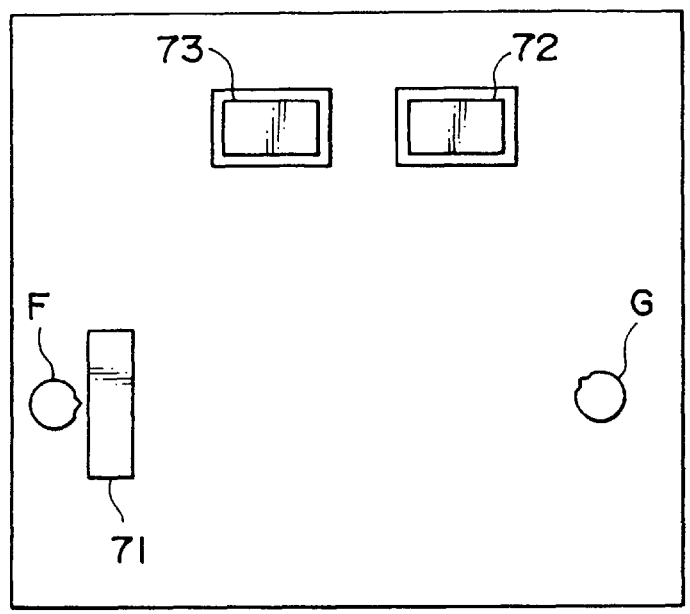
FIG. 17 is an explanatory diagram illustrating an allocated space portion in the cyber-space system of the embodiment shown in FIG. 4.

FIG. 17 is a plan view of a virtual reality space (a room in a building) occupied by a service provider having a service provider terminal 14. In this embodiment, one room in the building is allocated to this service provider, and two television sets 72 and 73 are installed in the space (in the building), and further a counter 71 is disposed in front of the television set 73 in its oblique rightward direction. The service provider having the service provider terminal 14 places his character F behind the counter 71. It is a matter of course that the character F is movable to a desired position by manipulation of the motion input device 59d in the service provider terminal 14.

Figure 18:
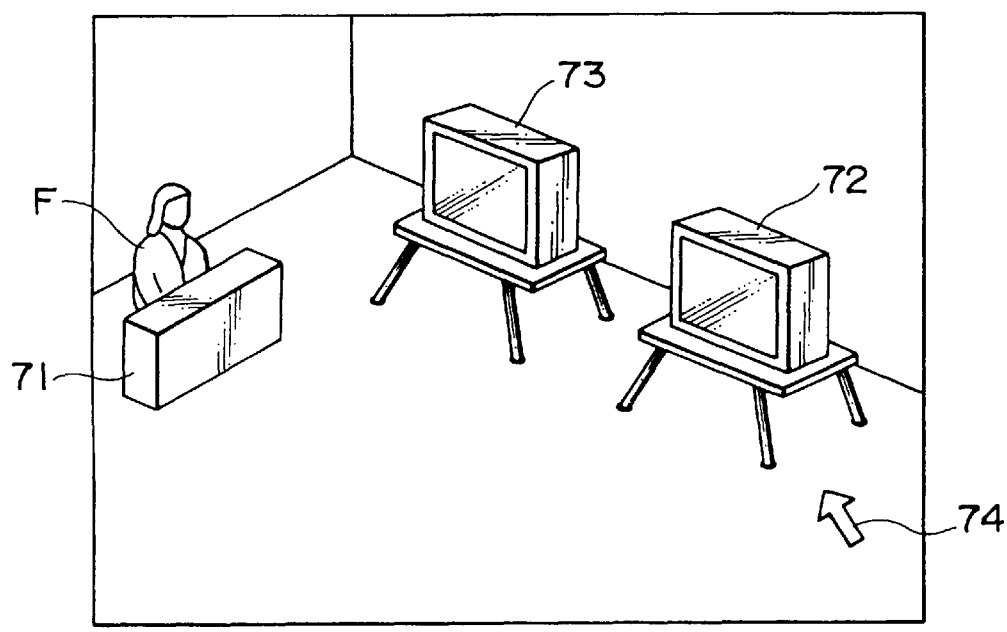
FIG. 18 illustrates a visual field seen from a character G shown in FIG. 17.
Figure 19:
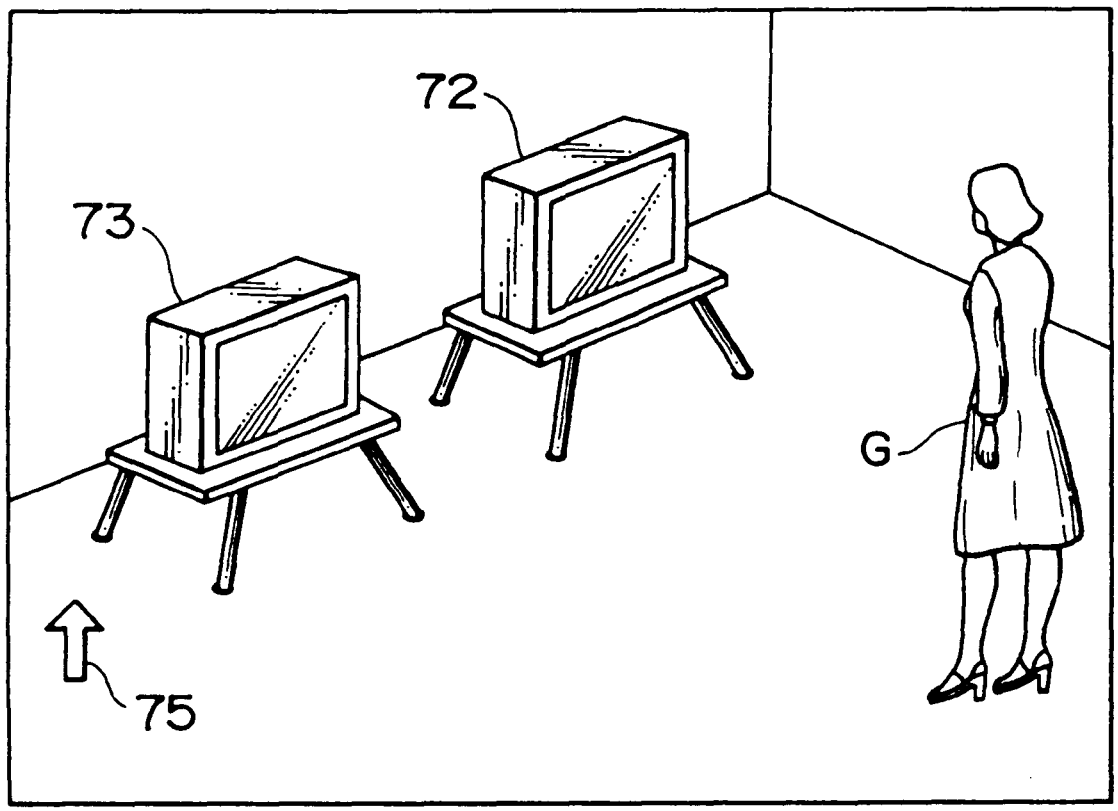
FIG. 19 illustrates a visual field seen from a character F in FIG. 17.

Suppose now that a character G of the user terminal 13 has entered this electric appliance store, as illustrated in FIG. 17. Then, on the display device 45 of the user terminal 13, a picture as shown in FIG. 18 for example is displayed correspondingly to the position and the visual point of view of the character G. Meanwhile on the display device 55 of the service provider terminal 14, a picture as shown in FIG. 19 is displayed. As illustrated in FIGS. 18 and 19, the character F is displayed in the picture viewed from the character G, while the character G is displayed in the picture viewed from the character F, respectively.

Also in the picture viewed from the character G, as illustrated in FIG. 18, there is displayed a cursor 74 which is used for designating a desired picture from the user terminal 13. Similarly, as illustrated in FIG. 19, a cursor 75 is displayed for designating a desired picture from the service provider terminal 14.

If the character G is moved to the vicinity of the television set 72 or 73 by manipulating the motion input device 49d of the user terminal 13, a picture corresponding to the position and the visual point thereof is displayed on the display device 45, whereby the user is enabled to observe the television set 72 or 73 in the same manner as in observing an actual television set.

When the user displaces the cursor 74 to click the same on the character F by manipulating the mouse 49b, a conversation proposal signal is transmitted to the service provider terminal 14 corresponding to the character F. In this case, an audio signal can be outputted from the service provider terminal 14 via the microphone 56 to the loudspeaker 47 of the user terminal 13 corresponding to the character G.

Similarly, when an audio signal is inputted from the microphone 46 of the user terminal 13, the audio signal of the user can be delivered to the loudspeaker 57 of the service provider terminal 14. In this manner, the two characters are enabled to have an ordinary conversation by voice with each other.

In this embodiment, a conversation can be proposed from the character F (service provider terminal 14) to the character G (user terminal 13) as well.

If the cursor 74 is displaced and clicked on the picture of, e.g., the television set 72 in the user terminal 13, it is possible to receive from the server 11 further detailed explanatory information (provided information) with regard to the television set 72. The picture in this case may be either a three-dimensional picture or a planar two-dimensional picture.

The manipulation for designating a desired picture can be performed also from the side of the service provider terminal 14. It is therefore possible to achieve positive provision of the explanatory information about the relevant television set from the service provider side to the user.

When the service provider designates the character G by means of the cursor 75 by manipulating the mouse 59b, a picture corresponding to the position and the visual point of view of the character G, i.e., the same picture as the one being currently displayed on the display device 45 of the user terminal 13, can be displayed on the display device 55 of the service provider terminal 141. Consequently the service provider is enabled to know what the user (character G) is presently looking at, whereby it is rendered possible to provide to the user the information regarding the precise point that the user wants to know.

In response to the explanation or the provision information (explanatory information) thus received, the user can actually purchase, e.g., the television set 72 if satisfied with it. In this case, the user applies to the service provider 14 for a purchase via the character F. Then the user transmits the number of his credit card or the like via the character G to the service provider terminal 14 (character F) and asks debit of the amount equivalent to the price of the commodity. The service provider of the service provider terminal 14 executes a predetermined process for debit of the amount and arranges delivery of the commodity ordered for a purchase.

The picture provided in the virtual reality space is a high-precision one produced fundamentally by computer graphics. Therefore, viewing the picture from every angle realizes close observation thereof similar to observation of an actual commodity from a desired angle, hence enabling confirmation of the commodity with enhanced certainty.

Thus, a variety of shops, movie theaters, playhouses and so forth can exist in the virtual reality space. And since commodities can actually be sold in each shop, economic value is created in a practical manner and in a favorably conditioned location (where many user characters may enter). Such virtual reality space can actually be sold, bought or rented. Accordingly, this system is entirely different from so-called television shopping or the like.

Now further concrete processing operations of the above-described user terminal 13, server 11 and service provider terminal 14 will be explained below with reference to flow charts of FIGS. 20 to 32.

Figure 20:
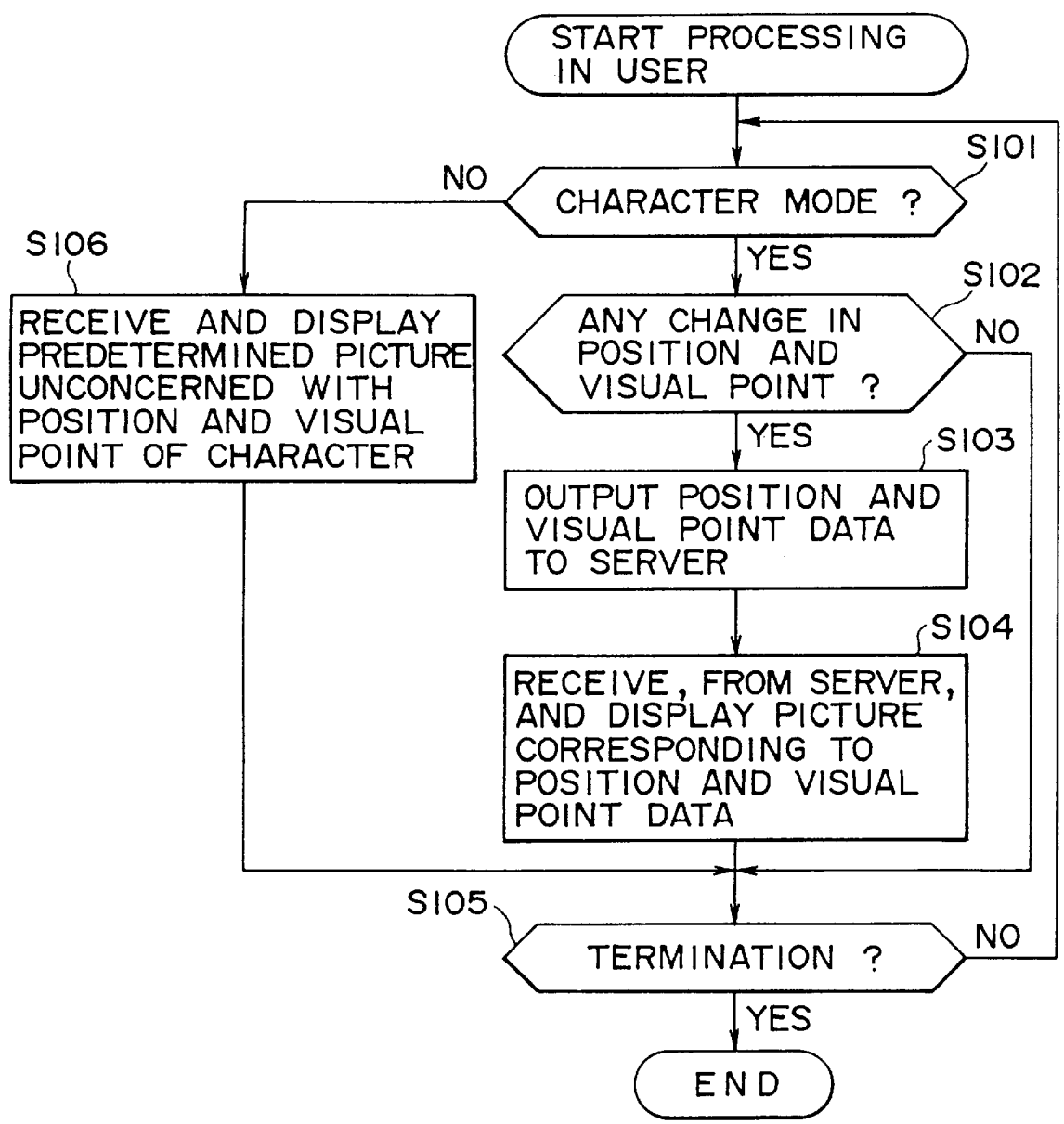
FIG. 20 is a flow chart for explaining a processing example executed when the user terminal 13 in FIG. 4 receives provision of a picture from the server 11.

FIG. 20 shows a processing example of the user terminal 13. First at step S101, a decision is made as to whether the operation is in a character mode or not. This character mode is one for receiving a picture corresponding to the position and the visual point of view of the aforementioned character.

Either a character mode or a non-character mode can be set by manipulating a predetermined key of the keyboard 49a in the input unit 49 of the user terminal 13.

When the result of the above decision signifies that the character mode is set, the operation proceeds to step S102, where a decision is made as to whether the position or the visual point of view of the character corresponding to the user terminal 13 has been changed or not. If a change of the position or the visual point of view of the character is commanded by manipulating the visual point input device 49c or the motion input device 49d, the operation of the CPU 41 having received such a command via the interface 48 proceeds to step S103, where a process of outputting the position data and the visual point data to the server 11 is executed. More specifically, the CPU 41 controls the communication apparatus 44 in response to the input data received via the interface 48 from the visual point input device 49c and the motion input device 49d, thereby outputting the received data to the server 11.

In the server 11, such data is acquired at step S112 of FIG. 21 which will be described later, and then picture data corresponding to the above data is outputted to the user terminal 13 at step S113.

At step S104, the user terminal 13 executes a process of receiving the picture data supplied from the server 11 and displaying the received data. More specifically, when the picture data corresponding to the position and the visual point of view of the character is supplied from the server 11 via the communication apparatus 44, the CPU 41 outputs the picture data to the display device 45 via the interface 48 to display the data thereon. Consequently there is displayed, on the display device 45, the picture (virtual reality space) corresponding to the visual point of view and the position inputted by manipulating the visual point input device 49c and the motion input device 49d.

Thereafter the operation proceeds to step S105, where a decision is made as to whether a command for termination has been inputted by manipulating, e.g., a predetermined key of the keyboard 49a. Unless termination is commanded, the operation returns to step S101, and the processes posterior thereto are executed repeatedly.

Meanwhile, if the result of the decision at step S101 signifies that the character mode is not set (i.e., the non-character mode is set), the operation proceeds to step S106, where the CPU 41 outputs to the display device 45 a predetermined picture received via the communication apparatus 44 and is unconcerned with the position and the visual point of view of the character, so that such a picture is displayed on the device 45.

Figure 21:
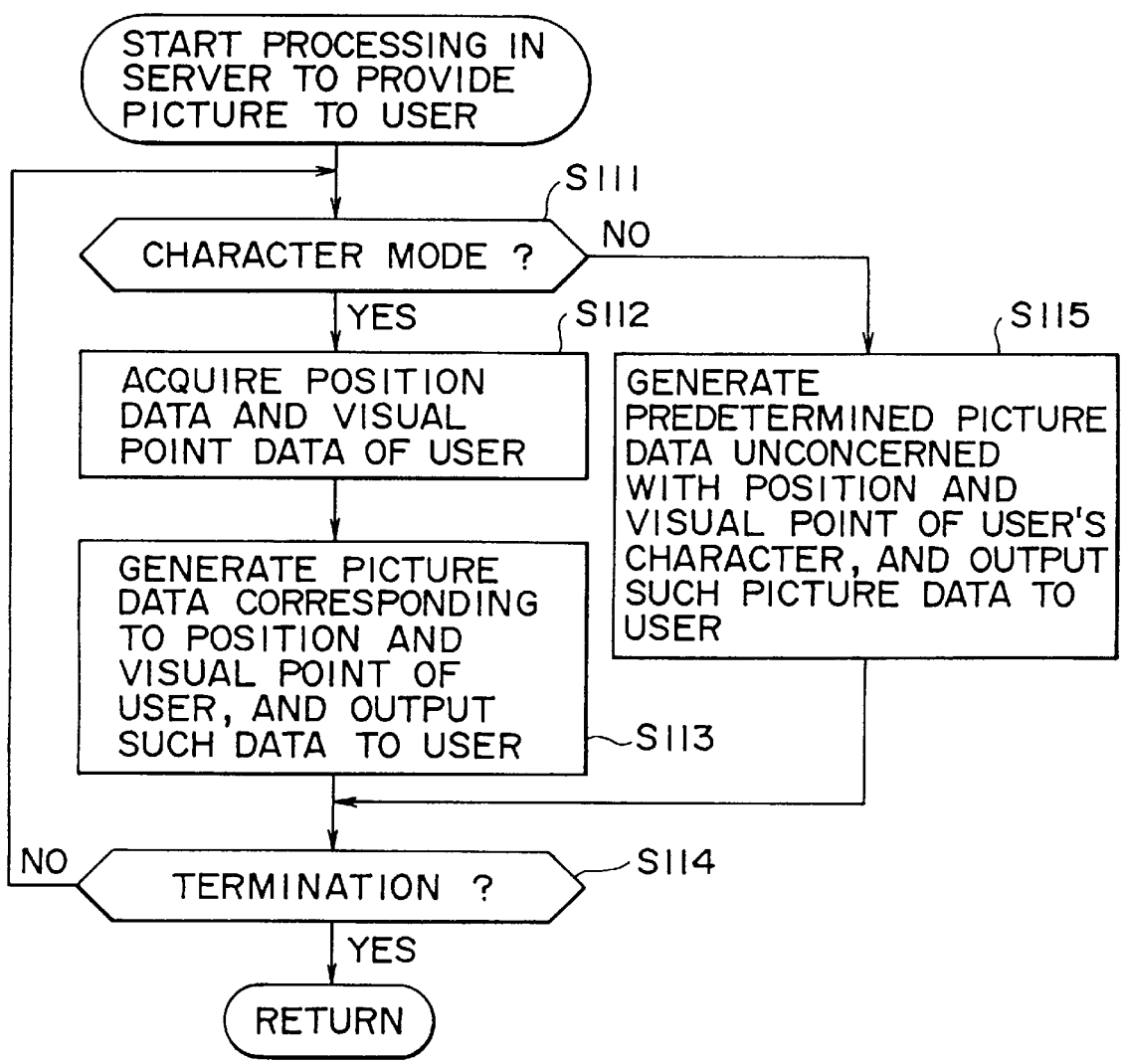
FIG. 21 is a flow chart for explaining a processing example executed in the server 11 correspondingly to the process in the user terminal 13 of FIG. 4.

FIG. 21 shows a processing example of the server 11 corresponding to that of the user terminal 13 shown in FIG. 20. First at step S111, a decision is made as to whether the operation is in a character mode or not. If the result of such decision signifies the character mode, the operation proceeds to step S112, where position data and visual point of view data of the user are acquired. More specifically, as described above, the data representing the position and the visual point of view of the character of the user are transmitted from the user terminal 13 in accordance with the process at step S103 in FIG. 20, and such data are acquired by the server 11 via the communication apparatus 24. When necessary, these data are supplied to and stored in the RAM 23.

Subsequently the operation proceeds to step S113, where the CPU 21 reads out from the memory device 12 the picture data corresponding to the position and the visual point of view of the user's character stored in the RAM 23 and then performs a calculation for correction if necessary, thereby generating the picture data representative of the position and the visual point of view. And thereafter the picture data is transmitted, with control of the communication apparatus 24, to the user terminal 13 via the wide band communication network 15.

Next the operation proceeds to step S114, where a decision is made as to whether a termination command has been inputted or not from the user terminal 13. If the result of this decision signifies no input of a termination command, the operation returns to step S111, and the processes thereafter are executed repeatedly. That is, the picture data corresponding to the position and the visual point of view of the character are provided continuously to the user terminal 13 until a termination command is inputted.

Meanwhile, if the result of the decision at step S111 signifies no character mode, the operation proceeds to step S115, where a predetermined picture independent of the position and the visual point of view of the user's character is generated and then is outputted to the user. Thereafter the operation proceeds to step S114 and, if a termination is not commanded, the operation returns to step S111 and the processes posterior thereto are executed repeatedly.

A flow chart depicted in FIGS. 22a, 22b and 22c shows a processing example of the service provider terminal 14. First at step S121, shown in FIG. 22a, a decision is made as to whether the operation is in a character mode or not. When the result of such decision signifies the character mode, the operation proceeds to step S122, where a decision is made as to whether the position or the visual point of view of the character corresponding to the service provider terminal 14 has been changed or not. In other words, a decision is made as to whether the visual point input device 59c or the motion input device 59d has been manipulated or not. And if the result of the above decision signifies manipulation, the operation proceeds to step S123, where a process of outputting the position data and the visual point data corresponding to such manipulation is executed.

More specifically, the CPU 51 controls the communication apparatus 54 in response to the input data received via the interface 58 from the visual point input device 59c and the motion input device 59d, thereby outputting the received data to the server 11 via the wide band communication network 15.

In the server 11, such input data is acquired at step S153 of FIG. 23 which will be described later, and then picture data corresponding to the above data is outputted at step S154.

At step S124, the service provider terminal 14 executes a process of receiving the picture data supplied from the server 11 and displaying the received data. More specifically, when the picture data corresponding to the position and the visual point of the character is supplied from the server 11 via the communication apparatus 54, the CPU 51 outputs the picture data to the display device 55 via the interface 58 to display the data thereon.

Meanwhile, if the result of the decision at step S122 signifies no change in both the position and the visual point of the character, the processes at steps S123 and S124 are skipped.

Thereafter the operation proceeds to step S125, shown in FIG. 22b, where a decision is made as to whether the picture corresponding to the position and the visual point of view of the character of the service provider terminal 14 is to be changed (switched) or not to the picture corresponding to the position and the visual point of view of the character of the user terminal. That is, the service provider needs to provide the information representative of the picture which is attracting the attention of the user. Usually the character of the service provider and the character of the user are not watching the same picture. Therefore, in explaining any commodity for the user, more exact provision of the required information for the user is rendered possible if the service provider is aware of the picture corresponding to the position and the visual point of view of the user's character.

For this reason, the system is so contrived that the service provider terminal 14 is capable of receiving the same picture as the one corresponding to the position and the visual point of view of the user's character. In this case, a command is transmitted to the server 11 by manipulating, e.g., the keyboard 59a of the service provider terminal 14 so that provision of the picture corresponding to the position and the visual point of the user's character can be received.

Then the operation proceeds to step S126, where there is designated the picture based on the position and the visual point of view of the relevant user's character. More specifically, since two or more users' characters can exist at the same time, a process is executed to designate which user's character is to be provided.

This designation is performed by manipulating the mouse 59b for example to displace the cursor 75 in FIG. 19 and to click the same on the character of the relevant user (e.g., character G in the embodiment of FIG. 19).

Subsequently the operation proceeds to step S127, where a decision is made as to whether the relevant user's character exists or not in a predetermined partial space. That is, the allocated space for providing the service by the service provider is a portion of the virtual reality space. And outside such partial space, even the service provider is merely a user. The portion of the virtual reality space outside the partial space of the service provider being watched by any user is private to that user, and it is not necessary to provide the service provider with a picture which is exactly identical with the picture the user is watching. Therefore, when the service provider has designated any character outside the partial space allocated to the service provider, the operation proceeds to step S128 where an error process is executed. And the CPU 51 outputs a message such as "Designation ineffective" to the display device 55 to thereby display the message thereon.

Meanwhile, if any user's character within the predetermined partial space has been designated, the operation proceeds to step S129, where the CPU 51 outputs to the server 11 required data (e.g., position data) for specifying the user's character.

In response to the data thus received, the server 11 outputs to the service provider terminal 14 the data corresponding to the position and the visual point of view of the designated user's character, at step S156 in FIG. 23 which will be described later.

In the service provider terminal 14, the picture data outputted from the server 11 is received at step S130 and then is delivered to the display device 55 to be displayed thereon. Accordingly, the service provider is enabled to know precisely which picture the user is currently watching.

Subsequently the operation proceeds to step S131, shown in FIG. 22c, where a decision is made as to whether a command for termination has been inputted or not by manipulating the keyboard 59a for example. If the result of such decision signifies no input of a termination command, the operation proceeds to step S132, where a decision is made as to whether the character mode is set or not. And when the result of this decision signifies the character mode, the operation proceeds to step S133, where a decision is made as to whether the picture being presently displayed needs to be changed to a picture of another visual point.

More specifically, when a command for changing to a picture of a different visual point has been inputted by manipulating, e.g., the keyboard 59a of the service provider terminal 14, the operation proceeds to step S135, shown in FIG. 22b, where a decision is made as to whether the present picture is to be changed to the picture corresponding to the position and the visual point of the user's character. And if the result of this decision signifies a change to the picture corresponding to the position and the visual point of view of the user's character, the operation proceeds to step S126, where the user is designated, and then the ensuing processes are executed.

Meanwhile, when it is necessary to change the present picture to the picture corresponding to the position and the visual point of view of the service provider's character, the operation returns to step S122, shown in FIG. 22a, where a decision is made as to whether the position or the visual point of the service provider's character has been changed or not, and thereafter the ensuing processes are executed.

If it is not necessary to change the visual point of the present picture, the operation proceeds from step S133 to step S134, where a decision is made as to whether the present picture being displayed is the one corresponding to the position and the visual point of view of the service provider's character. When the picture corresponding to the position and the visual point of view of the service provider's character is presently displayed, the operation returns to step S122, and the ensuing processes are executed. And when the present picture being displayed is the one corresponding to the position and the visual point of view of the user's character, the operation proceeds to step S130, and the ensuing processes are executed repeatedly.

Meanwhile, if the result of the decision at step S121 signifies that the character mode is not set, the operation proceeds to step S136, where a predetermined picture independent of the position and the visual point of view of the service provider's character or with those of the user's character is supplied from the server 11. Then this picture is outputted to the display device 55 to be displayed thereon. Thereafter the operation proceeds to step S131, and the ensuing processes are executed repeatedly.

In the manner described above, the service provider can receive the provision of either the picture corresponding to the position and the visual point of view of the service provider's character or the picture corresponding to the position and the visual point of view of the user's character which is within the partial virtual reality space allocated to the service provider.

Figure 23:
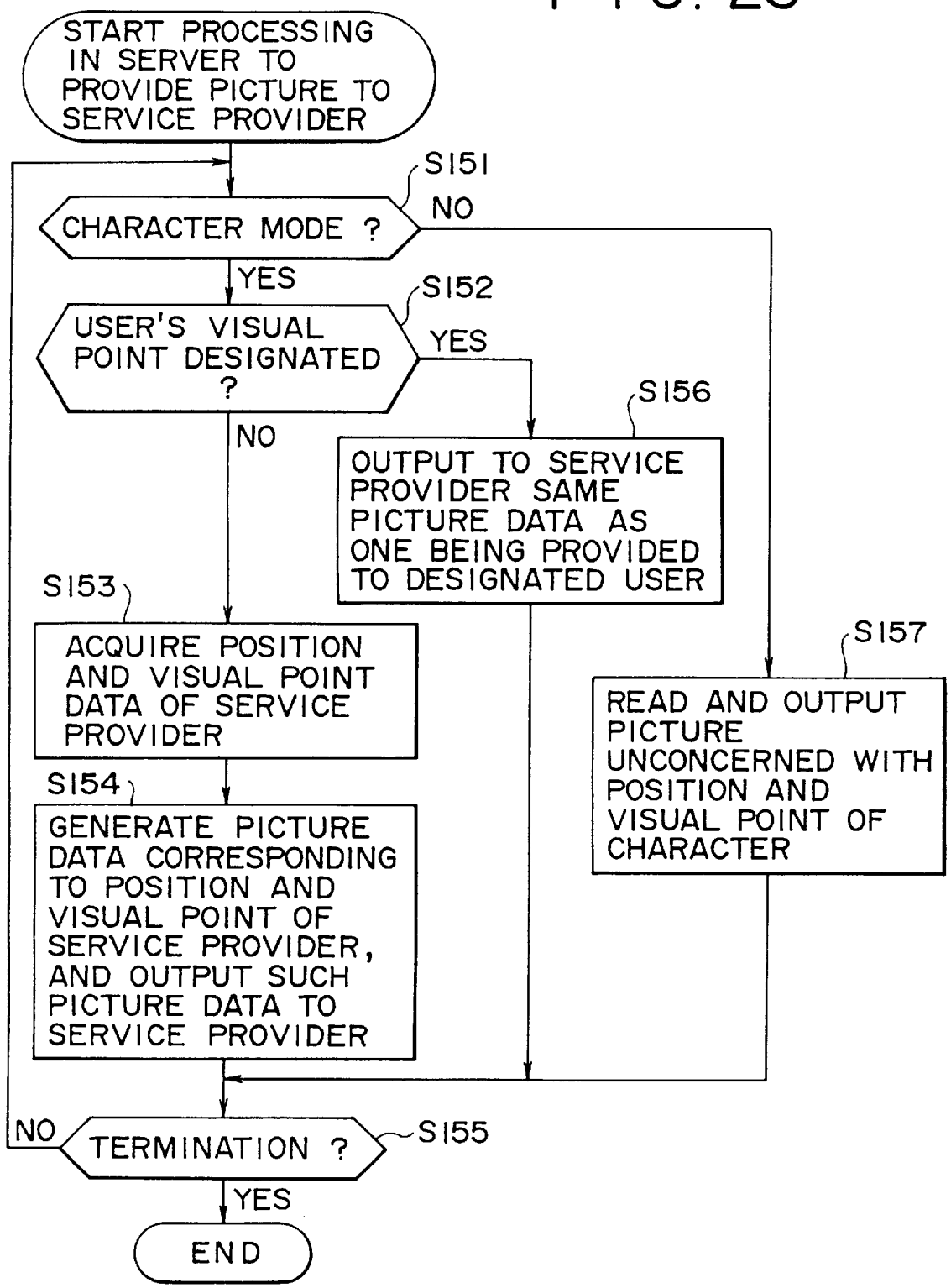
FIG. 23 is a flow chart for explaining a processing example executed in the server 11 corresponding to the process of FIG. 22 in the service provider terminal 14.

FIG. 23 shows a processing example of the server 11 executed in the case of providing the picture of FIG. 22 to the service provider terminal 14. First at step S151, a decision is made as to whether the operation is in a character mode or not. If the result of such decision signifies the character mode, the operation proceeds to step S152, where a decision is made as to whether the user's character is designated or not. Namely, a decision is made as to whether the user is designated at step S126 of FIG. 22. And when the result of this decision signifies no designation of the user, i.e., when the picture corresponding to the position and the visual point of view of the service provider's character is to be provided, the operation proceeds to step S153 to acquire the data corresponding the position and the visual point of view of the service provider. This data is the one outputted from the service provider terminal 14 at step S123 of FIG. 22.

Subsequently the operation proceeds to step S154, where the picture data corresponding to the position and the visual point of view of the service provider's character acquired at step S153 is read out from the memory device 12 and, after an adequate correction if necessary, the picture data is outputted to the service provider terminal 14.

More specifically, the CPU 21 of the server 11 controls the communication apparatus 24 to thereby output the picture data, which corresponds to the position and the visual point of view of the service provider's character, via the wide band communication network 15 to the service provider terminal 14. Then, upon supplying of the data via the communication apparatus 54, the CPU 51 of the service provider terminal 14 outputs the received data to the display device 55 so as to display the data thereon. In this manner, there is displayed, on the display device 55, the picture corresponding to the position and the visual point of view of the service provider's character inputted by manipulating the visual point input device 59c and the motion input device 59d.

Next the operation proceeds to step S155, where a decision is made as to whether a processing termination command has been inputted or not. When the result of such decision signifies no input of the termination command, the operation returns to step S151, and the ensuing processes are executed.

Meanwhile, if the result of the decision at step S152 signifies designation of the specific user's character, the operation proceeds to step S156, where the same picture as the one provided to the user terminal 13 corresponding to the designated character is outputted to the service provider terminal 14.

Further, if the result of the decision at step S151 signifies no character mode, the operation proceeds to step S157, where the picture data independent of the position and the visual point of view of the service provider's character and with those of the user's character is read and outputted.

After completion of steps S156 and S157, the operation proceeds to step S155, and the ensuing processes are executed repeatedly.

Figure 24:
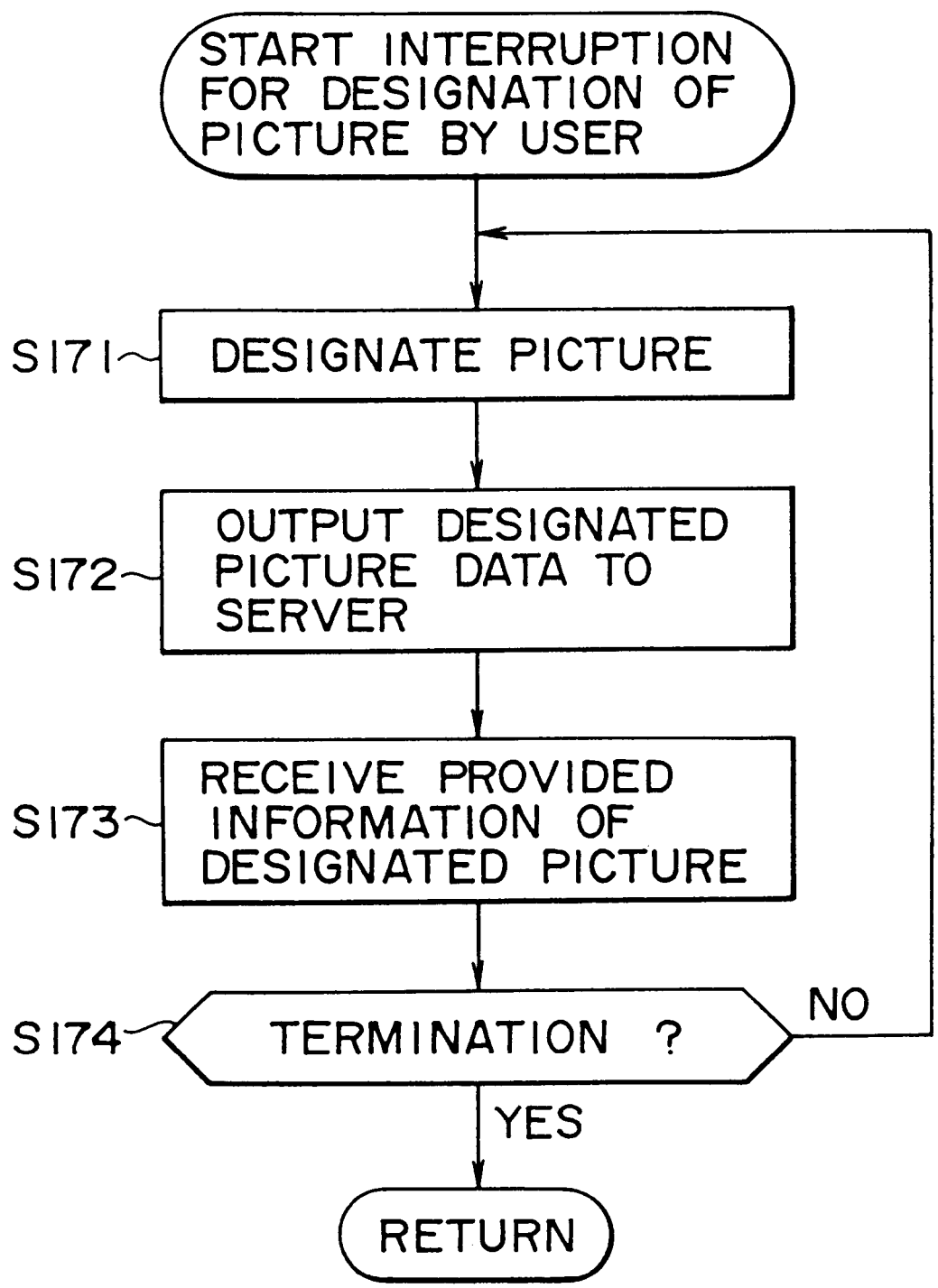
FIG. 24 is a flow chart for explaining a processing example executed when the user terminal 13 of FIG. 4 designates a desired picture.

In a state where the user is provided with the pictures of the virtual reality space from the server 11, if the user notices a certain picture and desires to obtain further detailed information about that picture, it is possible for the user to designate the relevant picture. FIG. 24 shows a processing example executed in the user terminal 13 in such a case. First at step S171, a picture designation process is executed. In the state of FIG. 17 for example, the desired picture is designated by displacing the cursor 74 to the picture of a television 72 or 73 and clicking the same on that picture by manipulating the mouse 49b of the user terminal 13.

Subsequently the operation proceeds to step S172 to execute a process of outputting to the server 11 the data required for specifying the designated picture. That is, the CPU 41 outputs the data, which corresponds to the manipulated position of the mouse 49b, to the server 11 via the communication apparatus 44.

The server 11 acquires the data at step S181 of FIG. 25 which will be described later, and then reads and outputs the provision information corresponding to the designated picture at step S183.

At step S173, the user terminal 13 acquires the providable information of the designated picture outputted from the server 11, and then delivers the information to the display device 45 so as to display the same thereon. Thus, in the state of FIG. 17 for example, the performance, price and other information of the television set 72 can be obtained by designating the television set 72 with the cursor 74.

Thereafter the operation proceeds to step S174, where a decision is made as to whether a processing termination command has been inputted or not. When the result of such decision signifies no input of the termination command, the operation returns to step S171, and the ensuing processes are executed.

Figure 25:
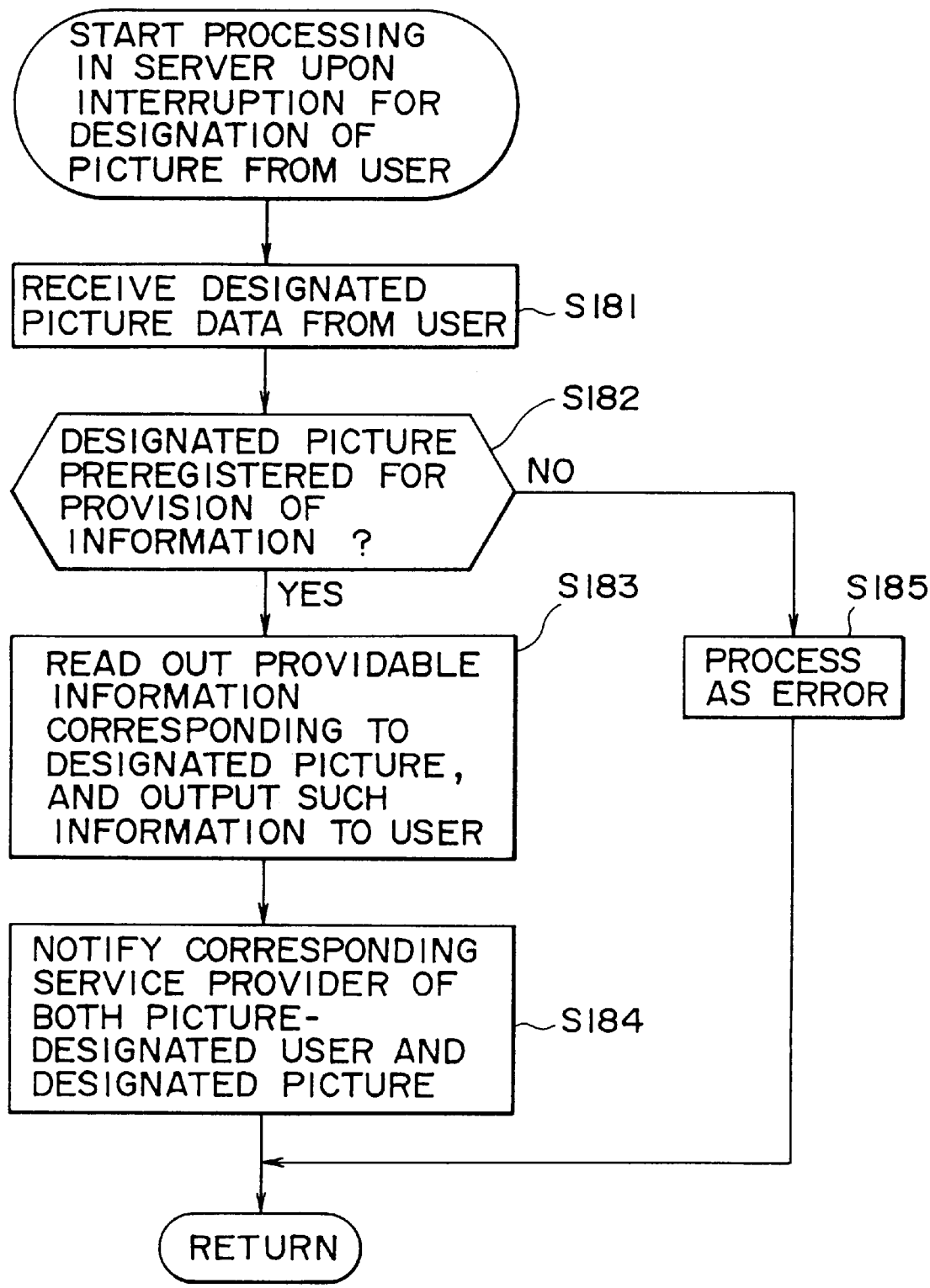
FIG. 25 is a flow chart for explaining a processing example executed in the server 11 corresponding to the process of FIG. 24 in the user terminal.

FIG. 25 shows a processing example of the server 11 executed in response to a command received from the user terminal 13 for designation of a specific picture. First at step S181, there is acquired the data outputted from the user terminal 13 at step S172 of FIG. 24 for specifying the designated picture. When necessary, this data is stored in the RAM 23 of the server 11. Subsequently the operation proceeds to step S182, where the CPU 21 makes a decision as to whether the designated picture specified by the acquired data is the one previously registered as an object picture for information provision.

The space shown in FIG. 18 for example is the one for selling electric appliances, and the counter 71 is not a picture of any commodity to be sold. Therefore, no information is existent in particular to be provided for the counter 71. Meanwhile the television sets 72 and 73 are commodities to be sold there, so that providable information for further detailed explanation of the commodities is existent. At step S182, a decision is made as to which kind of the picture has been designated.

When the result of such decision signifies designation of some picture prepared with providable information, the operation proceeds to step S183, where providable information corresponding to the designated picture is read from the memory device 12 and then is outputted to the user terminal 13. If the television set 72 or 73 is designated in the state of FIG. 18 for example, the providable information corresponding thereto is read and outputted to the user terminal 13.

Next the operation proceeds to step S184, where the CPU 21 of the server 11 outputs to the service provider terminal 14 the information relative to both the picture-designated user and the designated picture.

In the service provider terminal 14, a statistical process is executed, in response to the above notice, at step S192 of FIG. 26 which will be described later. And information is acquired with regard to which commodity is popular and which user has noticed such commodity.

Meanwhile, if the result of the decision at step S182 of FIG. 25 signifies designation of some picture having no providable information, e.g., when the counter 71 is designated in the state of FIG. 17, the operation proceeds to step S185 to execute an error process. More specifically, the CPU 21 of the server 11 controls the communication apparatus 24 and outputs a message such as "No providable information" to the user terminal 13.

Figure 26:
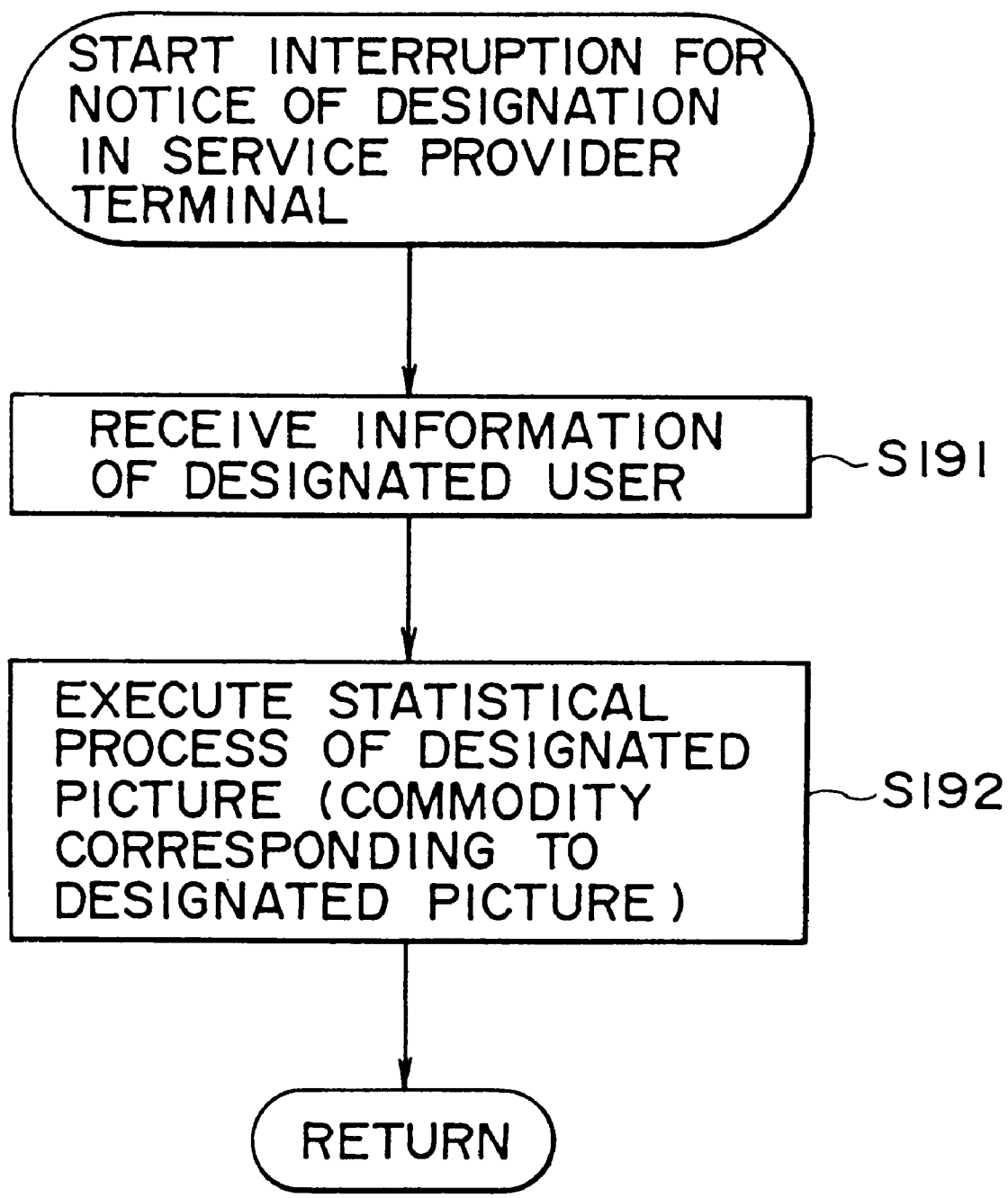
FIG. 26 is a flow chart for explaining a processing example executed in the service provider terminal 14 corresponding to the process at step S84 of FIG. 25.

FIG. 26 shows a processing example executed when the service provider terminal 14 has received the notice outputted from the server 11 at step S184 of FIG. 25. First at step S191, there are received both the information relative to the user having designated the picture (commodity) and the information relative to the designated picture (commodity). The CPU 51 of the service provider terminal 14 supplies the received data to the RAM 53 to store the same therein. Then the operation proceeds to step S192 to execute a statistical process with regard to such information.

Thus, when the user designates the television set 72 by the cursor 74 in the state of FIG. 18 for example, the service provider terminal 14 is notified of the information (occupation, age, address, telephone number, sex, etc.) relative to the user of the user terminal 13, and also of the information that the designated commodity is the television set 72. Consequently the service provider terminal 14 is enabled to know that this user is interested in the television set 72.

If the television set 72 is popular, it follows therefrom that many users designate the television set 72, whereby it is rendered possible to find the degree of popularity of each television set.

Figure 27:
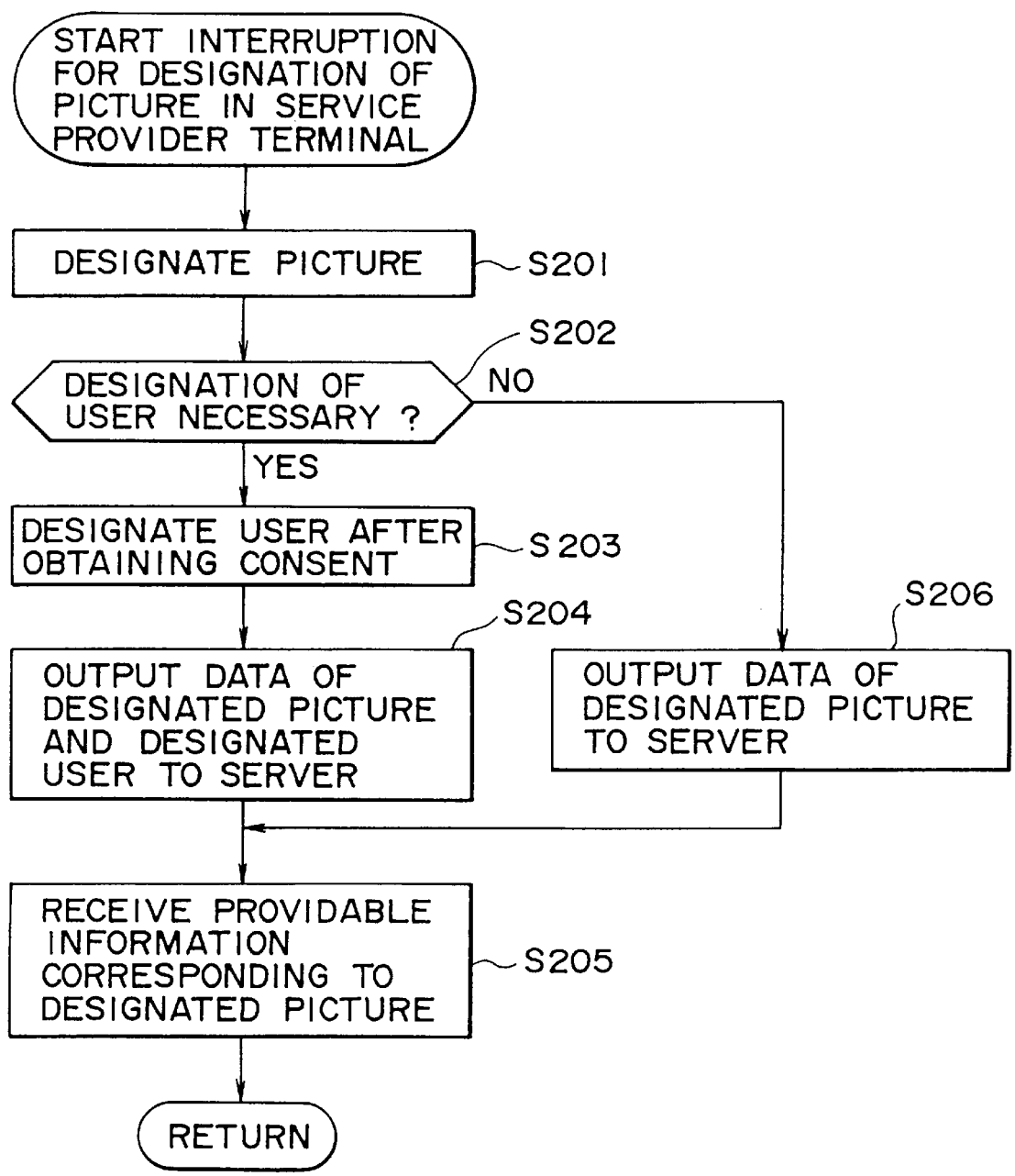
FIG. 27 is a flow chart for explaining a processing example of picture designation executed in the service provider terminal 14 of FIG. 4.

Designation of a picture may be performed by the service provider as well. FIG. 27 shows a processing example executed in the service provider terminal 14 in such a case. First at step S201, a desired picture is designated by manipulating the mouse 59*b* of the service provider terminal 14. The television set 72 or 73 can be designated in the state of FIG. 19 for example.

Subsequently the operation proceeds to step S202, where a decision is made as to whether the picture designated by the service provider needs to be provided to the user also. In case the same picture needs to be provided to the user as well, the operation proceeds to step S203, where the user is designated after a consent of the user is obtained. In the state of FIG. 19 for example, if the providable information about the television set 72 is to be provided to the user corresponding to the character G, both the television set 72 and the character G are designated by using the cursor 75, and a conversation is made with the character G as will be described later, whereby a consent is obtained with regard to provision of the information about the television set 72 to the user terminal 13.

Next the operation proceeds to step S204, where the CPU 51 outputs to the server 11 both the picture designated at step S201 and the data for specifying the user designated at step S203.

Meanwhile, if the result of the decision at step S202 signifies no necessity of designating any user, i.e., when the providable information relative to the designated picture merely needs to be watched by the service provider himself, the operation proceeds to step S206, where the data for specifying the picture designated at step S201 is outputted to the server 11.

The data outputted at steps S204 and S206 are received by the server 11 at step S211 of FIG. 28 which will be described later, and the providable information corresponding to such data is outputted from the server 11 to the service provider terminal 14 or to both of the service provider terminal 14 and the user terminal 13 at step S214 or S215.

At step S205, the service provider terminal 14 receives the providable information corresponding to the designated picture and outputted from the server 11, and then delivers such information to the display device 55 to thereby display the same.

In this manner, it is possible in the service provider terminal 14 to confirm the providable information corresponding to each designated picture, or to give an explanation about the designated picture while providing the same information to the user.

FIG. 28 shows a processing example executed in the server 11 when a desired picture has been designated in the service provider terminal 14 according to the flow chart of FIG. 27. First at step S211, the data outputted from the service provider terminal 14 at step S204 or S206 of FIG. 27 is acquired. As described above, this output data includes the data for specifying the designated picture and the data for designating the user to whom the providable information may be provided.

At step S212, the providable information corresponding to the designated picture and acquired at step S211 is read out from the memory device 12. Subsequently the operation proceeds to step S213, where a decision is made as to whether the providable information read out at step S212 needs to be provided to the user also. This decision is made on the basis of the data acquired at step S211. When the providable information needs to be outputted only to the service provider alone, the operation proceeds to step S214, where the providable information is outputted only to the service provider terminal 14. However, when the providable information needs to be provided to the user also, the operation proceeds to step S215, where the providable information is outputted to the user as well as to the service provider. The former is a process corresponding to step S206 of FIG. 27, and the latter is a process corresponding to step S204 of FIG. 27.

Figure 29:
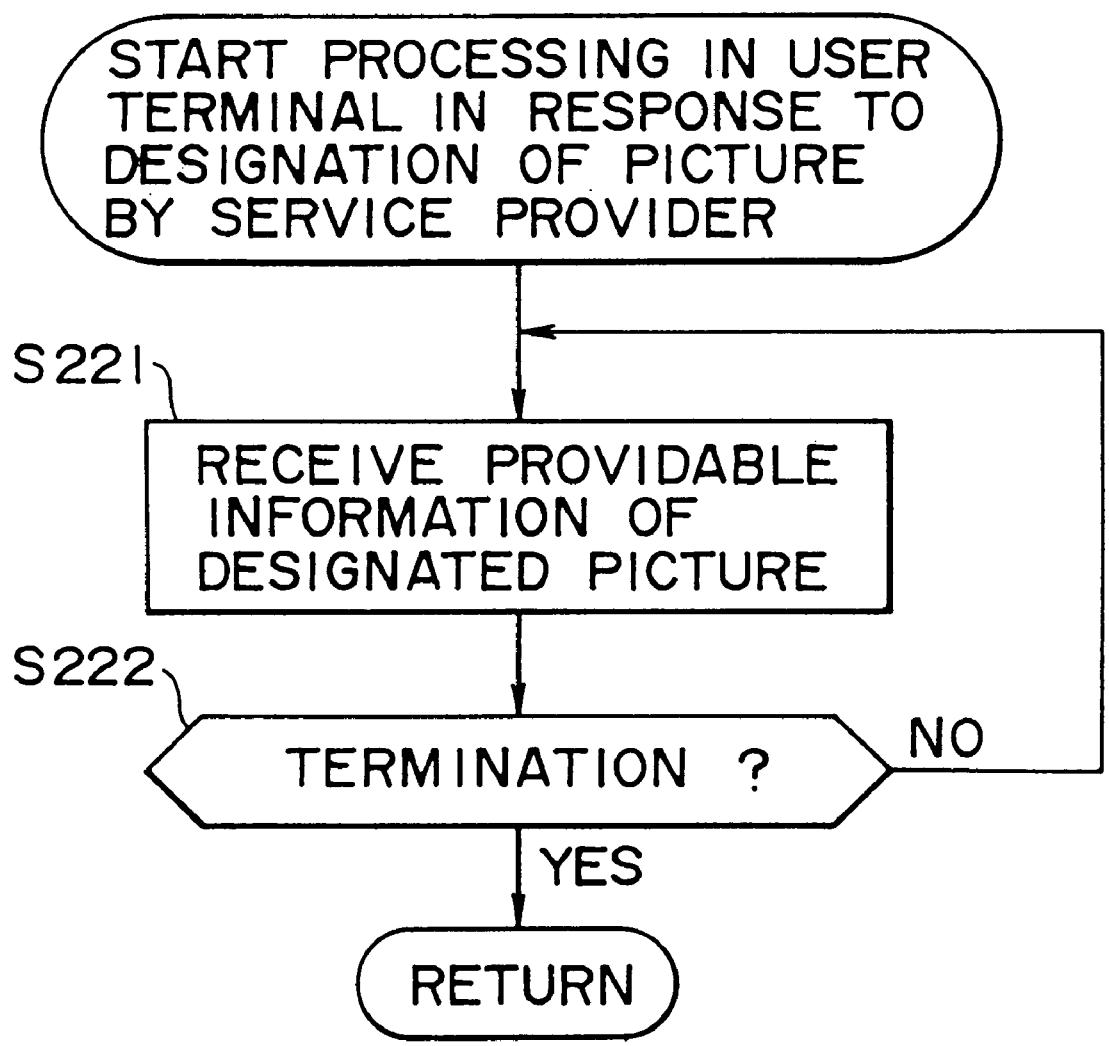
FIG. 29 is a flow chart for explaining a processing example executed in the user terminal 13 corresponding to the process of FIG. 27 in the service provider terminal 14.

FIG. 29 shows a processing example executed in the user terminal 13 when a picture has been designated by the service provider. First at step S221, the providable information outputted from the server 11 is received and then is displayed on the display device 45. The above information is the information outputted from the server 11 at step S215 of FIG. 28. This process is repeated until the result of a decision at step S222 signifies input of a termination command.

Figure 30:
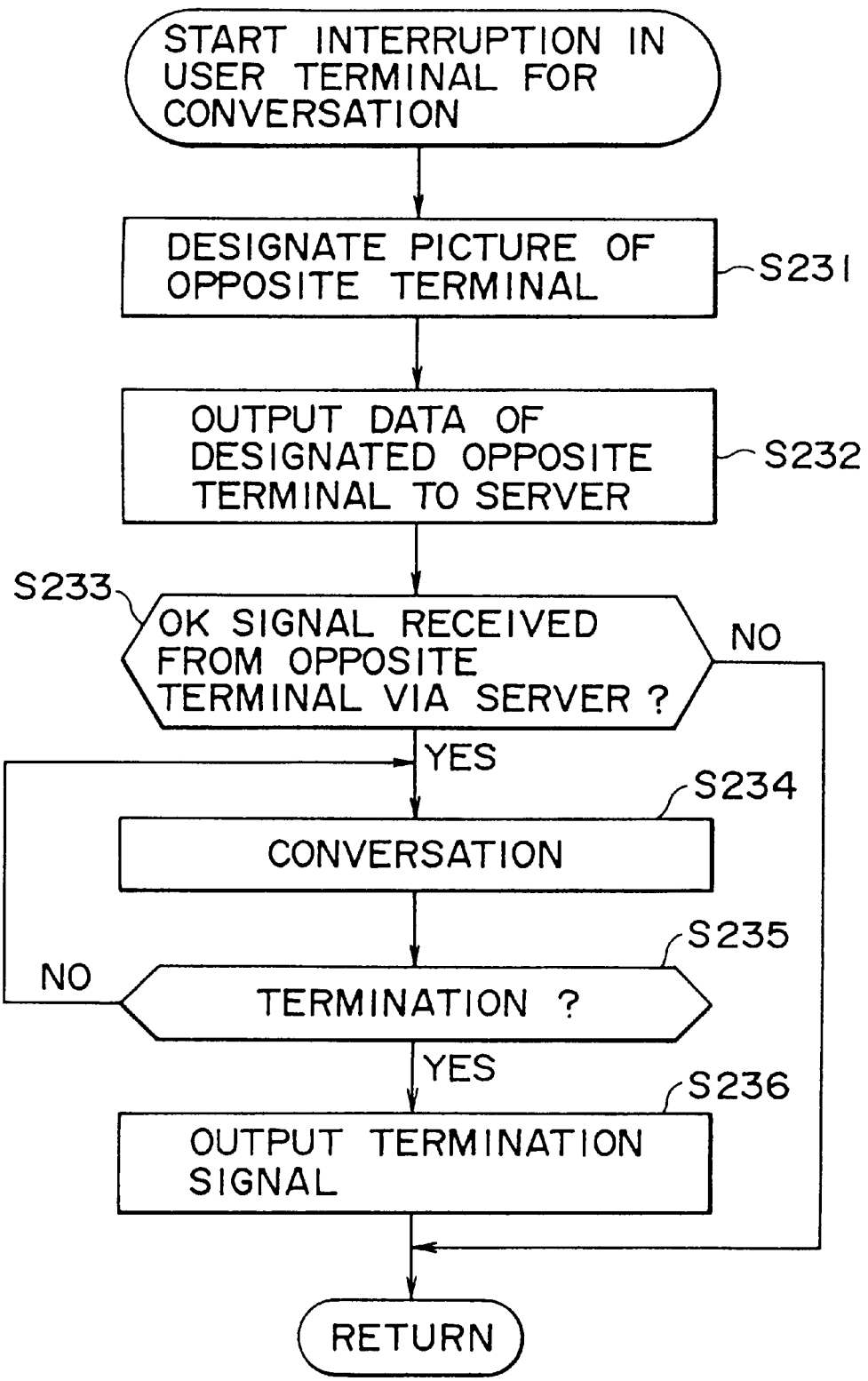
FIG. 30 is a flow chart for explaining a processing example of conversation request executed in the user terminal 13 of FIG. 4.

FIG. 30 shows a processing example executed when the user of the user terminal 13*a* converses with a user of some other user terminal 13*b* or with the service provider of the service provider terminal 14. In the case of a conversation with the other user or the service provider, the second character for the conversation is designated first at step S231. This process is executed by designating a desired character with the cursor 74 in FIG. 18. Thereafter the operation proceeds to step S232 to execute a process of outputting to the server 11 the data for specifying the designated second character. More specifically, the CPU 41 of the user terminal 13*a* outputs to the server 11 the position data designated by the cursor 74.

In the server 11, as will be described later with reference to a flow chart of FIG. 31, contact is made with the designated second character at step S243 in response to the data received at step S241, and an inquiry is made as to whether the designated second character consents to a conversation or not. And when a consent to the conversation is obtained, a conversation OK signal is outputted to the user terminal 13*a*.

Then in the user terminal 13, a decision is made at step S233 as to whether the OK signal from the server 11 has been received or not. If the result of such decision signifies reception of the OK signal, the operation proceeds to step S234 for a conversation. This conversation is achieved via the microphone 46 and the loudspeaker 47. That is, the conversation is preferably exchanged in ordinary voice, not in written letters or characters. Therefore, as will be described later, the server 11 executes, at step S246, a process of connecting lines for voice communication between the user terminal 13*a* and the designated second terminal (the other user terminal 13*b* or the service provider terminal).

Subsequently at step S235, a standby state is held to wait until a conversation termination command is inputted. And in response to such a command, the operation proceeds to step S236, where a termination signal is outputted to the server 11 to thereby complete the process.

Meanwhile, if the result of the decision at step S233 signifies no reception of the OK signal, it indicates no consent of the opposite terminal to the conversation, so that the desired conversation is not exchangeable. In this case, therefore, the processes at steps S234 to S236 are skipped, and the procedure is immediately completed.

Figure 31:
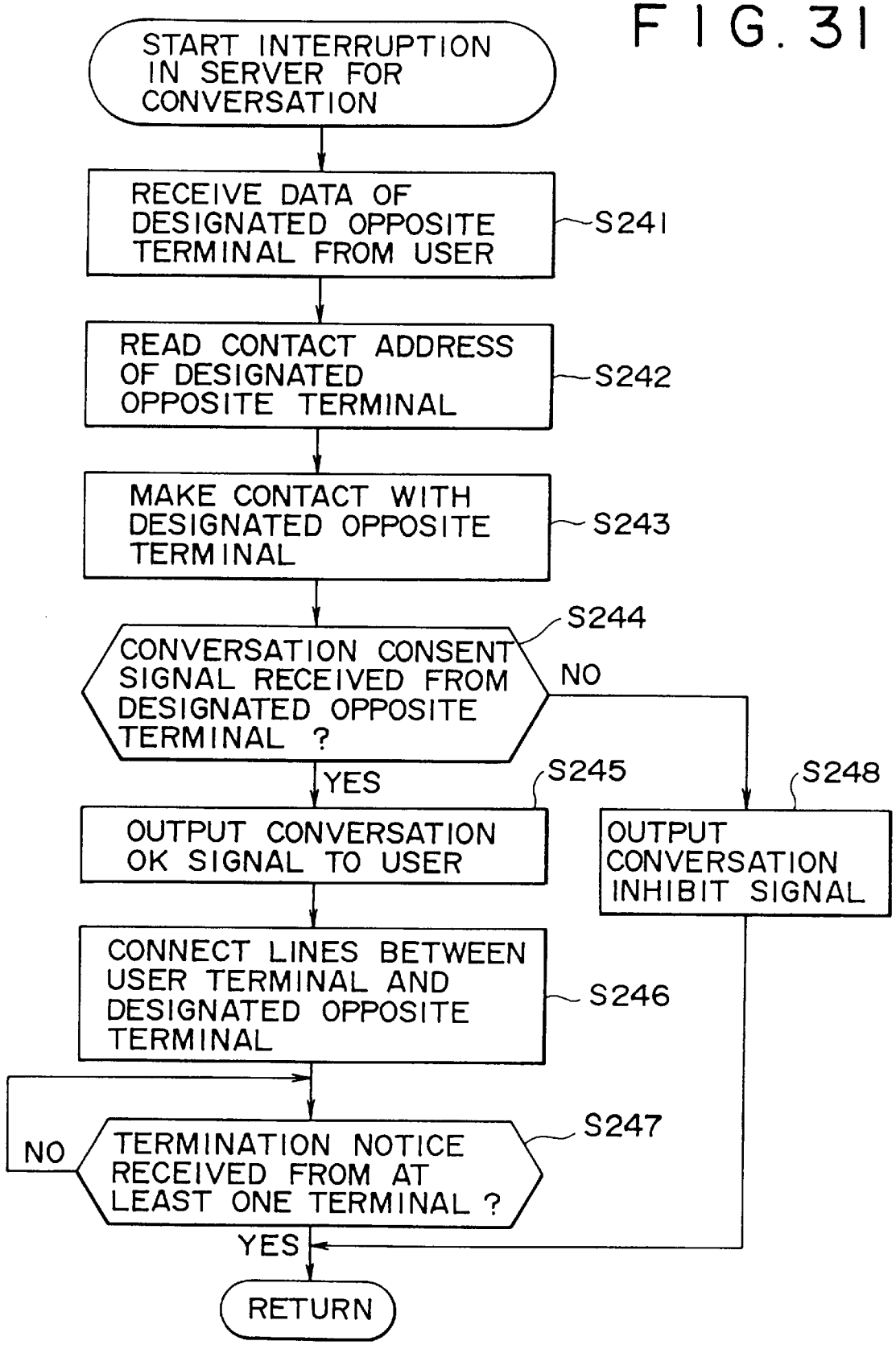
FIG. 31 is a flow chart for explaining a processing example executed in the server 11 corresponding to the conversation request of FIG. 30 in the user terminal 13.

FIG. 31 shows a processing example executed in the server 11 in response to the data supplied from the user terminal 13a to designate the second terminal for a conversation. First at step S241, there is acquired the data outputted from the user terminal 13a at step S232 of FIG. 30 to specify the designated second terminal. Subsequently the operation proceeds to step S242, where the CPU 21 reads out from the memory device 12 the contact address of the second terminal acquired at step S241. More specifically, the contact addresses of the entire set of users and service providers capable of accessing the virtual reality space are previously stored in the memory device 12, so that the relevant contact address can be read out therefrom.

Next the operation proceeds to step S243, where contact is made to the relevant contact address read out at step S242. Then the CPU 21 requests the second terminal to reply if it consents or not to exchange of a conversation.

For example, when the user designates the character F of the service provider as the second character by manipulating the cursor 74 in FIG. 18, contact is made to the service provider terminal 14 corresponding to the character F, and a reply is requested with regard to consent to a conversation.

At step S244, a decision is made as to whether a consent signal relative to a conversation has been received or not from the second terminal. And if the result of such decision signifies reception of such a consent signal relative to a conversation, the operation proceeds to step S245, where a conversation OK signal is outputted to the user terminal 13a. Thereafter the operation proceeds to step S246, where communication lines are connected in such a manner that the user and the designated second character can converse with each other via audio signal. Consequently, the user terminal 13a and the service provider terminal 14a for example can make a conversation with each other via voice communication. Therefore the user can receive an explanation of the television set 72 or 73 more directly.

Subsequently the operation proceeds to step S247, where a standby state is held to wait until input of a notice, which indicates a termination of the conversation, from the user or the second character, and the process is completed upon input of such a notice.

Meanwhile, if the result of the decision at step S244 signifies no reception of a conversation consent signal from the second terminal, the operation proceeds to step S248, where a conversation inhibit signal is outputted to the user terminal 13a. In this case, the user is disabled from making conversation.

Figure 32:
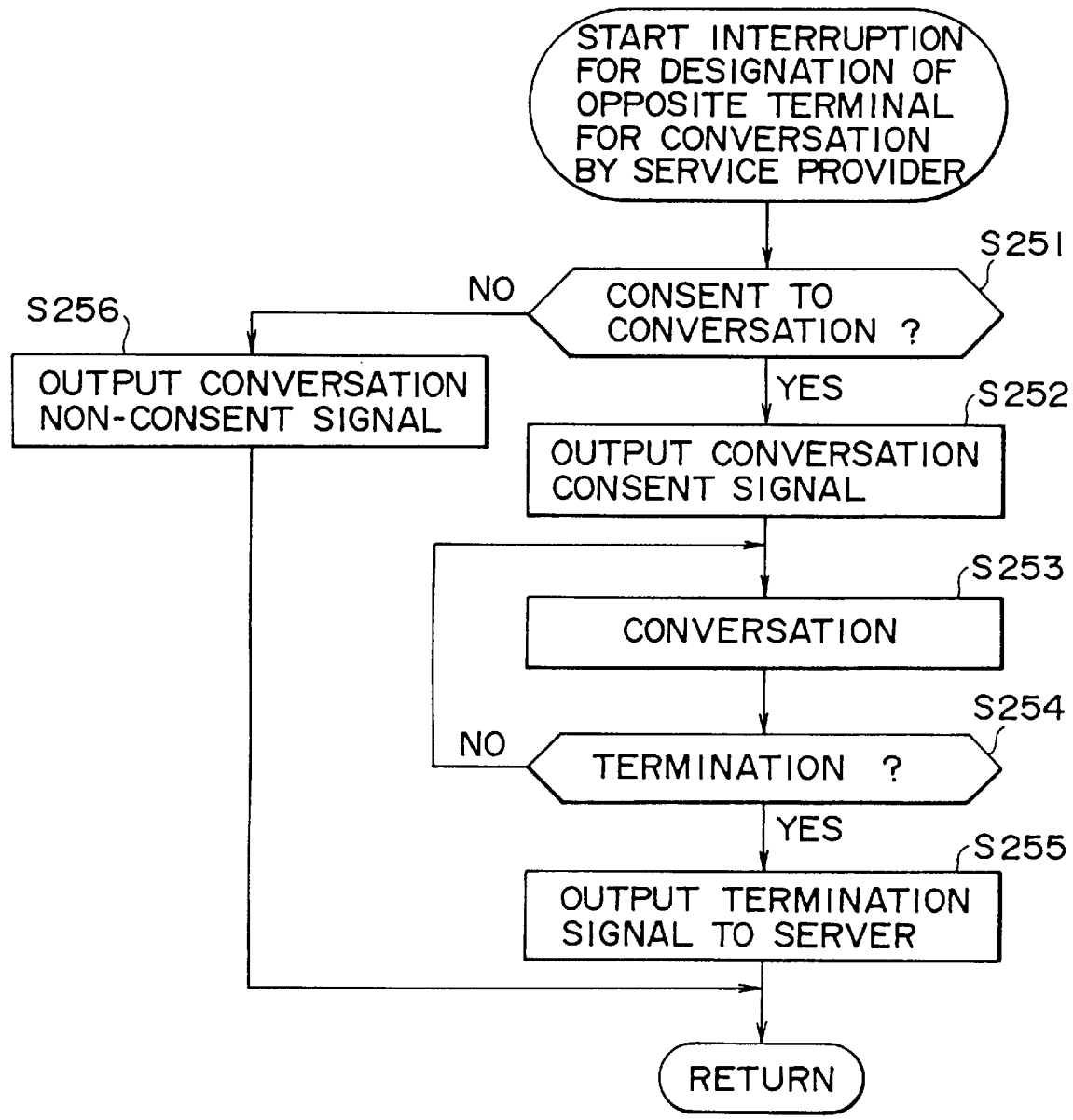
FIG. 32 is a flow chart for explaining a processing example executed in the service provider terminal 14 corresponding to a notice at step S243 of FIG. 31.

FIG. 32 shows a processing example executed in the service provider terminal 14a in response to the contact processed at step S243 of FIG. 31. First at step S251, a decision is made as to whether consent or non-consent to a conversation is to be replied. In the case of consent to a conversation, the operation proceeds to step S252, where a conversation consent signal is outputted to the server 11 by manipulating a predetermined key of the keyboard 59a for example in the service provider terminal 14a. As described, in response to the conversation consent signal thus supplied, the server 11 outputs a conversation OK signal to the user terminal 13a at step S245 of FIG. 31 while connecting the user terminal 13 and the service provider terminal 14a to each other at step S246.

Then the service provider terminal 14a converses with the user terminal 13a at step S253. This conversation is continued until a termination command is inputted at step S254.

When the result of the decision at step S254 signifies input of a conversation termination signal, the operation proceeds to step S255, where the conversation termination signal is outputted to the server 11. And in response to the termination signal thus inputted, the signal is detected at step S247 of FIG. 31 and the process is completed.

Meanwhile, if the result of the decision at step S251 signifies no necessity of a conversation, the operation proceeds to step S256, where a conversation non-consent signal is outputted from the service provider terminal 14a by manipulating a predetermined key of the keyboard 59a. Upon reception of such a conversation non-consent signal in the server 11, a conversation inhibit signal is outputted therefrom to the user terminal 13a at step S248 of FIG. 31, as described above.

Although an explanation has been given hereinabove with regard to an exemplary case of requesting a conversation from the user terminal 13a to the service provider terminal 14a, the same processing is executed also in the case of requesting a conversation from the user terminal 13a to some other user terminal 13b or from the service provider terminal 14a to the user terminal 13a.

The above embodiment represents an exemplary case of selling commodities. However, the present invention is applicable also to a case of providing a variety of services. For example, when advertising pictures of movies or game software are displayed in the virtual reality space, provision of any movie or game software can be received by designating the desired advertising picture.

Figure 33:
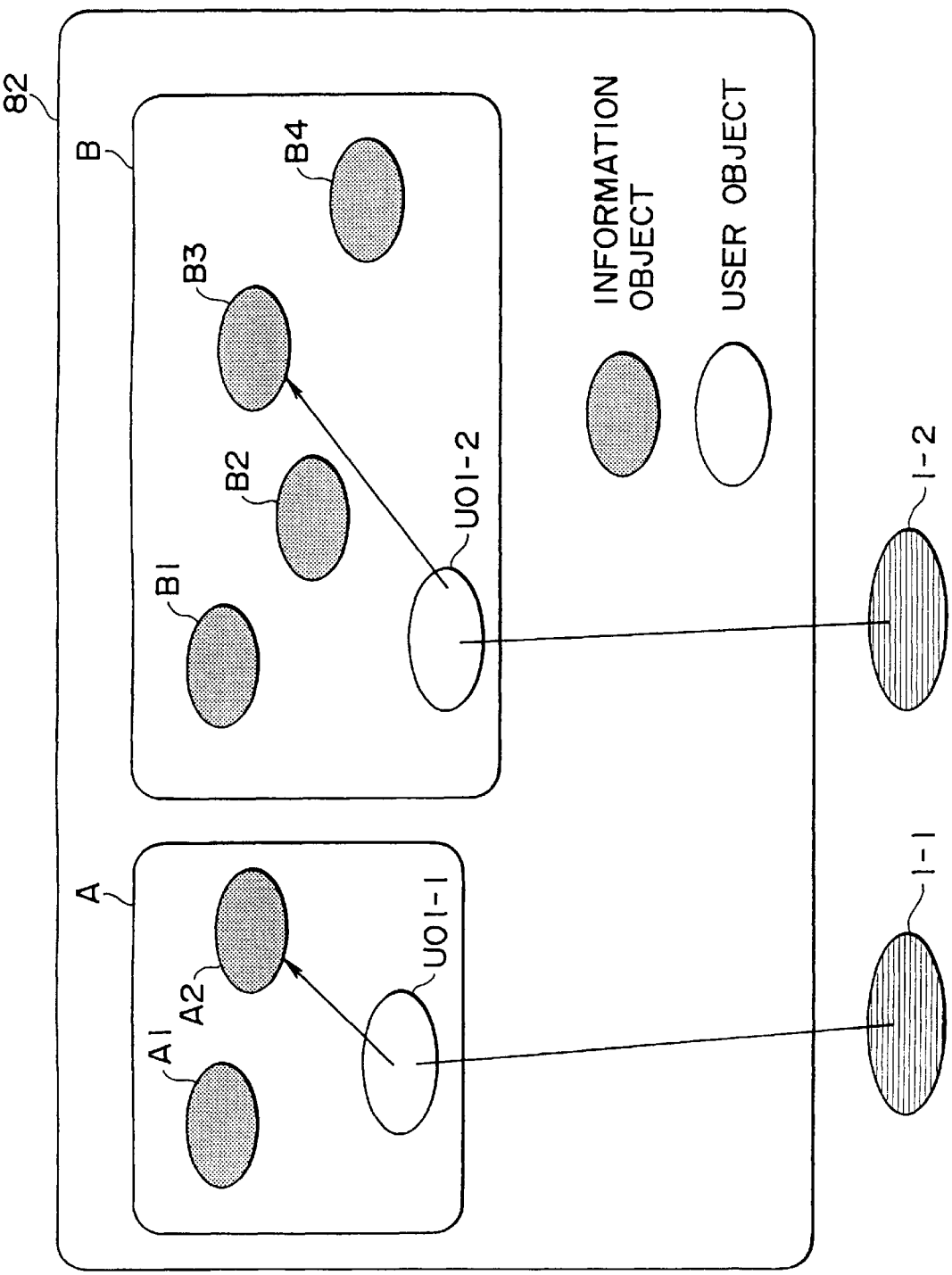
FIG. 33 shows an exemplary composition of the cyber-space system according to the present invention.

FIG. 33 shows an exemplary constitution of a cyber-space system 82 according to the present invention. This cyber-space system 82 includes one or more (two in this embodiment) cyber-spaces (cyber-spaces A and B). The cyber-spaces A and B constitute a system for providing media information such as moving pictures, still pictures, audio, music and text, and also service utilizing such information inclusive of network game, on-line shopping, data base retrieval and so forth.

The information (service) to be provided in the cyber space is classified into groups of related information and is stored in a server (cyber-space system 82). Meanwhile, individual users prepare user terminals 1-1 and 1-2 respectively and make user registration in the cyber-space system 82. And in response to such user registration, user objects are prepared in the cyber-space system 82 correspondingly to the individual user terminals 1-1 and 1-2.

In an embodiment of FIG. 33, a user object UO1-1 is prepared for the user terminal 1-1, and a user object UO1-2 is prepared for the user terminal 1-2.

The cyber-space system 82 forms a virtual reality space by such cyber-spaces A and B. The users connect the user terminals 1-1 and 1-2 to the cyber-space system 82 and operate the corresponding user objects UO1-1 and UO1-2 respectively through the user terminals 1-1 and 1-2. Then each user accesses the cyber-space where desired information exists, and can thereby examine the stored information or play a game or make a purchase. The kind of providable information (service) is different depending on each cyber-space.

The cyber-space system 82 is constituted as an object system. More specifically, all kinds of the information objects A1, A2, B1 to B4 constituting the cyber-spaces A and B, and all of the user objects UO1-1 and UO1-2 manipulated by the users via the user terminals 1-1 and 1-2 respectively, are formed as objects. Consequently, each user accesses a desired cyber-space (either A or B) by manipulating the user object UO1-i of his own and receives provision of the information managed by that cyber-space.

The user object UO1-i corresponds to each user terminal 1-i and is a unique object representing the user himself. The user object UO1-i holds various individual information about the user including his account information, history information indicative of his past access executed to which object and which cyber-space, the age and occupation of the user himself, and so forth. Since the user object UO1-i is manipulated through the user terminal 1-i, the content of the manipulation from the user terminal 1-i (e.g., manipulation of a button (not shown) in the user terminal 1-i or audio input) can be transmitted as a message to any other user object. It is also possible to receive picture data as a message and to output such data to the corresponding user terminal for displaying the same, or to receive, as a message, an access relative to the information held by the user object.

Figure 34:
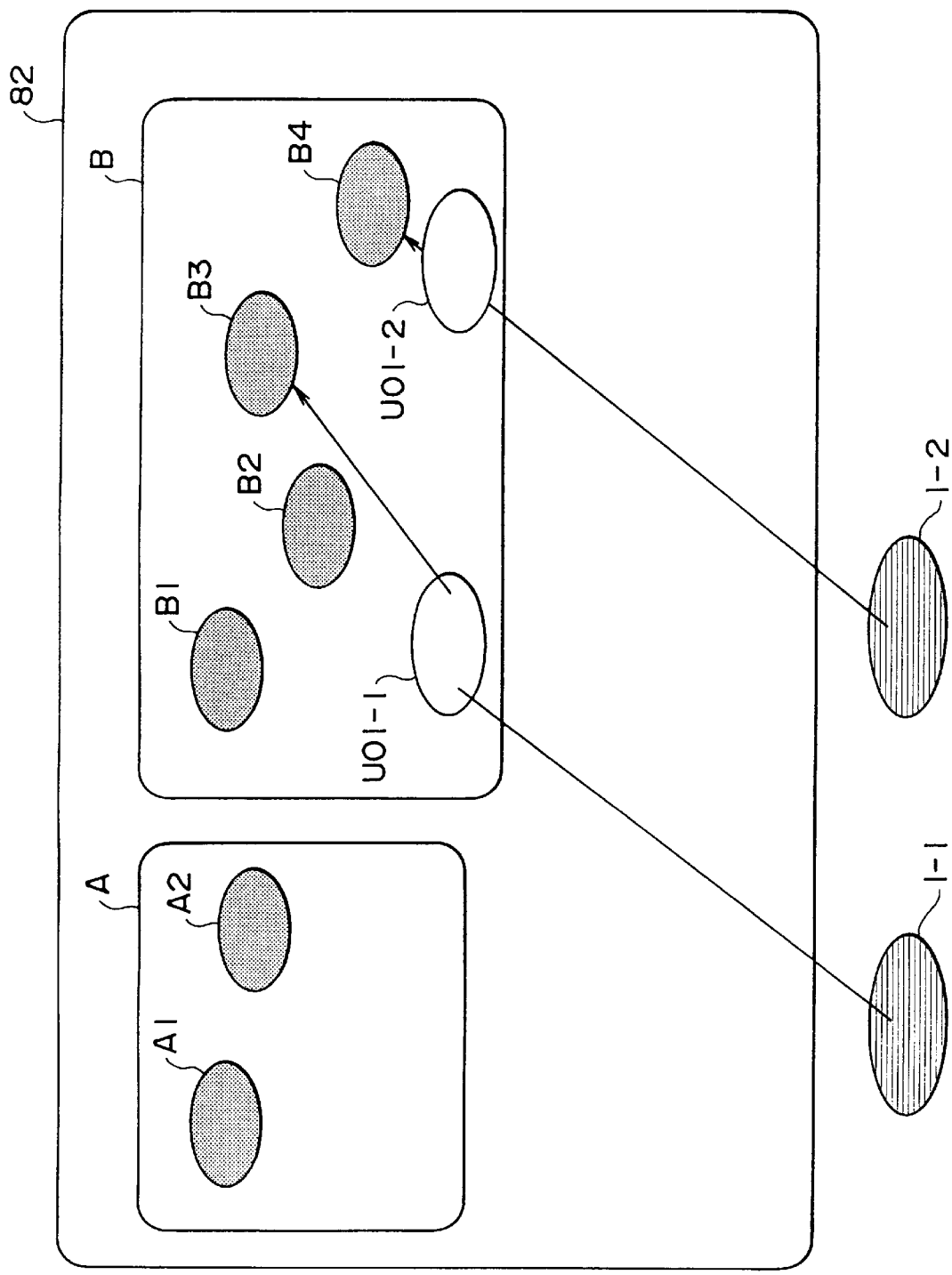
FIG. 34 is a diagram for explaining the attributes of user objects.

Furthermore, since the user object UO1-i corresponds to each user terminal 1-i, the content thereof is fixed in the cyber-space system 2. Accordingly, whenever the user object UO1-i corresponding to the user terminal 1-i for example receives information provided from the cyber-space B as shown in FIG. 34 or from the cyber-space A as shown in FIG. 33, the content is kept unchanged for this reason.

An access to any of the information objects A1, A2, B1 to B4 in the cyber-space system 82 is realized as the transmission of a message to the relevant information object. For example, when the user object UO1-i examines the content of a desired information object, a message is transmitted to that information object and a reply therefrom is received. The kind of the message receivable by the information object is different depending on each cyber-space. If the information object is the one in the cyber-space for shopping, an explanatory message of a desired commodity and a price thereof can be received. And if the information object is the one for a combat game, a message of an attack command can be received.

The content of the service provided from each cyber-space may be rendered different in conformity with the attribute of the user. For example, it is possible to arrange the system in such a manner that any user having paid a low entrance fee to the cyber-space is enabled to receive only picture information, while any user having paid a high entrance fee is enabled to receive both picture information and audio information. In this case, the user interface is also different depending on the amount of the paid entrance fee.

Namely, the following requisites are generated in the cyber-space system 2.

(1) In any different cyber-space, a different user interface is necessary.

(2) In some cases, user terminals are mutually different with individual users. And even when the user is the same, the user terminal may be changed to (replaced with) some other kind. And it may probably occur that, when the same user accesses from another place, he employs a different kind of user terminal. Therefore it is necessary that many kinds of user terminals be utilizable.

(3) An access from the user object to the information object in the cyber-space needs to be fed back to the user via the user interface.

Figure 35:
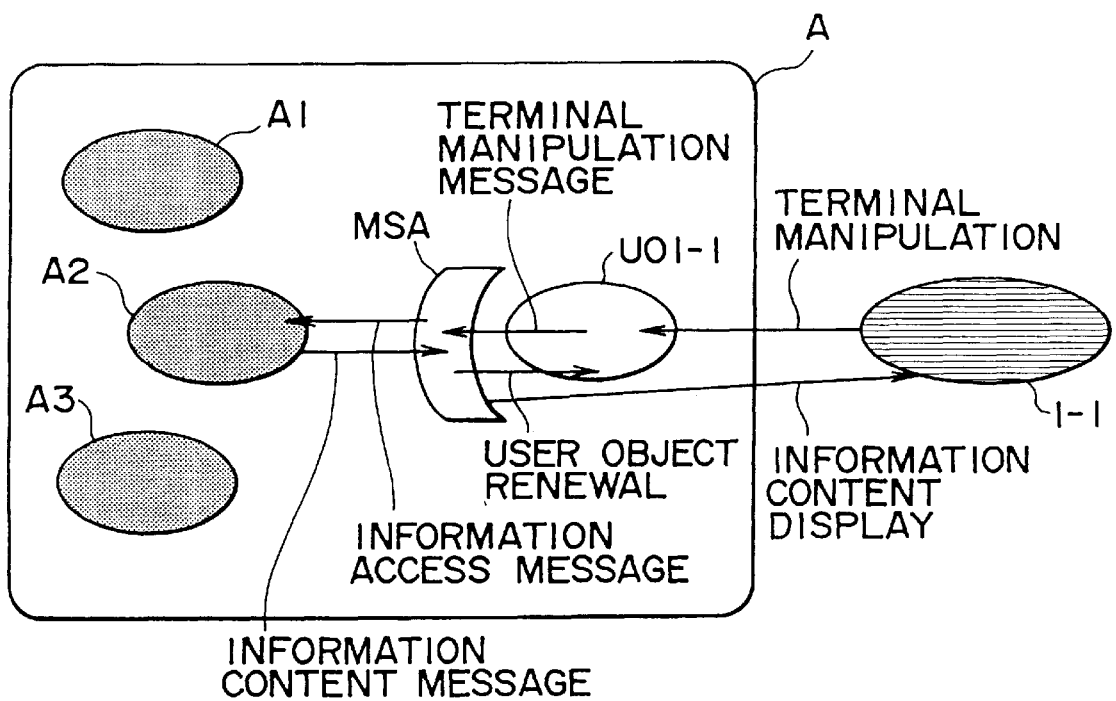
FIG. 35 is a diagram for explaining the principle of transmission of information between a user terminal and a cyber-space.

For the reasons mentioned above, in a cyber-space of the cyber-space system 82, a conversion object (software module) MSA is disposed between a user object UO1-1 and an information object A2 as shown in FIG. 35 for example. This conversion object MSA fundamentally has the following function.

When a terminal manipulation signal is inputted to a user object UO1-i (e.g., UO1-1 in the embodiment of FIG. 35) by manipulating a user terminal 1-i (e.g., user terminal 1-1 in the embodiment of FIG. 35), the user object UO1-1 converts the terminal manipulation signal into a terminal manipulation message. The conversion object MSA receives the terminal manipulation message supplied from the user object UO1-1 and then converts the received message into an information access message receivable by an information object (e.g., information object A2 in the embodiment of FIG. 35) in the cyber-space to which the user is connected at that time. And the information access message is transmitted to the information object A2 which is presently connected.

The information object A2 thus supplied with the information access message outputs an information content message, which corresponds to the received information access message, to the conversion object MSA. In the case that the information content message is one for renewing the information of the user object UO1-1, the conversion object MSA outputs the message directly to the user object UO1-1. In response to the renewal message thus inputted, the user object UO1-1 executes a process of renewing the information. When the input is a command for renewal of account bill information, a process of renewing the account bill information is executed. Meanwhile, if the information content message is one representing the information content to be displayed in the user terminal 1-1, such information is outputted to the user terminal 1-1.

Figure 36:
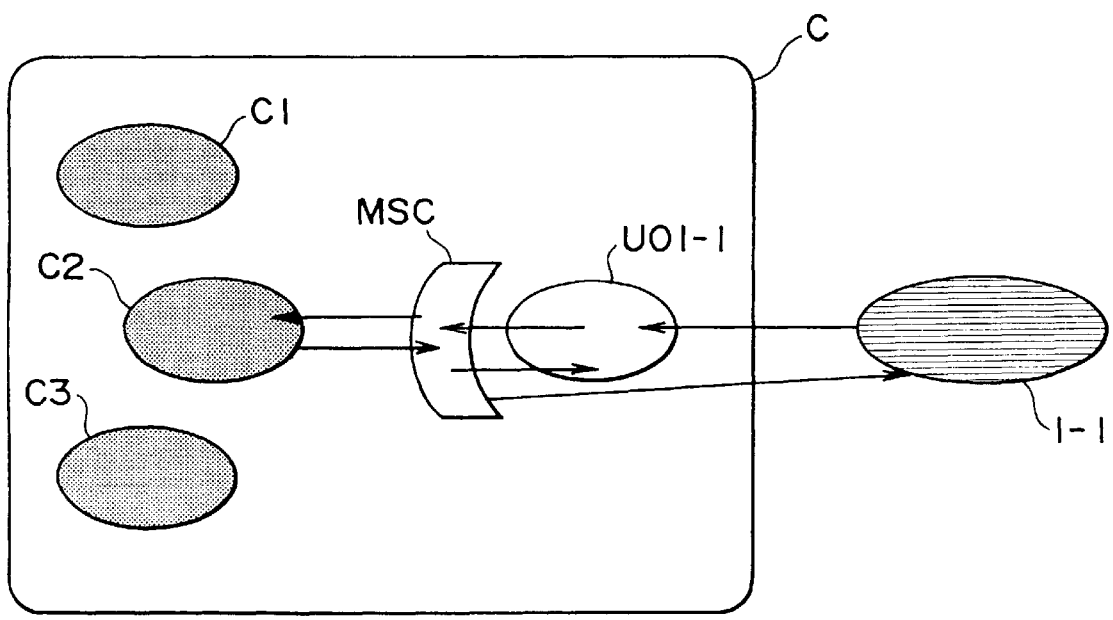
FIG. 36 is a diagram for explaining transmission of information in a movie theater cyber-space.

FIG. 36 shows a further concrete example of a cyber-space having a conversion object. The cyber-space of FIG. 36 represents a movie theater cyber-space C. This movie theater cyber-space C has movie objects C1 to C3 and a conversion object MSC. For example, when a certain button A in a user terminal 1-1 is manipulated, a terminal manipulation signal of the button A is supplied to a user object UO1-1. Then the user object UO1-1 converts the terminal manipulation signal into a terminal manipulation message "push: button A" and outputs this message to the movie theater conversion object MSC.

Subsequently the movie theater conversion object MSC converts the input terminal manipulation message into an information access message "playback:" and outputs this message to a designated movie object (movie object C2 in this embodiment).

In response to such information access message, the movie object C2 outputs the picture information of each frame of the movie as an information content message to the movie theater conversion object MSC. Then the movie theater conversion object MSC outputs the picture information to the user terminal 1-1 for displaying the same. If the capability of the user terminal 1-1 is so limited as to be incapable of displaying all the picture information of the frames, the movie theater conversion object MSC reduces, when necessary, a predetermined quantity of the picture information out of each frame in accordance with the capabilities of the user terminal 1-1 and outputs the reduced information.

Figure 37:
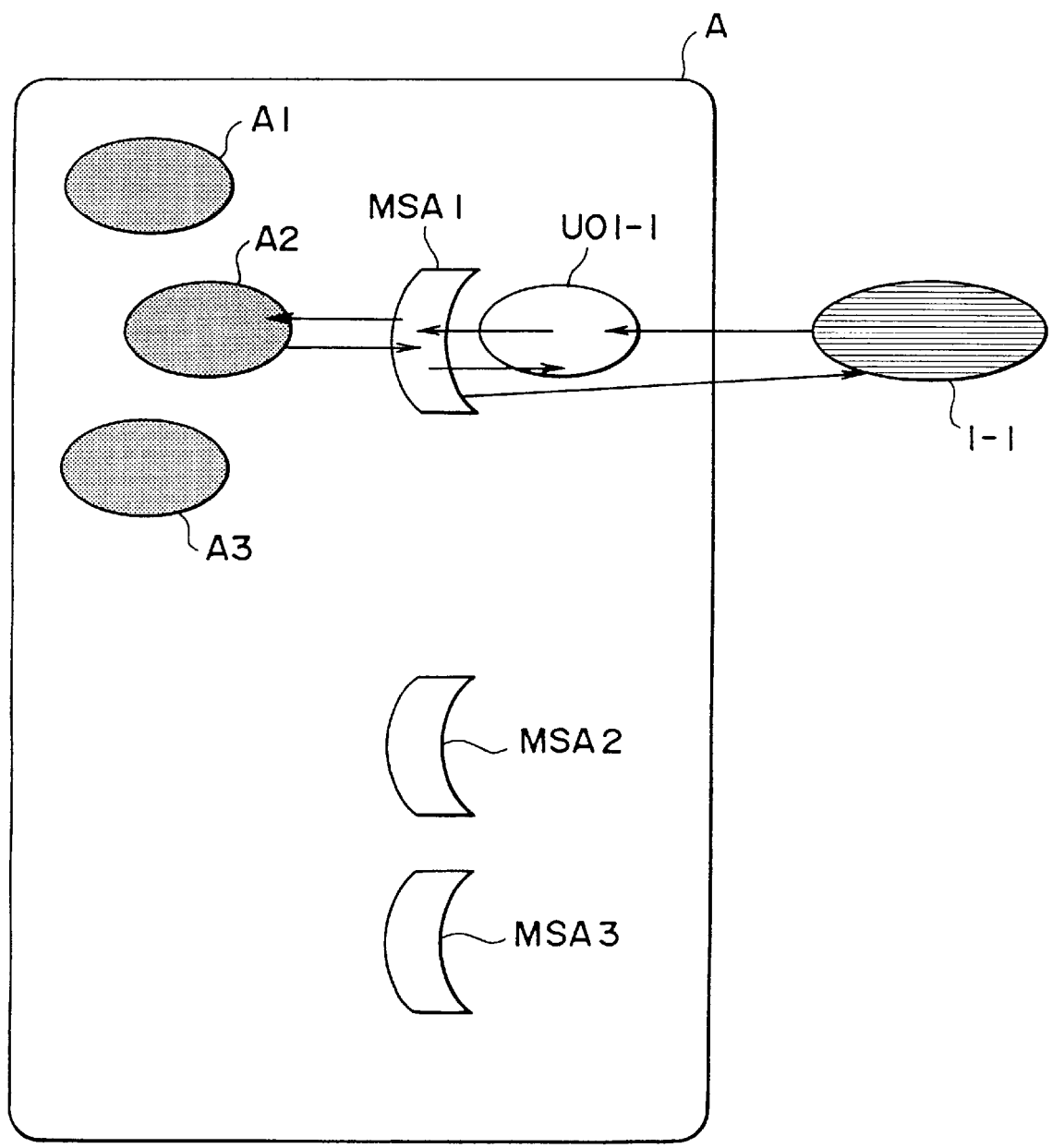
FIG. 37 is a diagram for explaining a conversion object corresponding to the kind of a user terminal.

As shown in FIG. 37, each cyber-space (e.g., cyber-space A in this embodiment) is equipped with conversion objects MSA1 to MSA3 which are mutually different in conformity with the kinds of user terminals 1-i having possibility of access. And in response to an access from a certain user object UO1-i, the cyber-space A identifies the kind of the user terminal 1-i from the content of the user object UO1-i and loads the conversion object MSAi, which corresponds to the identified kind, in the user object UO1-i. Consequently, the user object UO1-i is enabled to transmit a message to the relevant information object Ai in the cyber-space A via the conversion object MSAi and to receive a reply message therefrom, hence capable of renewing the desired information of the user object UO1-i or displaying the desired information in the user terminal 1-1.

The kind of the message transmitted from the user object UO1-i to the conversion object MSAi is different depending on the kind of the user terminal. Therefore, conversion objects MSA are prepared in correspondence to the kinds of the user terminals which access the related cyber-space. In the embodiment of FIG. 37 for example, three kinds of conversion objects MSA1 to MSA3 are prepared, wherein the conversion object MSA1 is employed for the user object which corresponds to the user terminal having only a low grade of functionality. In contrast therewith, the conversion object MSA2 is employed for the user object having an intermediate-grade of functionality, and the conversion object MSA3 is employed for the user object having a high-grade of functionality. Accordingly, each user terminal can receive a user interface of a level adapted for the individual functionality of the particular kind of terminal.

Figure 38:
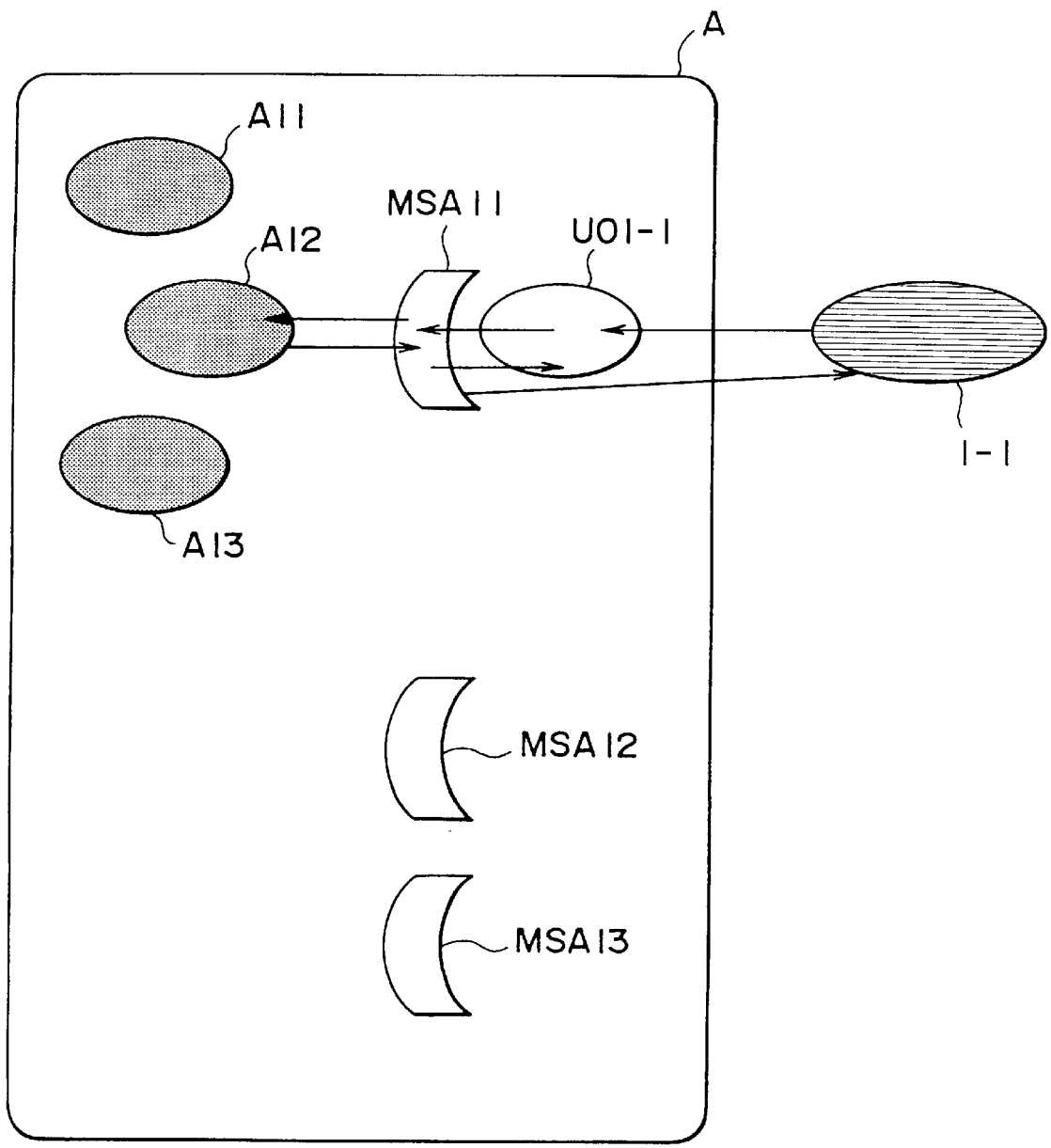
FIG. 38 is a diagram for explaining a conversion object corresponding to the version of a cyber space.

In another case where the version of a cyber-space is changed as shown in FIG. 38, each conversion object is also changed to a new version in conformity therewith. In the embodiment of FIG. 38, the cyber space A having the information objects A1 to A3 and the conversion objects MSA1 to MSA3 shown in FIG. 37 is changed to a new version in such a manner as to comprise information objects A11 to A13 and conversion objects MSA11 to MSA13. Thus, despite any change in the version of the cyber-space, the user object itself need not be changed in the content thereof.

Figure 39:
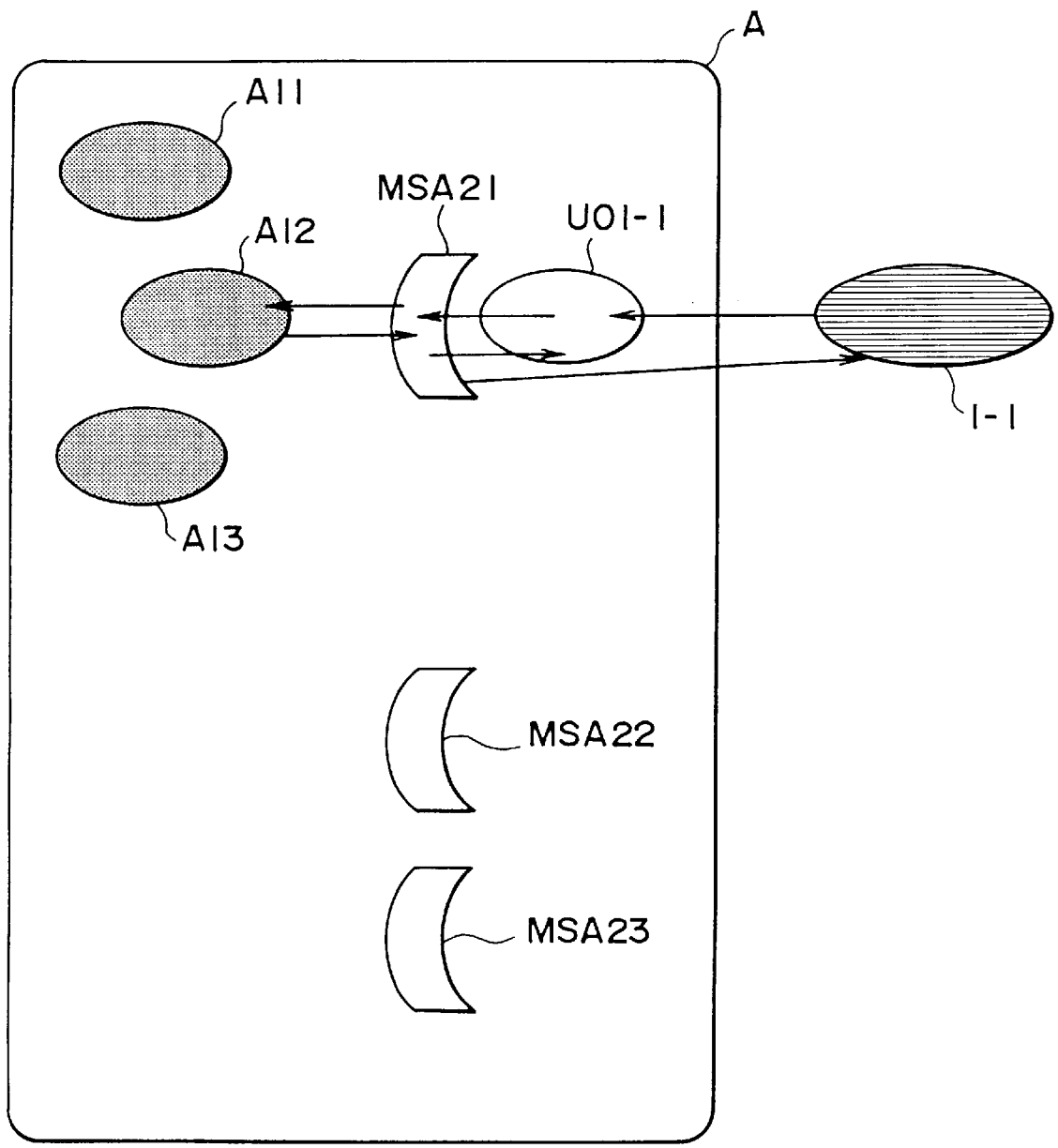
FIG. 39 is a diagram for explaining a conversion object per service provided from a cyber-space.

Furthermore, as shown in FIG. 39, conversion objects are prepared corresponding to individual services. In the embodiment of FIG. 39, a conversion object MSA23 is prepared for a user object corresponding to a user who pays a higher entrance fee, whereas a conversion object MSA21 is prepared for a user object corresponding to a user who pays a lower entrance fee, and a conversion object MSA22 is prepared for a user object corresponding to a user who pays an intermediate entrance fee.

In the case of employing the conversion object MSA23, the user can receive moving picture information, audio information and text information provided from, e.g., an information object A12. Meanwhile, in the case of employing the conversion object MSA22, the user can receive both still picture information and audio signaling. And in the case of employing the conversion object MSA21, the user only receives still picture information.

Figure 40:
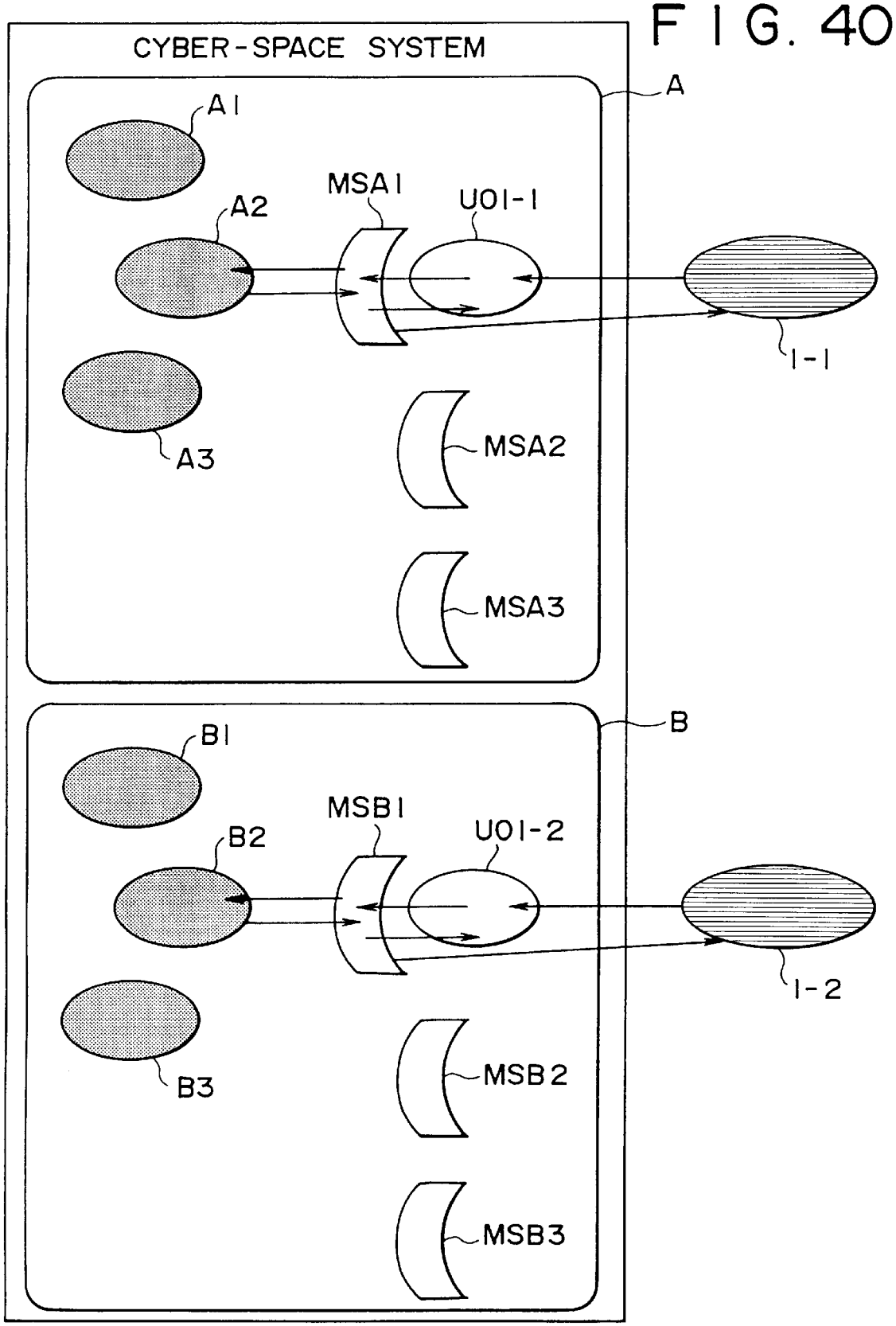
FIG. 40 is a diagram for explaining a conversion object per kind of a cyber-space.
Figure 41:
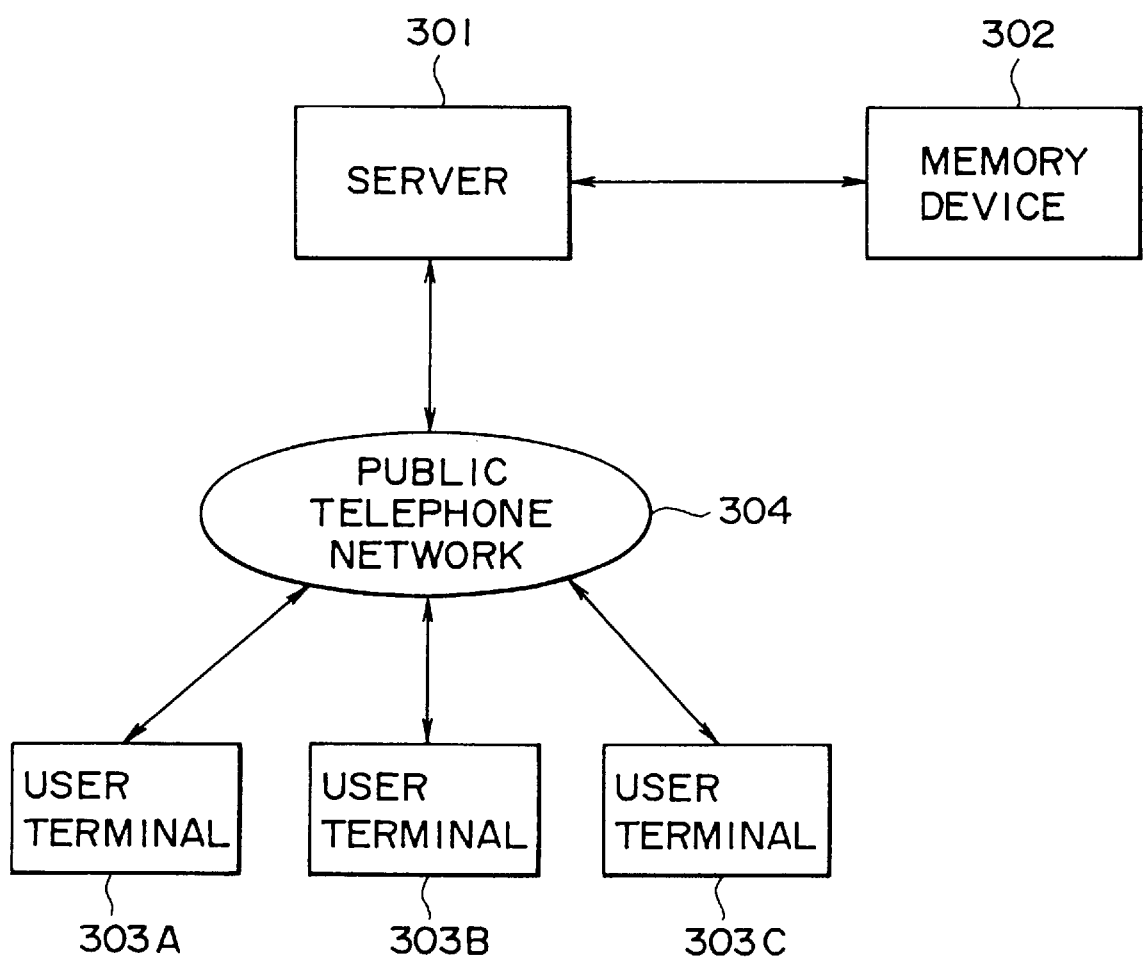
FIG. 41 is a block diagram showing an exemplary composition of a conventional cyber-space system in the prior art.
Figure 42:
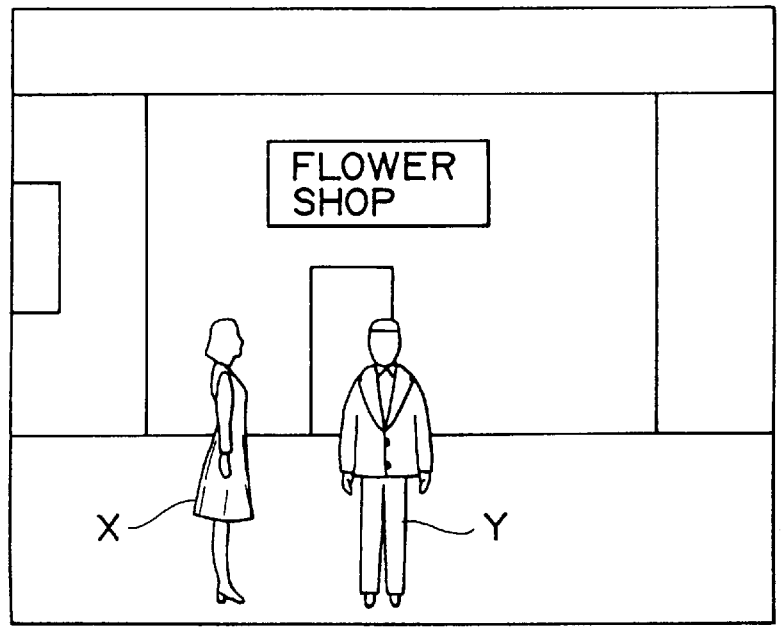
FIG. 42 illustrates an example displayed on a user terminal 303 employed in the system of FIG. 41.
Figure 43:
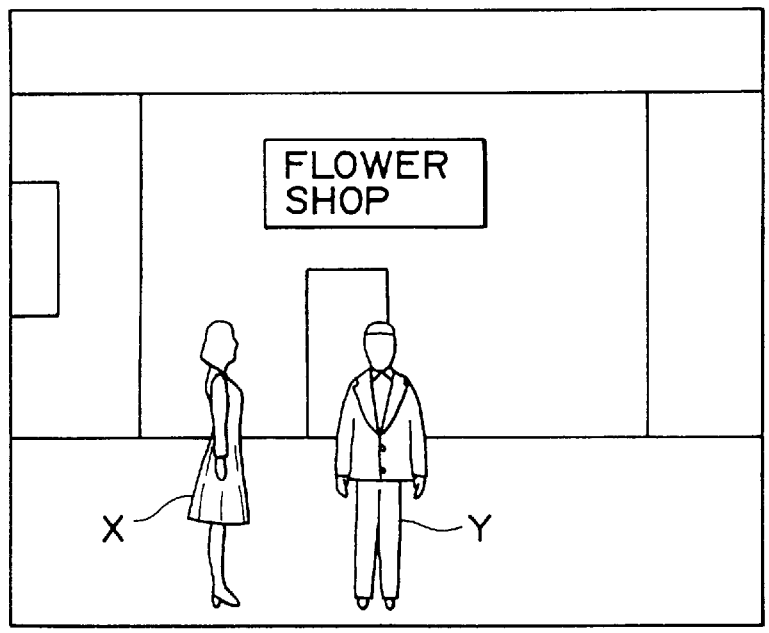
FIG. 43 illustrates an example displayed on another user terminal 303 employed in the system of FIG. 41.

Such conversion objects MSA are prepared uniquely for individual cyber-spaces, as shown in FIG. 40. More specifically, in the cyber-space A, exclusive conversion objects MSA1 to MSA3 are prepared in the cyber-space A, while exclusive conversion objects MSB1 to MSB3 are prepared in the cyber-space B. Therefore, it is possible in each cyber-space to prepare unique conversion objects regardless of the constitution of the other cyber-space.

Thus, as mentioned above, the kinds of the user terminals, the versions of the cyber-spaces and any changes in the attributes of the users are completely absorbed by the conversion objects, and it is not necessary in particular to alter the user objects despite any change in the contents of the cyber-spaces.

Consequently, when the services provided from the individual cyber-spaces relate to shopping, game, data base retrieval and so forth, totally different user interfaces are required. However, each cyber-space needs to consider merely the service to be provided therefrom and has no necessity of considering the user interface of the other cyber-space, hence realizing provision of the most preferred user interface for each user.

There may occur a case where the software version of a cyber-space is altered due to provision of a new service, improvement or modification of inconvenience and the user interface needs to be changed in accordance with such alteration. In this case also, the user interface is changeable merely by changing the conversion object, and there exists no necessity of changing a large amount of the user object.

Furthermore, when any new user terminal has been developed, the software of the cyber-space need not be altered for the purpose of supporting a new function of the new user terminal, and the requirement is only to generate a conversion object for the relevant user terminal having such a new function. In this case, it is possible to set a user interface which effectively utilizes the functionality unique to that user terminal.

In case the service to be provided is altered in compliance with an adequate attribute of any user, the user object or the software of the cyber-space need not be altered, and the requirement is mere preparation of a conversion object for providing a particular user interface.

Although the present invention has been described hereinabove with reference to some preferred embodiments thereof, it is to be understood that the invention is not limited to such embodiments alone, and a variety of other modifications and variations will be apparent to those skilled in the art without departing from the spirit of the invention.

The scope of the invention, therefore, is to be determined solely by the appended claims.

We claim:

1. A cyber-space system comprising:
   one or more cyber-spaces for providing predetermined information; and
   user terminals for receiving the predetermined information by accessing the cyber-space;
   wherein the cyber-space includes:
   information objects for providing information to the user terminals;
   user objects corresponding to the user terminals; and
   a conversion object disposed between the information object and the user object, and capable of converting a terminal manipulation message from the user object into an information access message and supplying the converted message to the information object, the conversion object further capable of converting an information content message from the information object into information corresponding to the capacity of the user terminal and providing the converted information to the user terminal.

2. The cyber-space system according to claim 1, wherein the conversion object provides the information content message to the user object when the information content message obtained from the information object represents renewal of the information of the user object.

3. The cyber-space system according to claim 1, wherein the conversion object is prepared per kind or version of the cyber-space.

4. The cyber-space system according to claim 1, wherein the conversion object is prepared so as to correspond to the information provided from the cyber-space.

5. The cyber-space system according to claim 1, wherein the conversion object is prepared per kind of the user terminals.

6. A cyber-space system comprising:

a server for providing, via a communication network, a virtual reality space formed of three-dimensional pictures;

a user terminal for receiving the virtual reality space provided by the server; and a service provider terminal for providing a service, which corresponds to the pictures forming the virtual reality space, to the user terminal via the server by utilizing at least a portion of the virtual reality space provided from the server, wherein a character corresponding to the user terminal or service provider terminal is arranged in the virtual reality space, and the user terminal or service provider terminal inputs the position and visual point of view of the character in the virtual reality space; and the server provides to the user terminal or service provider terminal the picture of the virtual reality space corresponding to the position and the visual point of view of the character.

7. The cyber-space system according to claim 6, wherein, when either the user terminal or the service provider terminal has designated a desired subset of the pictures forming the virtual reality space, the server provides an information picture, which corresponds to the designated subset of pictures, to the other of the user terminal or the service provider terminal.

8. The cyber-space system according to claim 7, wherein, when the service provider terminal has designated a desired subset of the pictures forming the virtual reality space, the server provides an information picture, which corresponds to the designated subset of pictures, to both the service provider terminal and the user terminal.

9. The cyber-space system according to claim 6, wherein the service provider terminal is capable of receiving the provision by selectively switching either the picture corresponding to the position and the visual point of view of the character of the service provider terminal, or the picture corresponding to the position and the visual point of view of the character of the user terminal.

10. The cyber-space system according to claim 9, wherein the service provider terminal designates the character of the user terminal when receiving the provision of the picture corresponding to the position and the visual point of view of the character of the user terminal.

11. The cyber-space system according to claim 10, wherein the designation of the character of the user terminal by the service provider terminal is enabled only in the space portion allocated to the service provider terminal.

12. The cyber-space system of claim 9, wherein the server constitutes the pictures of the virtual reality space by objects, and allocates the objects, which form the virtual reality space, to predetermined persons, and executes a billing process for each of the objects allocated to the predetermined persons.

13. The cyber-space system according to claim 12, wherein the server generates individual objects corresponding to the predetermined persons respectively, and registers the history of the billing process in each of the individual objects.

14. The cyber-space system of claim 9, wherein the server allocates portions of the virtual reality space to predetermined persons, and executes a billing process for each of the partial spaces allocated to the predetermined persons.

15. The cyber-space system according to claim 14, wherein the server generates individual objects corresponding to the predetermined persons respectively, and registers the history of the billing process in each of the individual objects.

* * * * *

UNITED STATES PATENT AND TRADEMARK OFFICE
CERTIFICATE OF CORRECTION

PATENT NO.: 6,085,256
DATED: 07/04/00
INVENTOR(S): HIROAKI KITANO ET AL.

It is certified that errors appear in the above-identified patent and that said Letters Patent is hereby corrected as shown below:

Column 30, Claim 12, Line 17, "claim 9" should read "claim 6"
Column 30, Claim 14, Line 28, "claim 9" should read "claim 6"

Signed and Sealed this

Tenth Day of April, 2001

Attest:

NICHOLAS P. GODICI

Attesting Officer     Acting Director of the United States Patent and Trademark Office